(12) United States Patent
Ronchini Ximenes

(10) Patent No.: US 12,736,639 B2
(45) Date of Patent: Sep. 15, 2026

(54) DIRECT TIME OF FLIGHT DISTANCE MEASURING SYSTEM WITH IN-PIXEL HISTOGRAM CIRCUIT INCORPORATING LFSR SHIFT REGISTER BASED PHOTON COUNTING ACCUMULATOR

(71) Applicant: COGNISEA INC., Seattle, WA (US)

(72) Inventor: Augusto Ronchini Ximenes, Seattle, WA (US)

(73) Assignee: Cognisea Inc., Seattle, WA (US)

( * ) Notice: Subject to any disclaimer, the term of this patent is extended or adjusted under 35 U.S.C. 154(b) by 0 days.

(21) Appl. No.: 19/539,068

(22) Filed: Feb. 13, 2026

(65) Prior Publication Data

US 2026/0177675 A1 Jun. 25, 2026

Related U.S. Application Data

(63) Continuation of application No. PCT/IB2025/054170, filed on Apr. 22, 2025.

(Continued)

(51) Int. Cl.

*G01S 7/4865* (2020.01)
*G01B 11/22* (2006.01)

(Continued)

(52) U.S. Cl.

CPC ............ *G01S 7/4865* (2013.01); *G01B 11/22* (2013.01); *G01S 7/4815* (2013.01); *G01S 7/4816* (2013.01); *G01S 17/10* (2013.01)

(58) Field of Classification Search

None

See application file for complete search history.

(56) References Cited

U.S. PATENT DOCUMENTS

| | | | |
|---|---|---|---|
| 10,311,282 | B2 | 6/2019 | Shotton |
| 10,637,485 | B2 | 4/2020 | Ronchini Ximenes |

(Continued)

FOREIGN PATENT DOCUMENTS

| | | | |
|---|---|---|---|
| EP | 3695511 | A1 | 8/2020 |
| EP | 3749979 | A1 | 12/2020 |

(Continued)

OTHER PUBLICATIONS

NPL1 “A 0.13 μm CMOS System-on-Chip for a 512×424 Time-of-Flight Image Sensor With Multi-Frequency Photo-Demodulation up to 130 MHz and 2 GS/s ADC”. (Year: 2015).*

*Primary Examiner* — Isam A Alsomiri
*Assistant Examiner* — Sanjida Naser
(74) *Attorney, Agent, or Firm* — Zaretsky Group PC; Howard Zaretsky

(57) ABSTRACT

A novel and useful direct time of flight distance measuring device that incorporates smart pixel architecture, real-time in-pixel histogram and intensity acquisition, optical power control, and variable resolution. The device avoids the use of time to digital (TDC) converters by generating in-pixel histograms based on a global high-speed clock that implements per pixel time bin single photon event accumulation using circuitry located under or near the SPAD pixels. Laser events are processed within a smart pixel architecture increasing substantially the data conversion throughput while reducing data movement in the device to achieve high spatial resolution, low power operation, and fast reliable depth capture. The device uses a compact split pseudo-random counter. Each smart pixel operates independently and concurrently, allowing the sensor to operate in global shutter while monitoring the SNR and determining the optimal exposure time for transmitter and receiver power (Continued)

savings. This enables full control of the pixel operation, enable/disable, and optimization.

19 Claims, 39 Drawing Sheets

Related U.S. Application Data

(60) Provisional application No. 63/637,033, filed on Apr. 22, 2024.

(51) Int. Cl.
*G01S 7/481* (2006.01)
*G01S 17/10* (2020.01)

(56) References Cited

U.S. PATENT DOCUMENTS

| | | | | |
|---|---|---|---|---|
| 10,742,912 | B2 | 8/2020 | Bamji | |
| 10,823,826 | B2 | 11/2020 | Yang | |
| 11,480,684 | B2 | 10/2022 | Ronchini Ximenes | |
| 11,637,978 | B1 | 4/2023 | Saunders | |
| 11,686,826 | B2 | 6/2023 | Glover | |
| 11,709,266 | B2 | 7/2023 | Meinherz | |
| 11,754,720 | B2 | 9/2023 | Ronchini Ximenes | |
| 11,962,900 | B2 | 4/2024 | Dutton | |
| 12,026,906 | B1 | 7/2024 | Ronchini Ximenes | |
| 12,038,510 | B2 | 7/2024 | Calder | |
| 12,130,387 | B2 | 10/2024 | Ronchini Ximenes | |
| 12,146,965 | B1 | 11/2024 | Ronchini Ximenes | |
| 12,181,576 | B2 | 12/2024 | Yang | |
| 12,356,088 | B2 | 7/2025 | Ronchini Ximenes | |
| 12,483,805 | B2 | 11/2025 | Mesgarani | |
| 12,585,021 | B2 | 3/2026 | Zhu | |
| 2017/0038581 | A1 | 2/2017 | Gilboa | |
| 2020/0256669 | A1 | 8/2020 | Roth | |
| 2021/0333402 | A1 | 10/2021 | Ronchini Ximenes | |
| 2022/0035010 | A1 | 2/2022 | Caporale | |
| 2022/0174235 | A1 | 6/2022 | Kelly | |
| 2022/0206158 | A1* | 6/2022 | Henderson | G01S 7/4914 |
| 2022/0236419 | A1 | 7/2022 | Keel | |
| 2022/0283307 | A1 | 9/2022 | Laifenfeld | |
| 2022/0294998 | A1 | 9/2022 | Ronchini Ximenes | |
| 2023/0221439 | A1 | 7/2023 | Al Abbas | |
| 2023/0280468 | A1 | 9/2023 | Zhu | |
| 2024/0283444 | A1 | 8/2024 | Kamath | |
| 2024/0310524 | A1 | 9/2024 | Egea | |
| 2024/0329213 | A1 | 10/2024 | Mesgarani | |
| 2024/0406597 | A1* | 12/2024 | Finkelstein | H04N 25/705 |

FOREIGN PATENT DOCUMENTS

| | | | |
|---|---|---|---|
| EP | 3521856 | B1 | 9/2023 |
| EP | 4432689 | A1 | 9/2024 |
| EP | 4431978 | A3 | 11/2024 |
| EP | 4487145 | A1 | 1/2025 |
| WO | 2019/154513 | A1 | 8/2019 |
| WO | 2021/257227 | A1 | 12/2021 |
| WO | 2023/278547 | A1 | 1/2023 |
| WO | 2023/167888 | A1 | 9/2023 |

* cited by examiner

80
$V_{EB}$
QUENCH/ RECHARGE CIRCUIT
82
84
$V_D$
$V_{OUT}$
SPAD
86
$-V_{BD}$
V
$V_{EB}$
TH
$V_D$
87
$V_{DD}$
88
$T_Q$
$T_R$
TIME

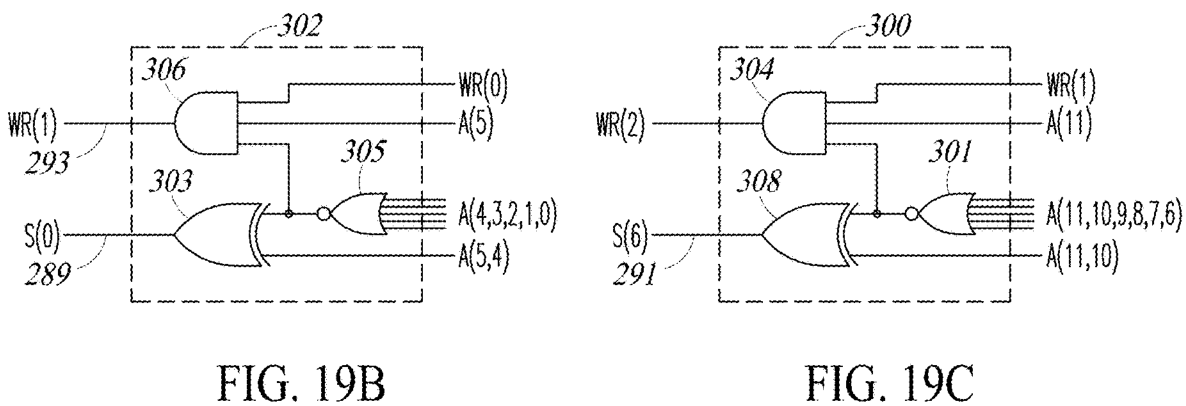
FIG. 19B
FIG. 19C
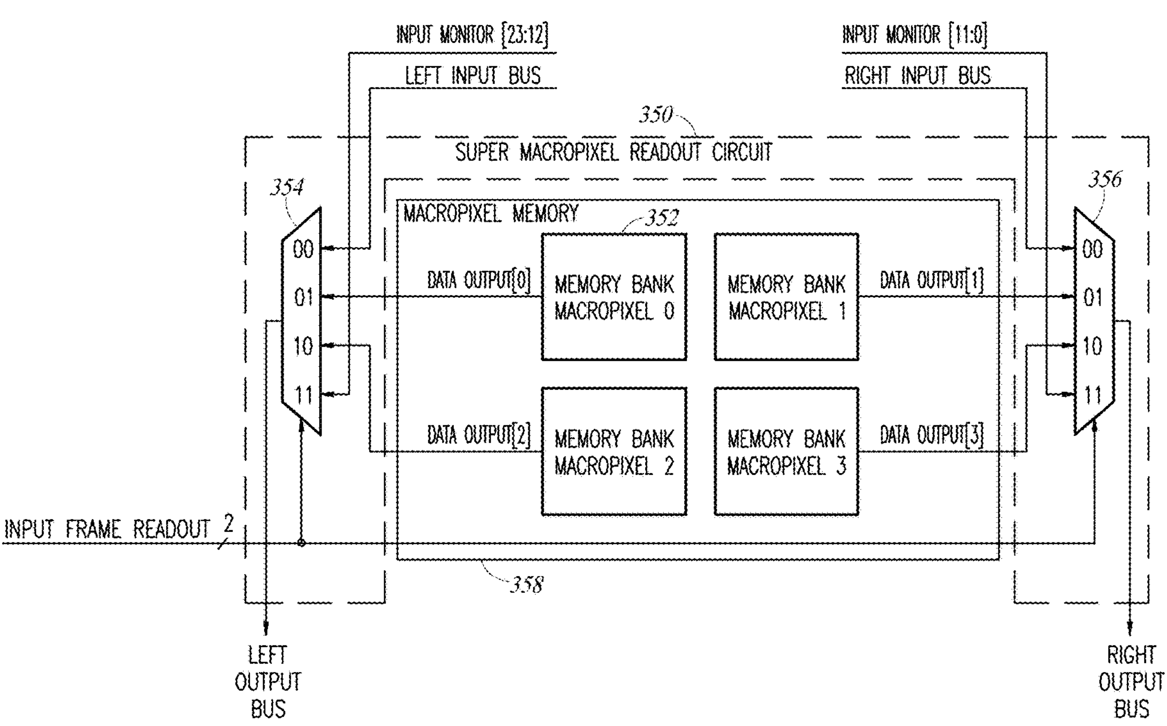
FIG. 22

370
4x4 MACROPIXEL
372
371
HISTOGRAM A
HISTOGRAM B
HISTOGRAM C
HISTOGRAM D
A
B
C
D

373
HYBRID MACROPIXEL
376
374
HISTOGRAM A
HISTOGRAM B
HISTOGRAM C
HISTOGRAM D

375
SUPER MACROPIXEL
377
378
HISTOGRAM A
HISTOGRAM B
HISTOGRAM C
HISTOGRAM D

660

LUT 642 644

| LASER # | COUNT SEGMENT |
|---|---|
| 250 | 0 |
| 500 | 1 |
| 750 | 2 |
| ⋮ | ⋮ |
| 4,000 | 16 |
| 6,000 | 17 |
| 8,000 | 18 |
| ⋮ | ⋮ |
| 30,000 | 29 |
| 75,000 | 30 |
| 100,000 | 31 |

LASER PULSE
OPERATION
MEMORY OPERATION
SPAD ACQ ENABLE[W]
SPAD ACQ ENABLE[X]
SPAD ACQ ENABLE[Y]
SPAD ACQ ENABLE[Z]
IDLE
HISTOGRAM
INTENSITY
BIN0 BIN1 BIN2 BIN3 BIN4 BIN5 BINN
DISABLE ACQ
730 732 734 736 738 740 742 744 746

DIRECT TIME OF FLIGHT DISTANCE MEASURING SYSTEM WITH IN-PIXEL HISTOGRAM CIRCUIT INCORPORATING LFSR SHIFT REGISTER BASED PHOTON COUNTING ACCUMULATOR

REFERENCE TO PRIORITY APPLICATIONS

This application is a continuation of International Application Serial No. PCT/IB2025/054170, filed Apr. 22, 2025, entitled "Direct Time Of Flight Distance Measuring System Incorporating Smart Pixel Architecture", which claims priority to U.S. Provisional Application Ser. No. 63/637,033, filed Apr. 22, 2024, entitled "Ultra-Compact, Ultra-Low Power Global Shutter Depth Sensor Incorporating Pseudo-Random Counting Based Smart Pixel Architecture," all of which are incorporated herein by reference in their entirety.

FIELD OF THE INVENTION

The present invention relates generally to distance measuring systems and in particular to a direct time of flight distance measuring system incorporating smart pixel architecture, in-pixel histogram and intensity acquisition, optical power control, and variable resolution.

BACKGROUND OF THE INVENTION

Recently, depth sensing has become a critical technology for emerging applications that demand real-time 3D information. For example, augmented reality (AR) and virtual reality (VR) systems use depth cameras to capture the 3D structure of scenes and objects, enabling the creation of point clouds, meshes, or other 3D models for immersive content. Similarly, autonomous vehicles and robotics rely on LiDAR and depth sensors to perceive their environment, which requires detecting objects at various distances under different lighting conditions.

These applications, however, impose extremely challenging dynamic range requirements, since reflected signals can vary over several orders of magnitude in intensity (due to distance attenuation and diverse target reflectivities) while ambient illumination (e.g., sunlight and other artificial light sources) adds significant noise. In essence, conventional depth sensing systems demand high spatial resolution, fine temporal and spatial precision, and robust multi-object detection capability, all delivered at fast frame rates and low power consumption to be practical in portable or power-constrained devices.

Further, conventional direct time of flight sensors that require precise time measurement are known to generate excessive amounts of data, which limits the maximum spatial resolution of current sensors. Typical systems are designed to operate in their worst-case scenario (e.g., to achieve a certain precision at the maximum range, under maximum ambient illumination, and lowest target reflectivity), which is not always the case for a particular target condition, and a limited power budget imposes a major limiting factor in the total spatial resolution that is achievable and/or maximum range.

Depth sensing is useful in a myriad of applications including the following examples. Driving assistance requires the knowledge of environmental conditions, including other vehicles, pedestrians, road obstacles and urban signs. As well as out-looking cameras, near-car and in-cabin monitoring are also two of the most recent uses of depth in automotive. Depth sensors designed for automotive applications specifically require operation in various ambient light conditions, indoor and outdoor, and thus demand robustness to background light, long range, and short latency, while requiring high spatial resolution.

Depth sensing is also used in augmented and virtual realities (AR/VR) applications. In overlaying a layer of digital information over the real world, devices are required to estimate and locate real objects in space, with millimeter precision, so the digital rendering can be more accurate and seamless. Today, triangulation-based depth estimation (via software) is more commonly used (stereoscopic and structured-light), due to cost, availability of off-the-shelf algorithms, and for not requiring specialized sensors. Such estimations, however, are prone to calibration issues, occlusion, and excessive error for long distances. Nevertheless, a leading technology must provide superior quality to accommodate the higher price.

Moreover, stereoscopic depth estimation can be low power in the sensing part (passive and very efficient image sensors), but they typically require complex data processing, which increases overall power consumption and latency, and might be a very stringent bottleneck in head-mounted devices (HMDs) and systems that demand fast response. dToF takes advantage of a very light data processing pipeline to provide a fast and on-sensor compute, but requires special devices for the sensing.

Direct time of flight operates in a modality called time-correlated single photon counting (TCSPC). A short pulse of light (typically a nanosecond laser pulse width) is synchronized with the sensor, where the sensor is responsible to timestamp (i.e. measure the travel time of individual photons) multiple incoming photons and accumulate them in histograms, where the signal can be reconstructed and identified over the background, indicating the distance. Such operation is very efficiently used for depth sensing, with the highest optical efficiency among non-coherent detectors.

Another application of dToF is in positron emission tomography (PET), which is a nuclear medicine imaging technique where patients are injected with radiopharmaceutical compounds, which are labeled with a short-lived radioactive tracer isotope, that tend to concentrate in cancerous cells, in a very early stage of abnormal activity. As these radioisotopes undergo positron emission decay, they emit protons that are shortly combined with surrounding electrons, which during the annihilation process generate pairs of gamma photons in opposite directions. These photons are detected and data post-processing identifies coincident events (originated from the same source), thus obtaining the emitter's position and being able to recreating a 3D map of the abnormal sample.

One other application is Fluorescence Lifetime Imaging Microscopy (FLIM), which is a technique that has been adopted in various scientific fields, specifically for mapping chemical and biological interactions at molecular level, since the lifetime of a fluorophore depends on its environment but not on its concentration, thus allowing the investigation of its composite, independently of the, usually unknown, concentration of the fluorophore. Fluorescence techniques are noninvasive and generally nondestructive, and thus can be applied to live specimens. A decay function occurs when a molecule absorbs a photon and it enters an excited state, from which it can return to the ground state by emitting a photon. This photon emission is the result of internal conversion of the absorbed energy into heat, transfer of energy to its molecular environment, or state change (into a triplet state and return to ground state). FLIM has become a practical alternative to fluorescence intensity thanks to affordable pulsed laser sources and counting electronics. This type of imaging requires time-resolved measurements and single-photon detection.

Current hardware based dToF solutions are typically based on traditional digital architecture and time-to-digital converter (TDC) circuits, which are very large and sensitive to variations, which can lead to an excess of data and power consumption. Also, commonly adopted, column-parallel TDCs can be implemented on the periphery of the sensor, being shared with the whole pixel array, which imposes a time-multiplexing operation, leading to limited overall achievable spatial resolution, typically from scanning mode systems.

Hardware-based depth estimations, such as indirect (iToF) and direct (dToF) time of flight systems, are more accurate, scene robust (with different levels of robustness, dToF being superior to iToF), and generally faster, but require specialized active illumination and sensor, which can be challenging. They are capable of higher accuracy and lower latency than software-based solutions, particularly dToF, since iToF requires multiple exposures and a series of processing steps to extract the depth. Although dToF offers the most interesting combination of performances, due to complexity and potentially excessively high data rate, current dToF solutions are limited to low spatial resolution, have high power consumption, and/or can only achieve a narrow field of view (FOV).

There is thus a need for a dToF depth measurement system that overcomes the limitations and disadvantages of the prior art. In particular, the dToF depth measurement system should have good single-photon sensitivity, high spatial and temporal resolution with wide dynamic range, be compact in size, have low power consumption and data rate, have high accuracy, be scene independent, exhibit lower latency, and have a high field of view.

SUMMARY OF THE INVENTION

The present invention is a direct time of flight distance measuring device that incorporates smart pixel architecture, real-time in-pixel histogram and intensity acquisition, optical power control, and variable resolution. The device avoids the use of time to digital (TDC) converters by generating in-pixel histograms based on a global high-speed clock that performs per pixel time-correlated event accumulation using a circuitry located under or near the SPAD pixels. All photon events from a pixel are processed within its own smart pixel architecture, substantially increasing the data conversion throughput, maintaining the system SNR conditions, while reducing data movement within the sensor and, consequently, a reduction in power consumption to achieve high spatial resolution, low power operation, and fast reliable depth capture. The device achieves this using an optionally split pseudo-random counter (e.g., LFSR based), which is extremely compact in size and fast. Each smart pixel operates independently and concurrently from each other, allowing the sensor to operate in global shutter mode (or any other mode, scanning, flexible region-of-interest, etc., given its flexibility), while monitoring the SNR and determining the optimal exposure time to achieve transmitter and receiver power savings. This enables full control of the pixel operation, enable/disable, optimization, etc.

A linear feedback shift register (LFSR) based histogram incrementation method is utilized within each pixel (or groups of pixels) to efficiently manage high speed histogram memory operations. This technique addresses critical limitations inherent in conventional binary histogram incrementations, such as area overhead, high power consumption, and scalability issues at sub-nanosecond operation speeds. The LFSR architecture is further optimized through a partitioning approach, significantly reducing the decoder complexity necessary to translate pseudorandom LFSR sequences into manageable binary addresses.

The single photon sensitivity of the SPAD arrays with on-chip data accumulation overcomes the power and throughput limits of conventional solutions. By generating a detailed, high quality time-of-flight histogram within each pixel, the device generates depth maps with improved fidelity (i.e. capturing full depth distributions) at faster speeds and with lower power. This enables the dToF of the present to meet the stringent requirements of AR/VR, automotive LiDAR, and other advanced depth sensing applications. Additional capabilities include optical power control for a more optimized operation and variable resolution for a more user-centric operation.

Overall, the novel dToF architecture disclosed herein provides superior measurement precision, power efficiency, and dynamic configurability, making it uniquely suitable for next-generation 3D sensing applications. By collecting each individual photon, through single-photon avalanche detectors (SPADs), and counting and organizing them into histograms, the signal photons that originated in the laser emitter can be identified over uncorrelated photons, i.e. ambient/background light, other systems, etc.

It is noted that conventional SPAD based systems lack flexible sensitivity adjustment leading to issues such as pile-up distortion in high intensity light conditions or insufficient sensitivity in low light scenarios. These systems also struggle with controlling the granularity of event detection, particularly when dealing with varying illumination profiles or distances. The device of the present invention provides programmable sensitivity control, both electrically and optically, to optimize photon detection while mitigating noise and distortion.

Electrical masking selectively gates SPAD generated electrical pulses, allowing or preventing their propagation to subsequent stages of signal processing without disabling SPAD sensitivity but controls event propagation electrically. Optical masking physically disables the SPAD device by removing or reducing its bias voltage, preventing photon induced event generation.

There is thus provided in accordance with the invention, a time of flight distance measuring system, comprising an array of pixel photon detectors for detecting photons reflected off one or more targets in response to a series of laser events, in-pixel histogram circuits disposed under said plurality of pixel photon detectors, each in-pixel histogram circuit incorporating a linear feedback shift register (LFSR) based accumulator for counting photons, said in-pixel histogram circuit operative to generate a histogram for each pixel or groups of pixels whereby photon detection counts are maintained for a plurality of discrete time bins over an exposure period with each time bin corresponding to a particular delay interval equivalent to distance, and simultaneously generate an intensity measurement for each pixel.

There is also provided in accordance with the invention, a method of time of flight distance measuring, comprising detecting photons, using an array of pixel photon detectors, for detecting photons reflected off one or more targets in response to a series of laser events, counting the photons detected using an in-pixel histogram circuit disposed under said plurality of pixel photon detectors that incorporates a linear feedback shift register (LFSR) based accumulator, generating a histogram for each pixel or groups of pixels whereby photon detection counts are maintained for a plurality of discrete time bins over an exposure period with each time bin corresponding to a particular delay interval equivalent to distance, and simultaneously generating an intensity measurement for each individual pixel.

There is further provided in accordance with the invention, a time of flight distance measuring system, comprising an array of laser emitters operative to generate and emit pulses of laser light as a series of laser events that illuminate an area, an array of pixel photon detectors for detecting photons reflected off one or more targets in response to the series of laser events, in-pixel histogram circuits disposed under said plurality of pixel photon detectors, each in-pixel histogram circuit incorporating a linear feedback shift register (LFSR) based accumulator for counting photons, said in-pixel histogram circuit operative to generate a histogram for each macropixel whereby photon detection counts are maintained for a plurality of discrete time bins over an exposure period with each time bin corresponding to a particular delay interval equivalent to distance, and simultaneously generate an intensity measurement for each individual pixel.

BRIEF DESCRIPTION OF THE DRAWINGS

The present invention is explained in further detail in the following exemplary embodiments and with reference to the figures, where identical or similar elements may be partly indicated by the same or similar reference numerals, and the features of various exemplary embodiments being combinable. The invention is herein described, by way of example only, with reference to the accompanying drawings, wherein:

FIG. 19B is a diagram illustrating an example LSB group bit 0 logic, including a zero detect circuit;

FIG. 19C is a diagram illustrating an example MSB group bit 6 logic, including a zero detect circuit;

FIG. 22 is a diagram illustrating an example super macropixel memory and readout circuit;

DETAILED DESCRIPTION OF THE INVENTION

Figure 1:
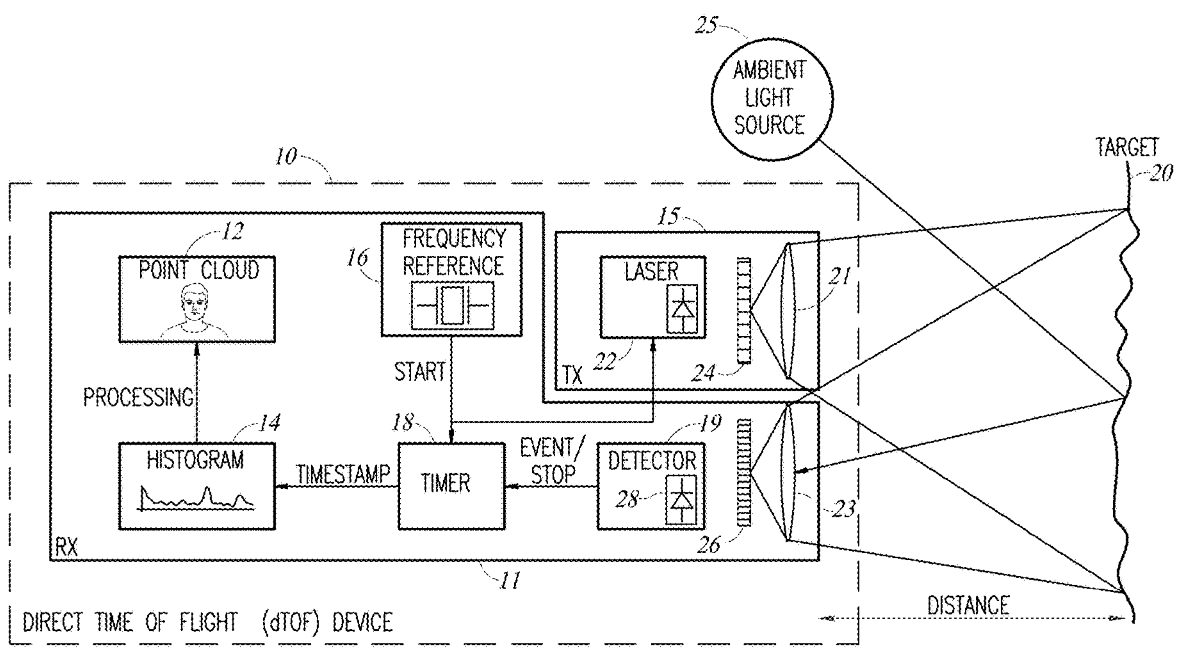
FIG. 1 is a high level block diagram illustrating an example direct time of flight device.

In the following detailed description, numerous specific details are set forth in order to provide a thorough understanding of the invention. It will be understood by those skilled in the art, however, that the present invention may be practiced without these specific details. In other instances, well-known methods, procedures, and components have not been described in detail so as not to obscure the present invention.

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary, for the understanding and appreciation of the underlying concepts of the present invention and in order not to obfuscate or distract from the teachings of the present invention.

Any reference in the specification to a method should be applied mutatis mutandis to a system capable of executing the method. Any reference in the specification to a system should be applied mutatis mutandis to a method that may be executed by the system.

Throughout the specification and claims, the following terms take the meanings explicitly associated herein, unless the context clearly dictates otherwise. The phrases "in one embodiment," "in an example embodiment," and "in some embodiments" as used herein do not necessarily refer to the same embodiment(s), though it may. Furthermore, the phrases "in another embodiment," "in an alternative embodiment," and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

A direct time-of-flight (dToF) imaging system measures distance (i.e. depth) by directly quantifying the time required for a short optical pulse emitted by a laser to reflect from a target and return to the sensor. Time of flight imaging systems are used for precise 3D sensing in numerous advanced applications such as automotive light detection and ranging (LiDAR), augmented and virtual reality (AR/VR), robotics, and medical imaging.

A high level block diagram illustrating an example direct time of flight device is shown in FIG. 1. The dToF device, generally referenced 10, comprises a transmitter 15 including a laser emitter array 24 made up of individually addressable laser emitters 22 such as vertical cavity surface-emitting lasers (VCSELs) arranged in an array, and lens system 21. A receiver 11 includes a detector 19 made up of SPADs 28 arranged in an array 26 with lens system 23, frequency reference 16, timer 18, histogram circuit 14, and point cloud 12. Note that that the SPADs, timer, and histogram is per pixel while the processing of the resulting histograms are used to generate the point cloud. Note further that the timer 18 may comprise a time to digital converter (TDC) circuit. In an alternative embodiment described infra, the timer is eliminated and photon reception events are directly counted (i.e. binned in time) and a histogram and intensity information are generated.

In one embodiment, the dToF system consists primarily of two key components: (1) the transmitter (TX) 15 adapted to emit a series of short duration laser pulses on the order of a nanosecond full width half maximum (FWHM), and (2) the receiver (RX) 11 composed of an array of highly sensitive single photon avalanche diodes (SPADs). The SPAD detectors operate in Geiger mode to detect individual photons reflected off a target 20 with picosecond timing resolution. The target is illuminated with laser light from the TX 15 as well as light from ambient light sources 25. By recording the photon arrival times and aggregating these measurements into histograms over multiple laser pulses, the system reliably distinguishes signal photons that correspond to the reflected laser pulses from ambient photons, which arise from background illumination sources 25 to determine distance to the target.

Figures 2A, 2B, 2C:
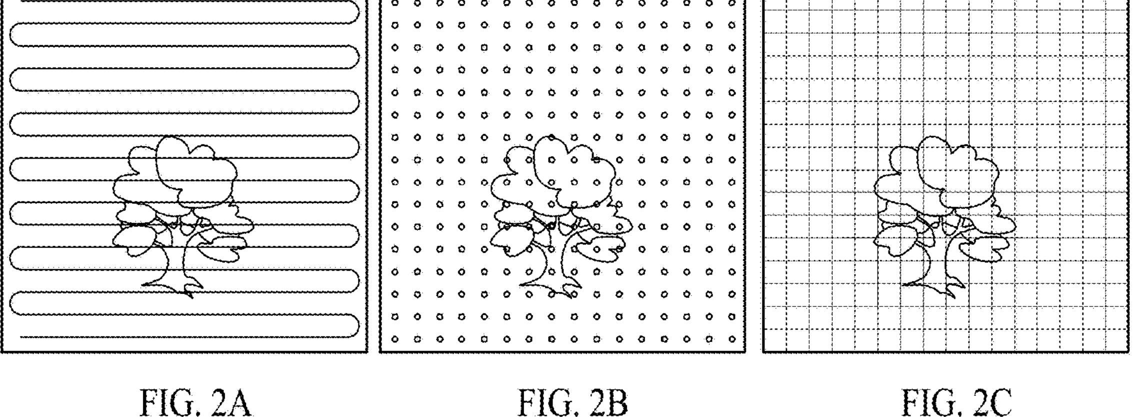
FIG. 2A is a diagram illustrating example scanning illumination projection.
FIG. 2B is a diagram illustrating example spare/dots illumination projection.
FIG. 2C is a diagram illustrating example flood/uniform illumination projection.

The dToF system is able to generate different types of optical illumination depending on one or more criteria. Several considerations are taken into account in selecting the type of illumination. FIGS. 2A, 2B, and 2C illustrate most common types, which show scanning illumination projection, spare/dots illumination projection, and flood/uniform illumination projection, respectively. The more sparse the illumination, the higher the range that is possible, with the downside being a reduction in the spatial resolution achievable. Flood or uniform illumination provides higher spatial resolution albeit at shorter range. Scanning systems require an additional device, namely the scanner itself, which increases cost and volume, but which is often used due to its capability of reaching hundreds of meters of range such as for automotive use.

Figure 3A:
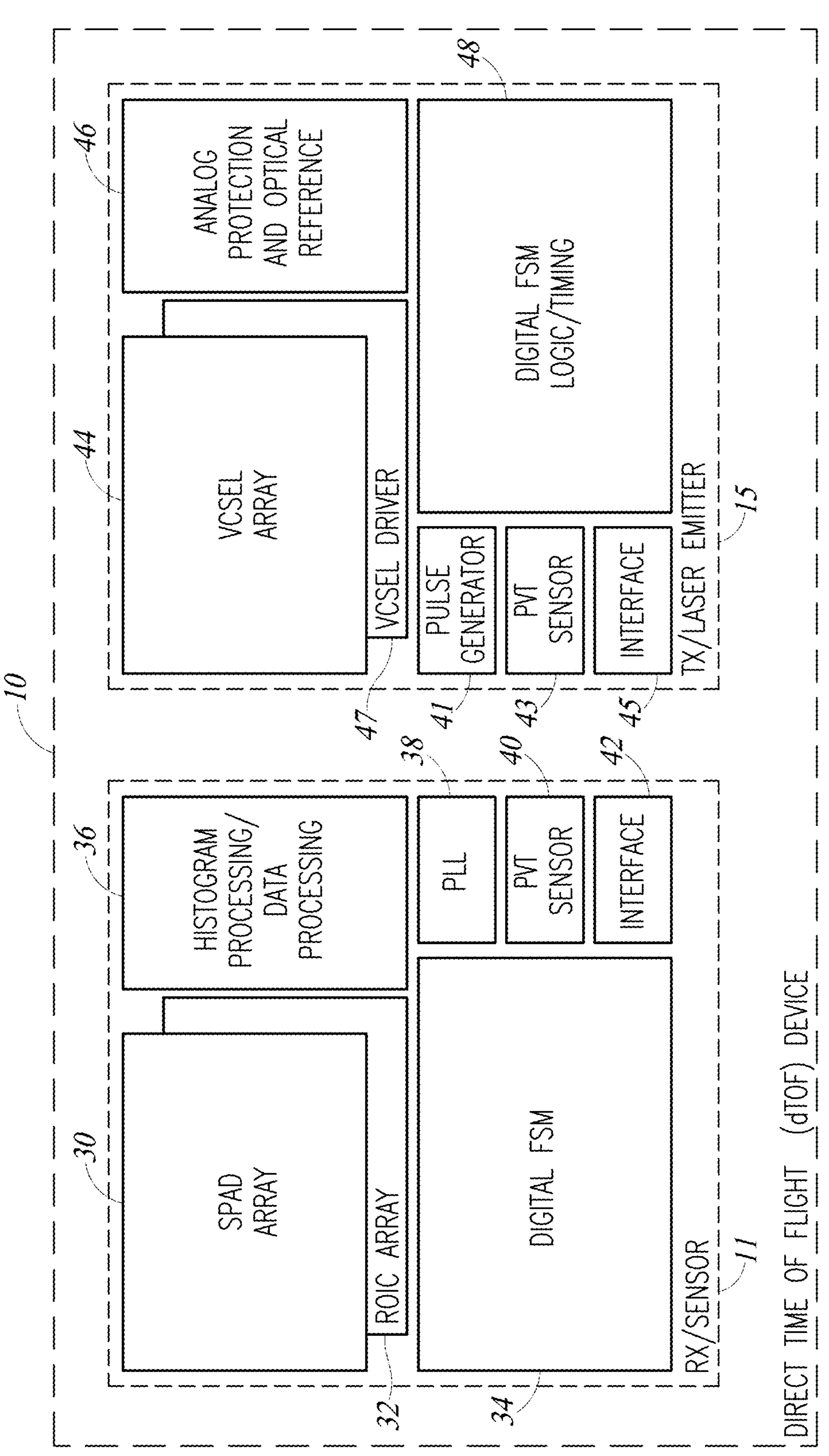
FIG. 3A is a high level diagram illustrating the architecture of an example direct time of flight system device.

A high level diagram illustrating the architecture of an example direct time of flight system device is shown in FIG. 3A. The dToF device, generally referenced 10, comprises an RX sensor 11 including SPAD array 30, ROIC (readout circuit array) 32 which implements the circuits, methods, and mechanisms of the present invention described infra, digital finite state machine (FSM) 34, histogram processing and data processing block 36, phase locked loop (PLL) 38, process, voltage, temperature (PVT) sensor 40, and interface circuit 42. The device 10 also comprises a TX laser emitter 15 including a VCSEL array 44, VCSEL driver 47, analog protection and optical reference circuit 46, digital FSM logic and timing block 48, pulse generator 41, PVT sensor 43, and interface circuit 45.

In one embodiment, the dToF system is realized using a sensor (RX) 11, and transmitter (TX) 15, a power management unit (PMU) (not shown), and an application/ISP chip (not shown). The core sensing blocks are the RX and TX, where the array of pixels in the RX are paired to an array of VCSELs in the TX.

The RX 11 contains the active SPAD array 30 and corresponding pixel architecture 32 capable of performing the histogram integration. The array is controlled by the system control and governed by a high speed clock generated by the on-chip PLL. This data is read from the array, processed on the sensor 36, and outputted via a MIPI D-PHY/C-PHY communications interface 42. One or more supporting blocks, bias generators and sensors (PVT) and decoupling capacitors are included on the sensor for a robust operation over temperature and general process variations.

The data processing block 36 aids in extracting all available information. For instance, techniques such as spatial correlation (i.e. the ability to compare and process neighboring pixels), depth densification (i.e. depth spatial resolution increase with guided passive image), object/hand tracking, and several other intelligent operations, which contributes to a much more efficient solution.

The system also includes supporting subsystems, such as integrated power management units (PMUs) capable of delivering high voltage bias for both SPAD operation and laser pulse emission, on-chip sensors for monitoring process, temperature and voltage (PVT) variations, and comprehensive decoupling capacitance networks to ensure robust, stable performance across varying environmental and operational conditions. Note that SPADs typically require a high voltage of approximately-25V, while the laser requires between 10 and 20V.

Figure 3B:
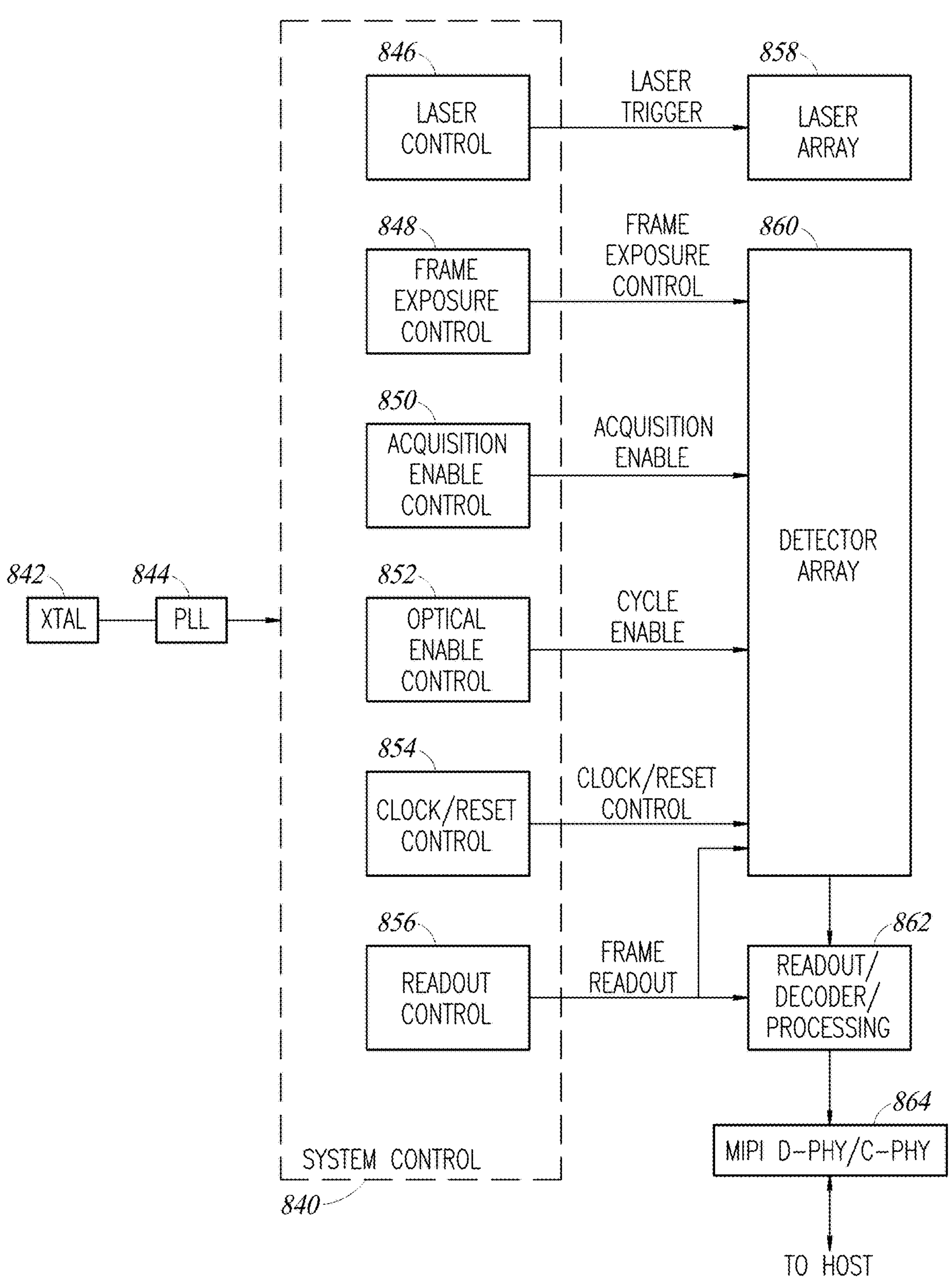
FIG. 3B is a high level diagram illustrating the sensor/receiver system control block in more detail.

A high level diagram illustrating the system control block in more detail is shown in FIG. 3B. The system control 840 is operative to generate, inter alia, various global clock, control, and enable signals that are used throughout the device. Timing for the system control is based on a frequency reference (crystal oscillator) 842 that drives a phase locked loop (PLL) 844 to generate a master clock signal. A laser control circuit 846 functions to generate global laser trigger pulses that drive the laser array 858. A frame exposure control block 848 functions to generate a frame exposure clock that is used in the detector array to provide frame timing. An acquisition enable control block 850 functions to generate a global acquisition enable signal used to provide electrical masking of the SPADs in the detector array 860. An optical enable control block 852 functions to generate a global optical enable signal used to provide optical masking to pixels in the detector array 860. The clock/reset control circuit 854 is operative to generate the various clock and reset signals used throughout the detector array. A readout control block 856 functions to generate a frame readout signal output to the detector array and a readout/decoder/processing block 862. A MIPI D-PHY/C-PHY block 864 provides a communications interface between the device and a host. Note that the operation of each control block of the system control is described in more detail infra.

Figure 4:
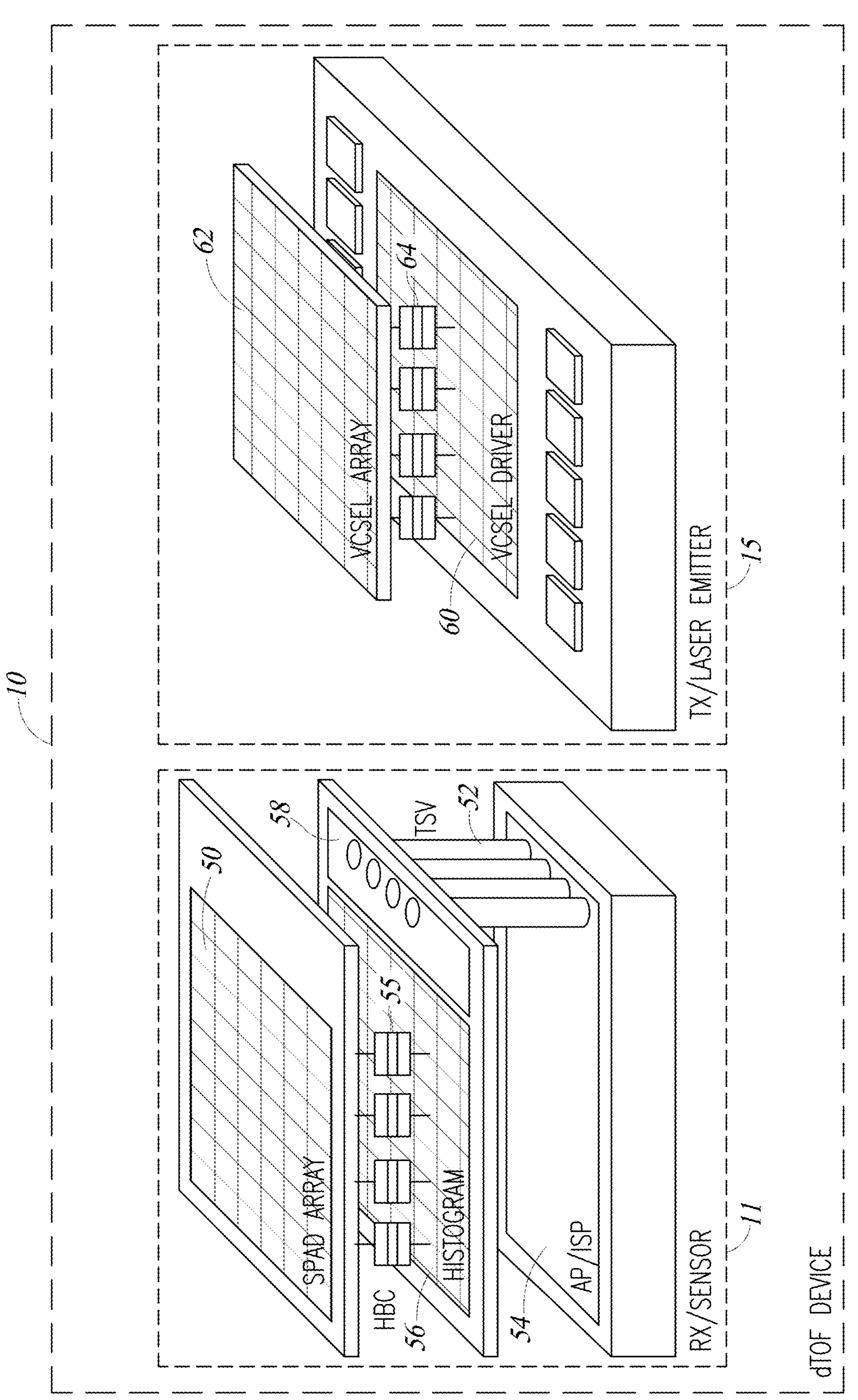
FIG. 4 is a high level diagram illustrating an example direct time of flight system with 3-layer sensor device with hybrid bonding, through silicon vias, and transmitter with 2-layer die to wafer technology.

A high level diagram illustrating an example direct time of flight system device with wafer to wafer hybrid bonding between SPAD array 50 and ROIC array 56. Optionally, a third layer 54 is possible through silicon vias 52, for more advanced signal processing capability. A similar 2-layer die to wafer technology for the transmitter 15, between the VCSEL array 62 and VCSEL driver circuit 60 is also shown in FIG. 4. Hybrid 3D-stacking allows two silicon wafers to be bonded together, with bonging pitches less than 1 μm, which is important for individual image sensors. In order to increase the sensor and laser capabilities, both are fabricated using a 3D stacked technology.

In one embodiment, the RX sensor is implemented using advanced semiconductor processes, particularly those that leverage 3D-stacking technology. This allows separation of functions into optimized tiers connected via high density hybrid bonding. The top layer of the receiver is solely dedicated to the SPAD detector array, maximizing photon detection efficiency and fill-factor. Beneath this detector array is the Readout Integrated Circuit (ROIC), performing on-chip histogramming, memory storage, and preliminary data processing.

In particular, in one embodiment, the RX sensor 11 is constructed from three layers including an AP/ISP layer 54, through silicon vias (TSVs) 52, histogram (digital layer, ASIC, FPGA, etc.) 56 and digital logic 58 layer, and SPAD array 50 layer connected via hybrid bonding connections (HBC) 55. Note that alternatively, the RX can be fabricated using only two layers. On the receiver (RX), the top tier is solemnly dedicated to the SPAD detector, connected via hybrid bonding to a ROIC digital chip (histogram and signal processing). Potentially, in the receiver, a 3rd layer (AP/ISP) can be integrated through through-silicon vias (TSV) to integrate the application layer (AP) within the sensor package.

The transmitter similarly benefits from advanced 3D-stacking technology, integrating vertical cavity surface emitting laser (VCSEL) arrays with dedicated driver circuits, allowing granular control over illumination regions and optical power. This structured approach maximizes efficiency and also allows dynamic reconfiguration based on the application resolution and range requirements, enhancing versatility across different operating conditions.

In the transmitter (TX), the top tier includes an array of the backside emission lasers, each laser connected via an individual driver. Note that the short pulsed laser can be constructed using edge emitting lasers (EELs) or vertical cavity surface emitting laser (VCSELs). In the example embodiments described herein, a VCSEL array (multiple lasers, backside emission) is used in order to control regions of illumination. In particular, the TX laser emitter 15 comprises a VCSEL array layer 62 connected by high density hybrid bonding 64 to the VCSEL driver circuitry 60 located beneath it.

Using hybrid 3D stacking technology for integrating both the RX and TX dramatically enhances scalability, reduces power consumption, and enables compact implementation suitable for mobile and embedded systems.

Single photon avalanche diodes (SPADs) are well known devices based around a semiconductor p-n junction that when reverse biased far above breakdown voltage (VBD), creates a high electric field region capable of detecting single photons with ultra-fast response through a process of avalanche multiplication. They are different than linear avalanche photodiodes (APD), which are devices that are reverse biased slightly below VBD to provide moderate current gain (e.g., in the range of 200), and relatively wide bandwidth (e.g., several gigahertz). SPADs operate in a high gain regime called Geiger-mode and their main property is very fast timing response suitable for picosecond photon detection.

It is noted that SPADs designed in standard CMOS technology have been under increasing attention from both the scientific and industrial communities, since they can benefit from high cost effectiveness, mass production capability, and ease integration with readout circuits. Consequently, photon sensing applications, especially LiDAR for advanced driver assistance systems (ADAS), autonomous vehicles (AV), virtual and augmented realities (VR/AR), aerial drones, industrial robotics, machine vision, space navigation, etc., are becoming more popular.

One limitation of monolithic SPADs is the relatively low fill factor, due to area intensive structures, such as guard ring, isolation, etc. and pixel circuitry for quenching and recharge circuits. This problem is exacerbated whenever advanced in-pixel functionality is required, such as time-stamping, histogramming, photon counting, signal processing, etc. One way to optimize the active area is to implement the sensor in a smaller node technology, minimizing the processing circuitry, and thus allowing more area for the SPAD. Hybrid 3D stacking technology can be used to optimize the SPAD layer and an advanced ROIC layer as described supra.

Figures 5A, 5B, 6A, 6B:
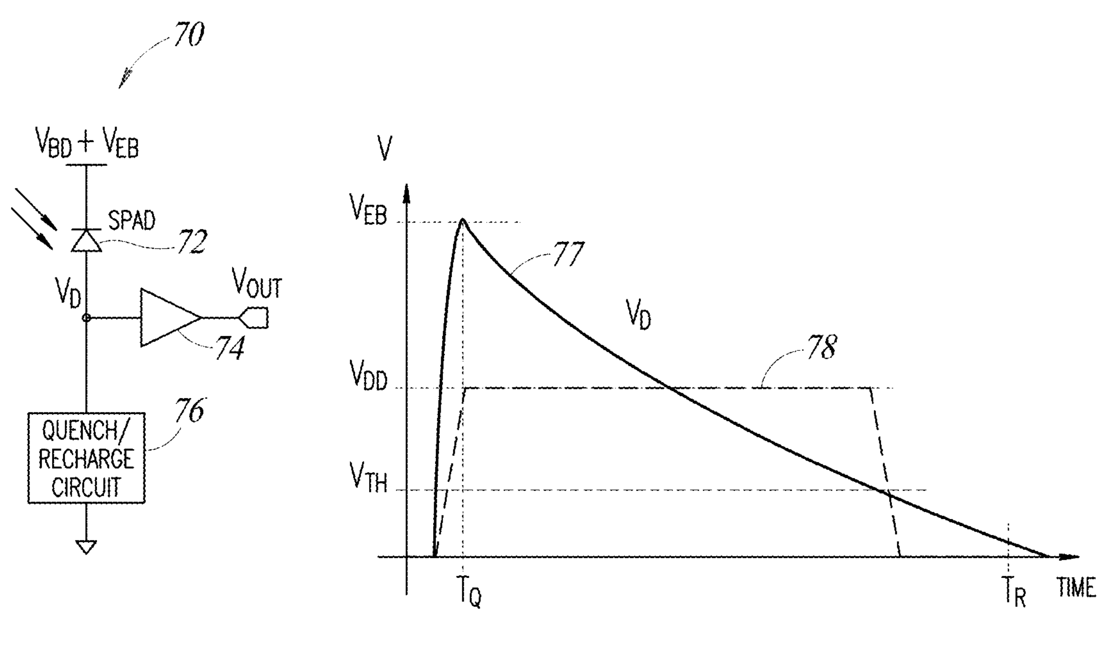
FIG. 5A is a diagram illustrating an example passive SPAD quenching and recharge circuit, connected to the anode of the SPAD, with common cathode.
FIG. 5B is a diagram illustrating the voltage versus time across the SPAD device in the passive SPAD quenching and recharge circuit.
FIG. 6A is a diagram illustrating an example passive SPAD quenching and recharge circuit, connected to the cathode of the SPAD, with common anode.
FIG. 6B is a diagram illustrating the voltage versus time across the SPAD device in the passive SPAD quenching and recharge circuit.

A diagram illustrating an example common cathode passive SPAD quenching and recharge circuit is shown in FIG. 5A. A diagram illustrating the corresponding voltage response at the front-end circuit is shown in FIG. 5B. The circuit, generally referenced 70, comprises a SPAD 72, buffer 74, and quench circuit 76.

Normally, SPADs operate by generating an avalanche current triggered by one or more photons. In order to avoid permanent damage to the device, the fast and intense current is quenched as soon as possible. In its simplest form, the quenching circuit comprises a single transistor passively operating as a high impedance resistor. Trace 77 shows the voltage change due to the avalanche triggered by a photon and the actuation of the quench circuit 76 while trace 78 shows the output voltage transition after the buffer 74.

Note that it is defined as passive quenching depending on the type of SPAD, the type of quenching, and the nMOS/pMOS transistor. Active quenching may also be used such as at the beginning of SPAD sensor development when large devices were implemented, presenting intrinsic large junction capacitance, or when more controlled event response is needed. Active quenching is used in order to avoid complete discharge of the SPAD during an avalanche event and prevent the generation of an excessive number of carriers.

A diagram illustrating an example common anode passive SPAD quenching and recharge circuit is shown in FIG. 6A. A diagram illustrating the corresponding voltage response at the front-end circuit is shown in FIG. 6B. The circuit, generally referenced 80, comprises quenching and recharge circuit 82, buffer 84, and SPAD 86. Similar to avalanche quenching described supra, a second function of a SPAD front end circuit is to recharge (i.e. reset) the SPAD bias voltage to its nominal value. This function can also be implemented as passive or active recharge.

Note that since passive quenching of SPADs with large capacitance can also lead to inaccurate timing resolution, active quenching may be required, especially for off-chip quenching. In fully integrated SPAD sensors, however, especially using 3D-stacking technology, passive quenching is preferred due to simplicity. Any combination of passive or active quenching, with passive or active recharge may be used. In one embodiment, passive quenching and passive recharge circuits are implemented through a single transistor, minimizing the required area and complexity.

Note that the example front end passive quenching configuration of FIG. 5A and the front end passive recharging configuration of FIG. 6A can be used for either nMOS or pMOS configurations. In one embodiment, a quenching transistor $M_Q$ is biased to provide several tens or hundreds of Ohms of impedance, which is much larger than the internal SPAD resistance. Before the photon event, the voltage drop over $M_Q$ is zero, assuming the current flowing through the SPAD and junction leakage is zero. Thus, the bias voltage over the SPAD terminals is |VBD+VEB|. Upon the avalanche multiplication, current starts to flow over the impedance provided by $M_Q$, creating a voltage drop over the transistor, setting the SPAD bias back to VBD, quenching the avalanche current. Then, through the same $M_Q$, a recharge process begins, resetting the SPAD bias back to |VBD+VEB|. In the case of an active recharge, a circuit is used to generate a faster SPAD recharge.

In this architecture, photon timing data is precisely timestamped using a synchronized reference clock 16 (FIG. 1) derived from a stable oscillator, which simultaneously triggers the laser pulse emission. The timestamp resolution (ΔLSB) is generated on-chip through a high-speed phase-locked loop (PLL). The clock period is chosen 2× smaller than the timestamping resolution, in order to appropriately generate the internal pixel histogram control phases. It is typically set to operate between 1 to 4 GHz. By accumulating sufficient photon events, a distinct peak can be identified in the resulting histogram. Depth measurement is then straightforwardly computed as Z=c/2*h[k] *ΔLSB, where c is the speed of light and h[k] denotes the identified histogram peak bin. To achieve enhanced accuracy, precise sub-bin interpolation methods, such as quadratic or center of mass techniques, are applied, allowing refined determination of the exact photon arrival time and thus improving distance measurement accuracy.

The timing and frame structure of the dToF of the present invention will now be described in more detail. As described supra, in a dToF device, a short laser pulse (e.g., from a laser diode) is emitted into a scene and each SPAD pixel in the sensor array acts as an ultra-sensitive detector that fires when a returning photon is received. The time elapsed between the laser pulse emission and the detection of a photon by the SPAD is measured to determine the distance of the reflecting object.

Figure 7:
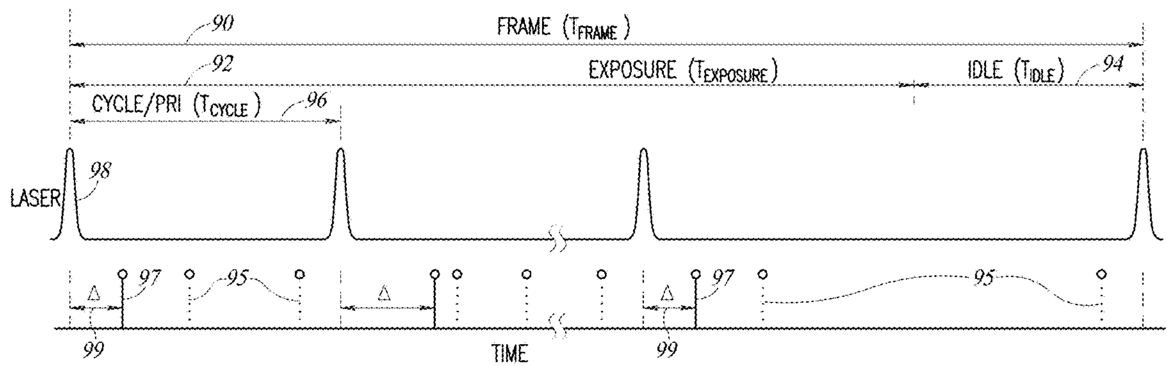
FIG. 7 is a diagram illustrating example cycle/PRI, exposure, and frame periods of the dToF sensor of the present invention.

A diagram illustrating example cycle/PRI, exposure, and frame periods of the dToF sensor is shown in FIG. 7. The timing of the sensor device is based on frames 90 whereby during the period of a frame $T_{FRAME}$, a series of laser pulses 98 are generated to illuminate one or more targets and reflections and photons from other sources 97, 95 are received and individual returning photons are counted. Each frame is made up of an exposure period $T_{EXPOSURE}$ 92 during which the laser pulses 98 are generated followed by an idle $T_{IDLE}$ period 94. The exposure period 92 includes the series of laser pulses where one laser pulse 98 is emitted for each cycle or pulse repetition interval (PRI) 96. During the idle period, the SPADs are disabled and new photon events cease to be collected. The histogram data is then read from the array, pre-processed, and read out of the device to a host.

The timing Δ 99 represents the arrival time of a photon received by the sensor reflected off the target or arriving from a background source. The photon arrival timing information may correspond to the distance from the sensor to the target or an uncorrelated source. The collection of multiple photons in the histogram is necessary to distinguish between signal (i.e. originated in the TX and reflected off a target) and background noise (i.e. other light sources external to the system). In one embodiment, only the first photon 97 received by the particular SPAD is counted. Later received photons 95 are not counted. In an alternative embodiment, a higher conversion throughput is achievable, permitting the capture of all received photons. Note that the exposure period may include thousands, tens of thousands and over one hundred thousand cycles.

Figures 8, 9, 10:
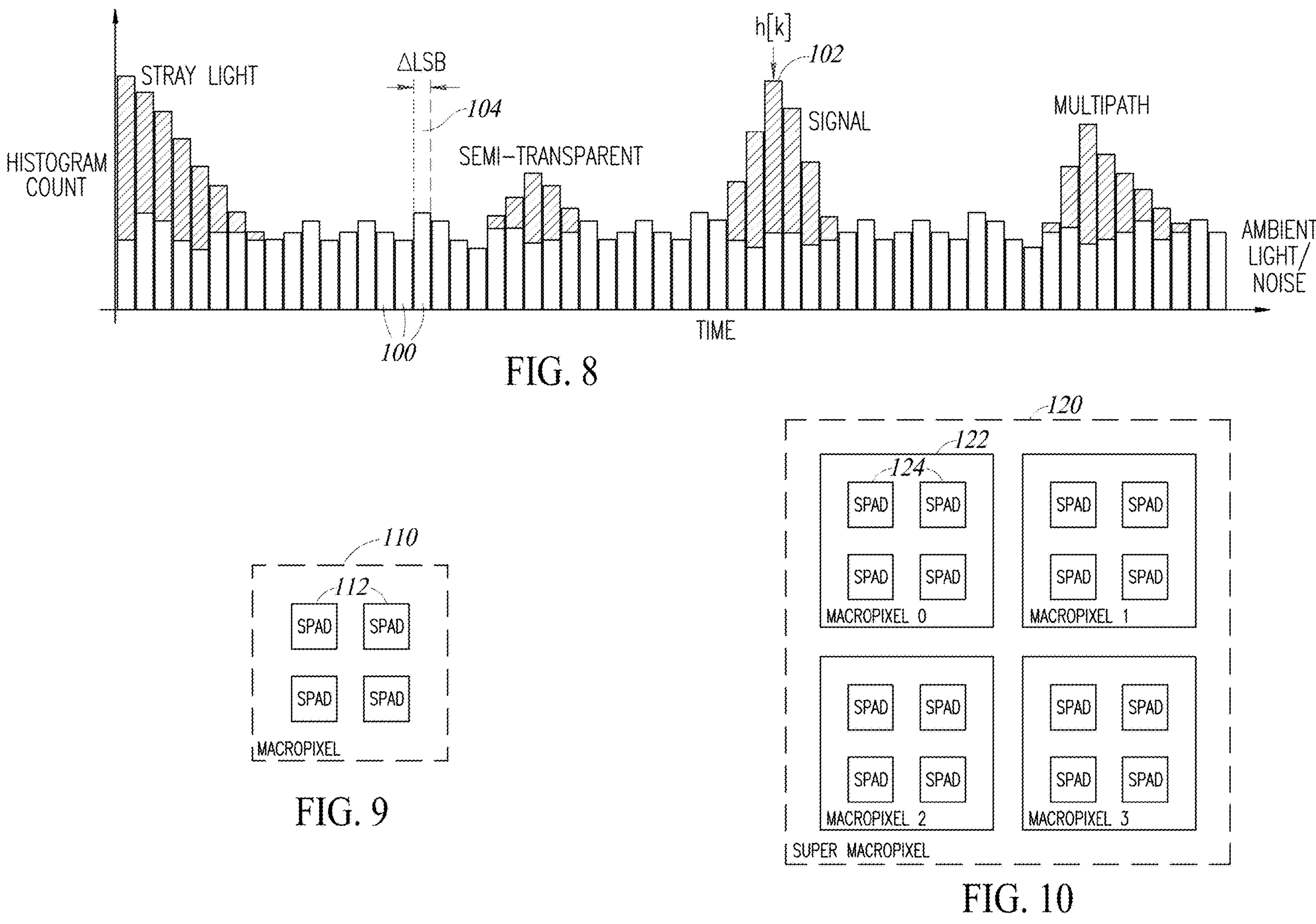
FIG. 8 is a diagram illustrating an example histogram with counts across multiple bins representing distance to targets.
FIG. 9 is a diagram illustrating an example macropixel incorporating four SPADs.
FIG. 10 is a diagram illustrating an example super macropixel incorporating four macropixels.

A diagram illustrating an example histogram with counts across multiple bins representing distance to targets is shown in FIG. 8. In one embodiment, the photons detected by the SPADs are timestamped and counted by time of arrival using a plurality of bins 100 with each bin corresponding to a particular round trip distance from the sensor. The timestamp resolution $\Delta_{LSB}$ 104 corresponds to the maximum distance raw resolution achievable by the device. The timing of the arriving photons during each cycle are timestamped using a synchronized reference clock, which also triggers the laser pulse emission. The photons received over an exposure period (i.e. a frame) are placed in respective bins and counted. Distinct peaks (represented by crosshatching in the Figure) in the resulting histogram are identified by accumulating sufficient photon events. For example, several peaks may be detected in the histogram results, such as a peak due to straylight reflected within the module and cover glass, a smaller peak due to a semitransparent target, a main signal peak h[k] bin 102 from light reflected off the target, and a peak resulting from multipath off the target. It is noted that preferably, the signal h[k] is the expected peak to enable depth to be measured. Secondary peaks can appear in the histogram, however, including straylight, semi-transparent targets (e.g., glass, etc.), multipath reflections, etc. The non crosshatched areas of the bins represents photons due to ambient light and/or noise.

The organization of the SPAD array in the dToF device will now be described in more detail. The SPADs in the sensor are organized into groups of SPADs (also referred to as pixels). Two different groups of SPADs are defined and referred to as macropixels and super macropixels.

A diagram illustrating an example macropixel incorporating four SPADs is shown in FIG. 9. In one embodiment, a macropixel 110, comprises four SPADs 112. The histograms generated by the sensor are generated for each macropixel, i.e. every four SPADs, as opposed to every SPAD. This saves significant chip area without a significant reduction in performance. Intensity, however, is generated for each SPAD. In alternative embodiments, macropixels may comprise a different number SPADs without departing from the scope of the present invention.

A diagram illustrating an example super macropixel incorporating four macropixels is shown in FIG. 10. In one embodiment, a super macropixel 120 comprises four macropixels 122, with each macropixel comprising four SPADs 124. Depending on the desired trade-off between range and resolution, described in more detail infra, the histograms generated by the sensor for each macropixel can be combined in different arrangements. Regardless of the configuration, intensity is generated for each SPAD. In alternative embodiments, super macropixels may comprise a different number macropixels without departing from the scope of the present invention.

Figure 11:
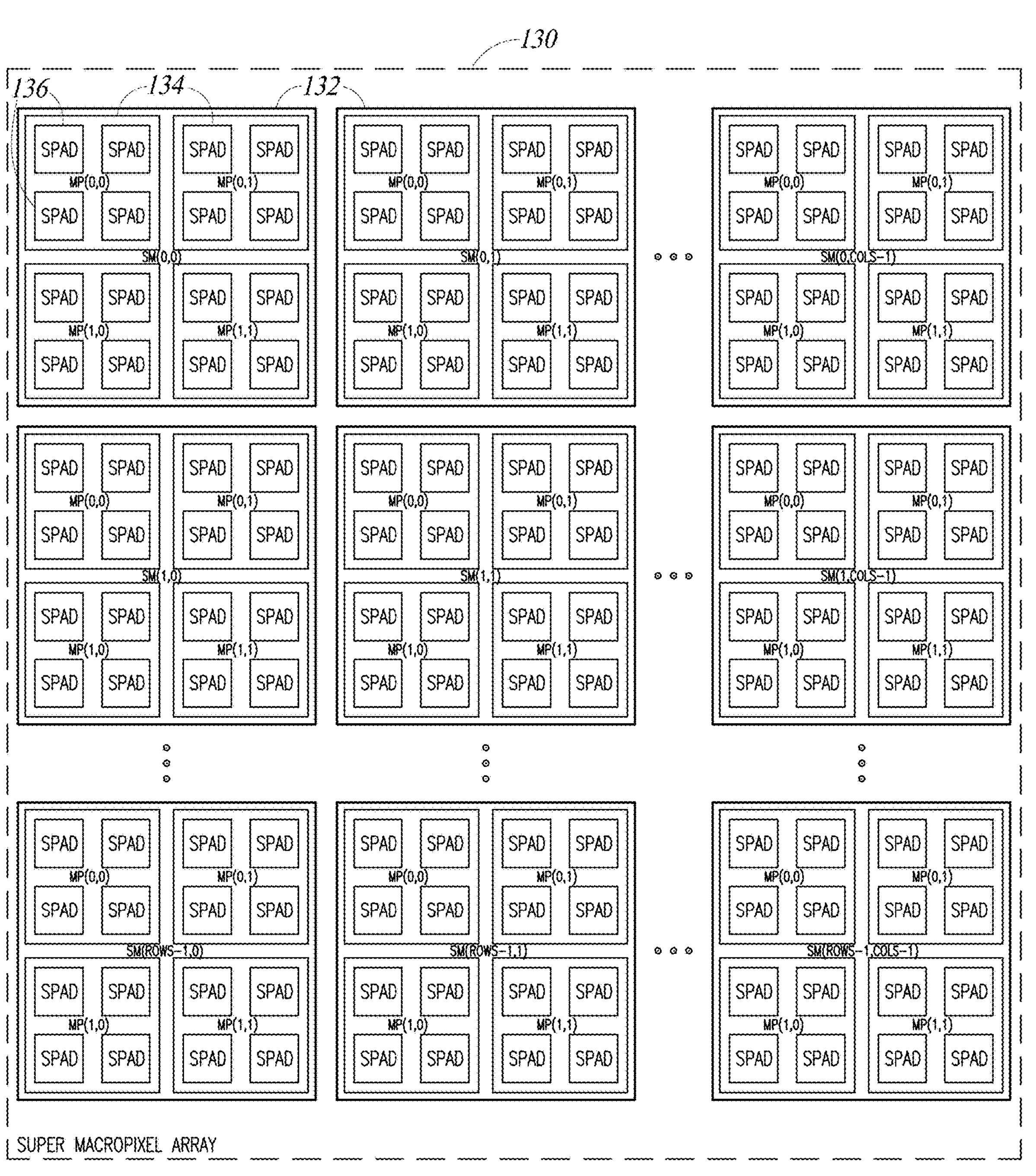
FIG. 11 is a diagram illustrating an example SPAD array organized as multiple super macropixels.

A diagram illustrating an example SPAD array organized as multiple super macropixels is shown in FIG. 11. In one embodiment, the super macropixel array 130, comprises a plurality of super macropixels 132, each including four macropixels 134, with each macropixel including four SPADs 136. In one embodiment, the super macropixels can be configured such that all or a subset of super macropixels acquire histogram and intensity data. Although not shown, the array includes row and column control signals (enable signals) that control the super macropixels in the array in accordance with masking configuration bits written to one or more configuration registers. Control of the array can be applied on a frame by frame basis.

Figure 12:
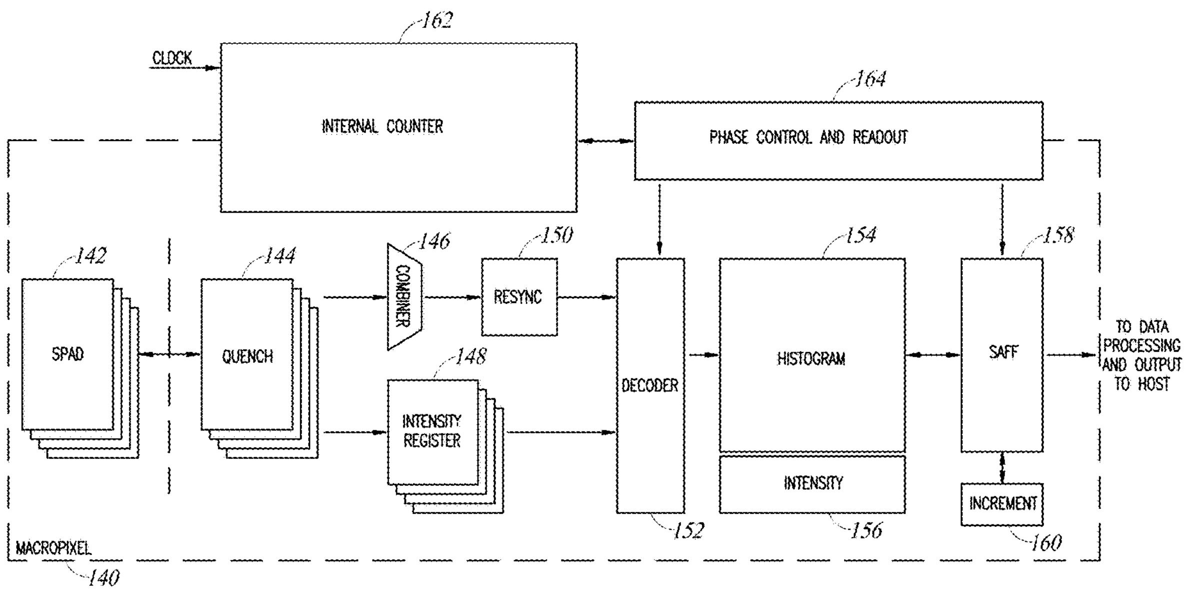
FIG. 12 is a diagram illustrating an example architecture of a macropixel of the present invention.

A diagram illustrating an example architecture of a macropixel of the present invention is shown in FIG. 12. The macropixel 140, comprises four SPADs 142, quench circuit 144, signal combiner 146, resync 150, intensity registers 148, decoder 152, histogram memories 154, intensity memories 156, sense amplifier flip flop (SAFF) 158, increment block 160, phase control and readout circuit 164, and internal counter for memory index/pointer generation 162.

In operation, the SPADs generate avalanche current events in response to detected photons. Corresponding quenching circuits 144 control the avalanche current in the SPADs to prevent excessive current on the SPADs while generating discrete electrical output pulses. The signals from the four SPADs are combined into a single signal by the combiner circuit 146 and after resynching via resync 150 is input to the decoder 152. Separate intensity data from each of the four SPADs via the four intensity registers 148 are also input to the decoder. During the exposure period, the histogram count is maintained via the histogram circuit 154. Intensity data (i.e. photon counting) is generated for all four SPADs via intensity circuit 156. SAFF circuit 158 and increment circuit 160 function to update the histogram and intensity via read/increment/write operations during a bin width period in the occurrence of an event. Once the exposure period is complete, the histogram and intensity are read out to downstream data processing and output to the host. The phase control and readout block 164 and internal counter 162 function to provide control phase signals from a single clock reference.

Figure 13A:
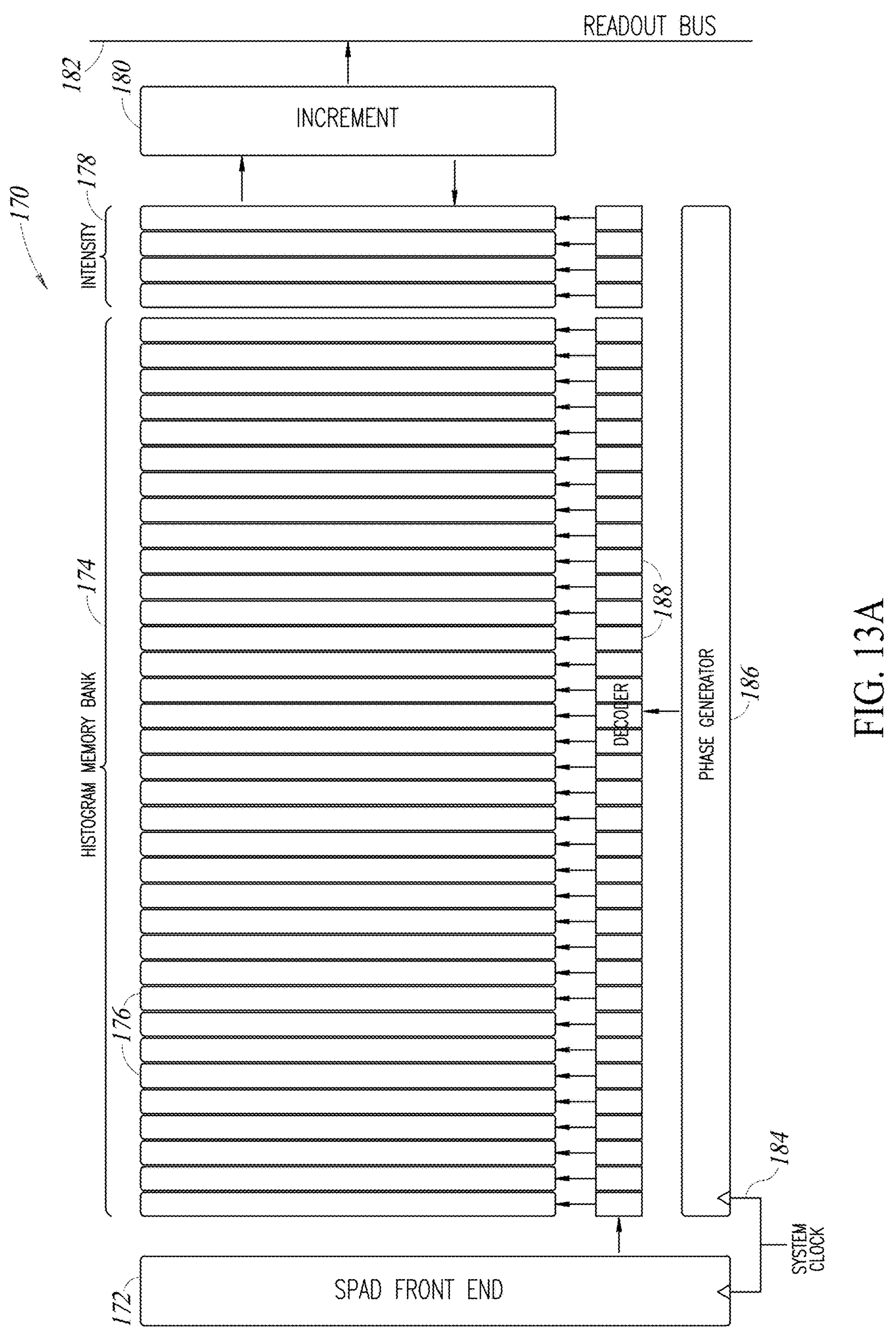
FIG. 13A is a diagram illustrating a first example architecture of the histogram accumulator associated with a macropixel.

A diagram illustrating a first example architecture of the histogram accumulator associated with a macropixel is shown in FIG. 13A. The macropixel architecture for histogram accumulation, generally referenced 170, comprises SPAD front end circuit 172, histogram memory bank 174, bins 176, intensity memory bank 178, increment circuit 180, readout bus 182, system clock 184, phase generator 186, and decoder 188.

In operation, the SPAD front end (quench, combiner, and resync circuits) is sampled using the system clock for asynchronous events occurring in the SPAD array which are converted to the digital domain. The events from the SPAD array are combined in the histogram where at each clock, one memory bin is accessed. If an event in the SPADs occurred, a corresponding memory bin is sampled, incremented, and written back. Each bin represents a time window after a laser pulse is transmitted and corresponds to a particular distance from the sensor. A photon of light received by the SPAD array will be counted in an appropriate bin depending on the time of photon arrival. In this architecture, a number of bins with a number of bits per bin are used for the histogram portion, which requires nanosecond operation. If a SPAD has fired during a particular cycle, its corresponding intensity memory element is updated after the histogram cycle. Note that the intensity memory is allocated for each SPAD individually but without any timing information which is only retained by the histogram, for the whole macropixel. It is appreciated that the histogram may comprise any number of bins having a particular bin width, depending on the desired range and resolution.

Figure 13B:
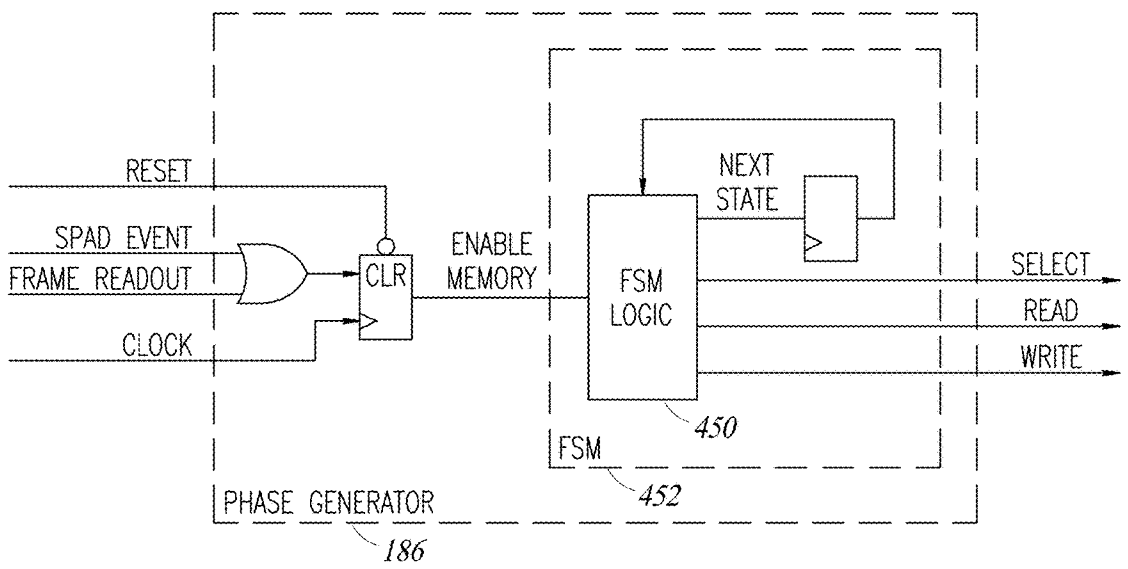
FIG. 13B is a diagram illustrating an example phase generator circuit for generating access to a memory element, including select, read, and write signals.

With reference to FIG. 13B, the phase generator 186 is operative to generate the required control signals including select, read, increment, and write signals for incrementing the appropriate histogram bins when photons are detected by the SPADs. The phase generator in the macropixel and super macropixel is an important building block in the architecture. It is responsible for generating the sequence of control signals that sequentially select the histogram bin memories, read them by sampling the bin information, and write the incremented information back into the histogram bin memory. These sequences of operations occur within a single bin allocation time $T_{BIN\_WIDTH}$ 193 (FIG. 14), corresponding to ΔLSB (FIG. 8). The input signals to the phase generator include RESET, SPAD EVENT, FRAME_READOUT, and CLOCK. These signals are used to generate an ENABLE MEMORY signal that drives the finite state machine (FSM) 452.

In operation, the presence of a SPAD event coming from the SPAD EVENT input is used to access the histogram memory elements, combined with the bin access generated by the CLOCK, indexing the memory to be selected and incremented. The FSM 452 and associated logic 450 function to generate the select, read, and write control signals. The combination of the index and activity on the SPAD EVENT line increments the particular memory pointed to by the index. It is important to note that without a SPAD EVENT the particular histogram memory bin is not accessed. During the intensity memory update, the SPAD EVENT information comes from the intensity registers 148 (FIG. 12) instead, dictating whether the intensity memory will require update or not.

Based on the events sampled, the decoder accesses the corresponding bin in the memory bank to be incremented. The histogram bins are updated each cycle and at the end of an exposure period (i.e. frame) the contents are read over a readout bus, out of the detector array, and processed on-sensor and transmitted to a host.

Figure 14:
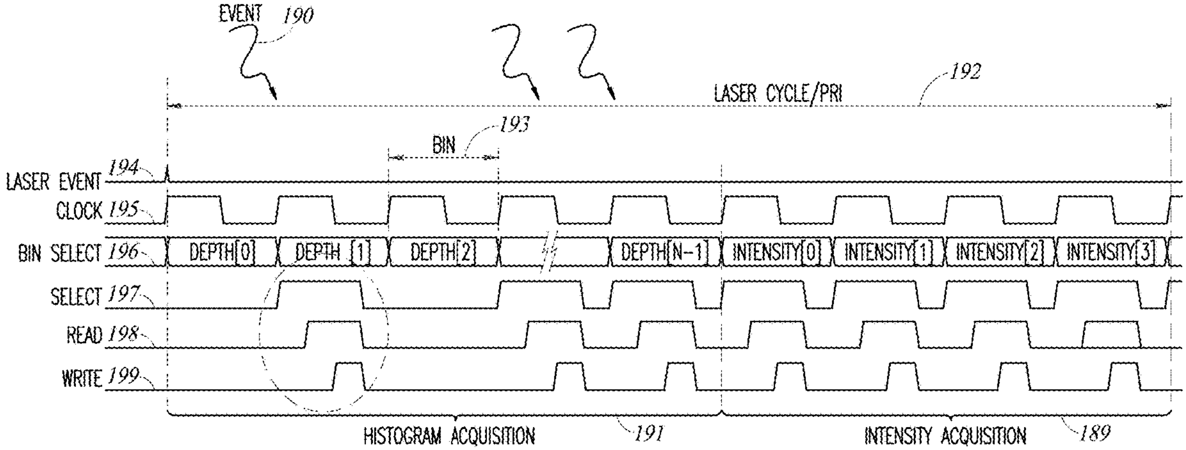
FIG. 14 is a timing diagram of example histogram accumulation and intensity processing including select, read and write timing, and memory select.

A timing diagram of example histogram accumulation and intensity processing including select, read and write timing, and memory select is shown in FIG. 14. The timing for a single laser cycle/PRI 192 is divided into histogram acquisition portion 191 and an intensity acquisition portion 189 and begins with a laser event 194. Photons are received by the SPADs and represented by event arrows 190. Clock 195 drives the cycle with memory access 196 occurring every cycle of the clock. Each memory access cycle corresponds to a particular bin corresponding to a distance or depth, i.e. depth[0], depth[1], through depth[N−1]. Following the depth bin access, the intensity memory locations are updated, one for each SPAD. In this example, there are four intensity update cycles corresponding to four SPADs per macropixel. The select line 197 controls access to the memory locations for each bin where the select line is only active for those bins with an event occurrence. In this example, there are three bins with event occurrences and hence the corresponding select lines are active. For the bins selected, the read 198 and write 199 lines are asserted to control the reading, incrementing, and writing of the memory.

Figure 15:
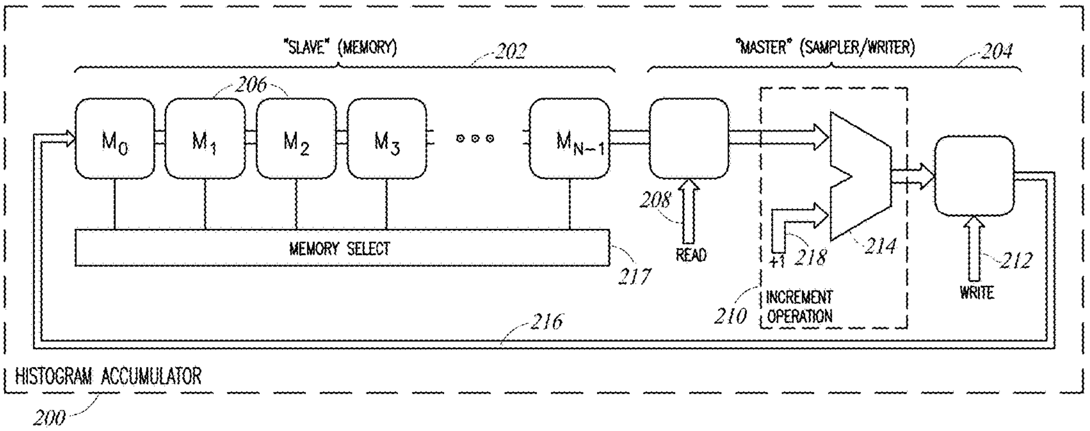
FIG. 15 is a diagram illustrating a second example architecture of the histogram accumulator associated with a macropixel.

A diagram illustrating a second example architecture of the histogram accumulator associated with a macropixel is shown in FIG. 15. The histogram accumulator 200 comprises N memory locations or bins $M_0$, $M_1$ through $M_{N-1}$ for storing photon counts during an exposure period, memory select 217, read 208, increment operation 210, +1 operand 218, and write 212. The accumulator is divided into two portions, including a slave (i.e. memory) portion 202 and a master (i.e. sampler/write) portion 204.

Operation of the accumulator 200 is similar to that of the accumulator 170 (FIG. 13) described supra. To reduce the circuitry and area required for the accumulator, rather than each bin memory location having a dedicated read, increment, write circuit, such as a register/flip-flop, the functionality is divided into separate memory locations for each bin coupled with a sampler/writer circuit that is shared by all the memory locations. Since only one bin memory is accessed per cycle, there is no need to duplicate the sampler/writer circuitry. Each cycle, depending on whether an event occurred, the N bin memories are sequentially selected, then read, incremented via adder 214, and written back to memory.

Figure 16:
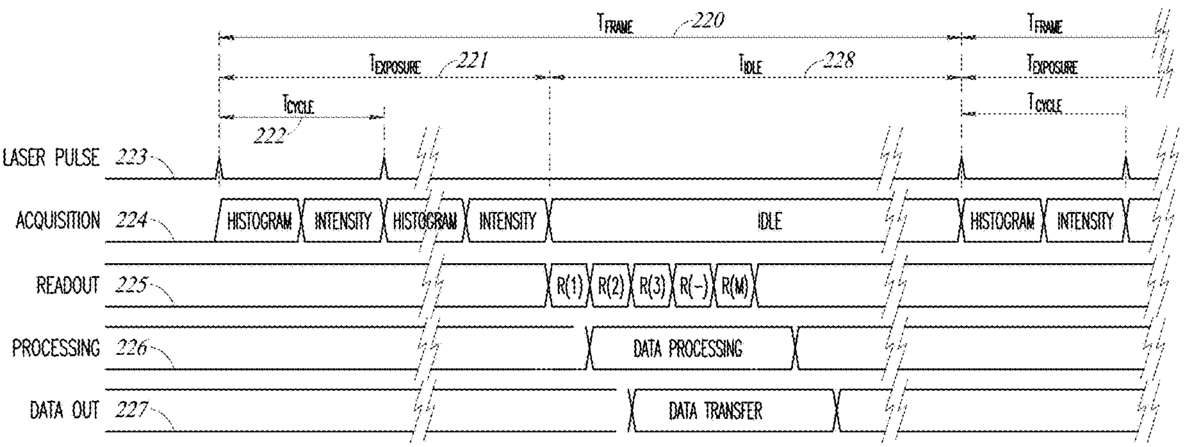
FIG. 16 is a timing diagram of example operation process, including histogram and intensity accumulation, data readout, on-sensor processing, and data off-chip transfer timing.

A timing diagram of example histogram accumulation and intensity processing including readout, processing, and data output timing is shown in FIG. 16. The timing for an entire frame $T_{FRAME}$ period 220 is divided into an exposure period $T_{EXPOSURE}$ 221 and an idle period $T_{IDLE}$ 228. The exposure period consists of multiple cycles/PRIs $T_{CYCLE}$ 222. Each laser cycle/PRI 222 is divided into a histogram acquisition portion 229 followed by an intensity acquisition portion 239 and begins with a laser event or pulse 223. During the idle period, the readout 225 of the accumulated histogram and intensity data occurs. The data readout is then processed 226 in data processing period and after data processing it is then transferred 227 off the sensor to a host during a data transfer period.

Histogramming Utilizing TDC Circuits

As discussed supra, the present invention provides a direct time-of-flight (dToF) sensor with single photon avalanche diode (SPAD) arrays. In operation, the system emits short laser pulses from laser diodes onto the scene and each SPAD pixel in the array acts as an ultrasensitive detector that fires when a photon returns. The time elapsed between the laser pulse emission and the detection of a photon by a SPAD is measured to determine the distance of the reflecting object. In one embodiment, the SPAD arrays are implemented with high speed time-to-digital converter (TDC) circuits that timestamp photon events. Accumulating many photon timing measurements enables the distance to objects to be estimated even under strong ambient/noise illumination. This single photon sensitivity allows the dToF sensor to reach long range and operate under low reflectivity or high ambient light conditions.

In one embodiment, each SPAD photon detection is timestamped with sub-nanosecond precision, using a dedicated TDC circuit. A disadvantage of this, however, is that high resolution TDC circuits are bulky and power hungry, are prone to PVT variations and noise that require extensive calibration, and often have limited conversion throughput, generally suffering from pile-up distortion. This architecture either (1) time multiplexes or shares TDCs among multiple pixels, or (2) uses a small number of column/global TDCs, which limits parallelism and slows per-frame acquisition. This constrains the spatial resolution or frame rate of the sensor, since not all pixels can time stamp events concurrently. In short, fine resolution TDCs do not scale well to large, dense arrays, forcing difficult trade-offs in sensor resolution and speed.

In this embodiment, the dToF imager generates a large volume of timestamp data as every SPAD may yield a time value to read out. Lacking an effective compression or filtering strategy, a high performance SPAD array can overwhelm the readout circuitry with billions of time stamps per frame. Attempting to capture all photon events end up generating huge data streams that are impractical to transfer or process in real time. To overcome this problem, the data can be limited (e.g., by only capturing the first photon or by windowing the detection time), which reduces information and impairs dynamic range. Thus, balancing data volume with information fidelity is challenging as either excessive timestamp data is generated or important depth information is lacking.

Another disadvantage of this embodiment is that combining a large SPAD array with high-speed timing circuits and fast readout consumes substantial power. Continuously running TDCs and clock circuits at gigahertz rates for fine timing resolution drains power, as does driving high speed output interfaces for large data throughputs. This can be overcome by improving throughput by increasing parallel TDC channels. This, however, consumes excessive power to operate all the circuits. Conversely, power can be saved by using fewer timing circuits but this sacrifices measurement accuracy or speed. This power vs performance trade-off associated with this embodiment is problematic for battery powered devices that require efficient operation, e.g., AR/VR headsets or mobile depth cameras.

Further, considering that in typical real-world scenes, a single laser pulse may reflect off multiple objects at different distances, and the device may be in the presence of strong ambient light, yielding multiple return photons at different times. Using a single stopwatch architecture that records one timestamp per pixel per frame, e.g. the first photon, cannot reliably distinguish multiple returns. Such a system may perform multiple sequential measurements with shifting delay windows (i.e. multi-shot gating) to build up a depth histogram over time. This multi-shot approach, however, lengthens the acquisition time and lowers the frame rate. In addition, strong ambient light or high photon flux can lead to detector saturation and pile-up distortions since only one event is recorded per cycle.

Time of flight devices using this embodiment have difficulty capturing full depth distributions for each pixel within a single frame, which limits their ability to handle scenes with multiple reflections or high background noise without resorting to slow or power intensive methods.

Embodiments that scale up the number of TDC circuits or frames, however, are not a practical or efficient solution. In an alternative embodiment described in detail infra, the dToF sensor uses in-pixel histogramming of photon arrival times to extract more depth information per pixel in parallel, while using minimal area and power. The architecture described achieves a performance trade-off balance of neither consuming too much power nor outputting impractically large amounts of data.

In-Pixel Histogramming Without Utilizing TDC Circuits

In another embodiment, the dToF system performs in-pixel histogramming of photon arrival times. In such an architecture, each pixel (or group of pixels) incorporates both local memory and digital logic to record a histogram of photon detection events occurring over the exposure period of the sensor. Rather than latch a single timestamp or send out every event, the pixel accumulates counts in discrete time bins, with each time bin corresponding to a different delay interval after the transmission of the laser pulse. Thus, the pixel itself builds a local distribution of times-of-flight for the received photons. This architecture has several advantages described below.

Parallel, single-shot capture of depth distributions are possible since each pixel gathers an entire histogram in situ during a single laser pulse exposure. This enables multiple return peaks to be captured simultaneously without requiring the need for multi-shot gating sequences to resolve different distances. In other words, a single shot can record a near object return in an early time bin and a more distant object in a later bin. This allows reliable detection of multiple objects per pixel per frame and improves the sensor dynamic range of the sensor and multi-object detection capability. It also mitigates pile-up effects by accommodating high event rates. Even if many photons arrive, they are tallied into histogram bins rather than saturating a one-shot timestamp register.

This architecture also requires significantly reduced data bandwidth as outputting a compact histogram (i.e. a set of bin counts) per pixel frame significantly compresses the data compared to streaming out every single photon timestamp. For example, a pixel may output on the order of 50 to 100 bin values per frame instead of thousands of individual event times. This significantly lowers the I/O data volume and bandwidth requirements, alleviating a major bottleneck in conventional dToF systems. The histogram now is essentially an on-chip aggregated result, which allows sequential processing of the raw histogram data during the readout process, reducing the processing burden and enabling higher frame rates without overload.

In addition, the architecture improves frame rate and throughput by parallel operation of the system. The use of in-pixel histogramming allows all pixels to time count events concurrently rather than sequentially, which requires waiting for shared TDC resources. Now, the entire sensor collects a full depth map in one laser exposure period, supporting much higher frame rates for a given number of photons per frame. Further, since data readout is reduced and more processing is performed locally, the sensor is able to sustain fast frame output without hitting memory or bus limitations. Such an architecture is useful for applications requiring high speed 3D imaging (e.g., greater than 30 frames per second) where conventional architectures would underperform.

Another advantage is lower power requirements through localized processing. In-pixel histogram architecture shifts the workload of accumulating photon counts into efficient relatively small memory cells and simple logic within the pixel itself, as opposed to continuously running high speed global timing circuits in conventional architectures. This event aggregation at the pixel level translates to fewer toggling signals and off-chip transmissions per event, which lowers power consumption. Since the sensor only outputs binned photon counts, it is more energy efficient than one that outputs a torrent of timing data. The histogram-on-pixel dToF sensor of the present invention exhibits significant power savings and improved energy per depth point compared to conventional TDC based readouts.

Lastly, this architecture enables scalability to high pixel densities. Using high density memory technology (e.g., SRAM or other compact storage) integrated beneath (or alongside) each SPAD, in-pixel histogramming enables the use of counter circuits for multiple time bins in relatively small pixels. This is a significant advantage as SPAD pixel pitch is reduced over time for higher resolution imagers. Embedding the histogram storage within the pixel layer (e.g., in a 3D-stacked die) means the sensor array can scale to megapixel resolutions without requiring large chip area for external timing circuits. Thus, this architecture enables fine spatial resolution (i.e. small pixels, large arrays) while still providing per-pixel time-of-flight detail. Placing memory locally under the SPAD array can realize the required histogram counter logic even at device pitches that are not practical for conventional TDC circuits, thus maintaining depth precision at small pixel scales. This results in an imaging sensor having both high spatial sampling and accurate per-pixel distance measurement capability.

Due to the advantages described supra, in-pixel histogramming is a practical for a dToF sensor as it combines the single photon sensitivity of SPAD arrays with on-chip data accumulation to overcome the power and throughput limits of conventional solutions. By generating a detailed, high-quality time-of-flight histogram within each pixel, this architecture generates depth maps with improved fidelity (i.e. capturing full depth distributions) at faster speeds and with lower power than conventional designs. This enables the dToF of the present to meet the stringent requirements of AR/VR, automotive LiDAR, and other advanced depth sensing applications in ways not feasible with conventional technology.

Linear Feedback Shift Register (LFSR) Circuit Based Histogramming

Typical in-pixel histogram implementations for direct Time-of-Flight (dToF) sensors commonly utilize binary incrementation methods for histogram memory updates. In these conventional binary architectures, each detected photon event directly increments the corresponding binary-coded memory location, enabling straightforward memory access without additional decoding complexity. Although this binary incrementation method is relatively simple, it faces significant operational challenges in high-speed scenarios, particularly those requiring sub-nanosecond update intervals. Rapid toggling of binary memory cells at such high frequencies significantly increases power dissipation, silicon area, and wiring complexity, severely constraining scalability, especially for dense arrays with small pixel pitches crucial for compact sensor designs.

To overcome these limitations, a linear feedback shift register (LFSR) based histogram incrementation architecture is disclosed. In this architecture, histogram increments are performed through LFSR circuits, which inherently offer rapid sequential updates with substantially reduced power consumption compared to conventional binary incrementation methods. While LFSR incrementation naturally requires decoding or look-up tables (LUTs) to translate pseudorandom sequences to binary addresses, this invention introduces a unique partitioning strategy. By segmenting the LFSR sequence into smaller groups, the LUT or decoder complexity is significantly reduced, enabling efficient translation.

This innovative group partitioning significantly decreases the decoder overhead, making it feasible to perform rapid, high-frequency histogram increments within compact pixels. Consequently, the LFSR-based incrementation architecture provides enhanced scalability, efficient silicon area utilization, reduced power consumption, and robust sub-nanosecond operational capabilities. These advantages enable practical implementation in dense, high-resolution dToF sensor arrays, suitable for demanding applications such as augmented and virtual reality systems, automotive LiDAR, medical imaging, and advanced robotics.

Figure 17:
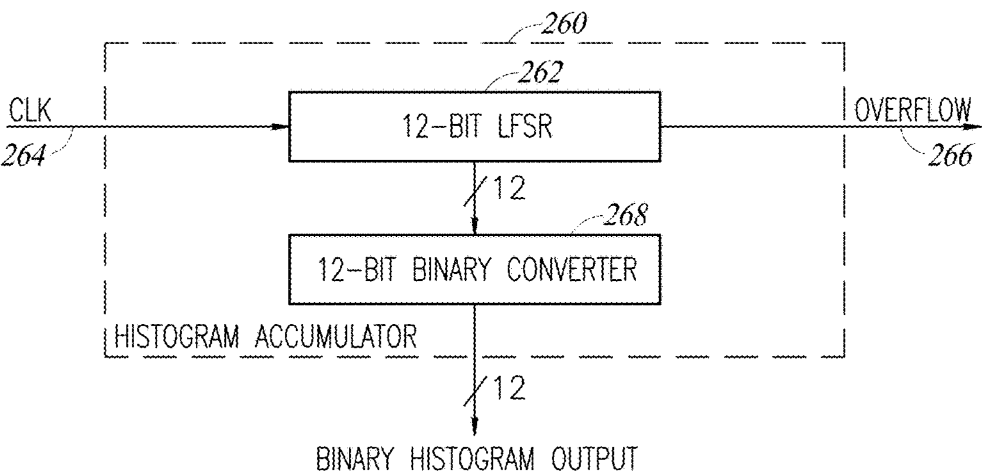
FIG. 17 is a diagram illustrating an example 12-bit LFSR based histogram and intensity accumulator.

A diagram illustrating an example 12-bit LFSR based histogram and intensity accumulator is shown in FIG. 17. In one embodiment, a single M-bit wide LFSR circuit is used to implement the histogram accumulator 260. For example purposes only, a 12-bit LFSR 262 is shown and described which provides for a total count of 4096 without the use of additional circuitry to handle overflows or wrap arounds. It is appreciated the histogram accumulator may comprise an LFSR of bit widths other than 12-bits. A clock input 264 causes the LFSR to move to the next value in the sequence. Note that the LFSR circuit includes zero detect logic which both allows the accumulator to enter the zero state which a LFSR normally does not enter as well as exit the zero state thus providing for 4096 rather than 4095 states in the sequence. An overflow output 266 is generated when the LFSR count completes its sequence and rolls over to the beginning.

Accordingly, in this example each time bin in the histogram and each intensity element as well contains 12-bits. In one embodiment, the LFSR is constructed via a simple shift register except for bit 0, which is the polynomial composition of the other bits referred to as taps. Note that this is in the case of a Fibonacci LFSR structure while other configurations such as a Galois LFSR are also possible. Well-known algorithms and tables exist to define the taps in order to utilize all the states of the LFSR. One of the states as described supra is forbidden (i.e. the all zeros state) that the LFSR becomes stuck in and must be avoided. A zero detector is be added (e.g., a NOR combination described infra) to allow the inclusion of the zero state thereby allowing all 4096 unique states.

Since a LFSR is used as a counter with a pseudo-random sequence, a look up table (LUT) or decoder is required to convert its value into binary. Thus, 12-bit binary converter 268 (LUT or decoder) functions to convert the nonbinary output of the LFSR to a binary value. The binary histogram output from the converter then undergoes subsequent data processing. Alternatively, a similar LSFR can be used, which requires up to $2^N-1$ clocks to decode a value to binary, which is impractical. The LUT would require a memory with 212 positions to fully map the LFSR values to binary, which can be very large and slow. Considering the output speed during readout, parallel decoders are needed, therefore, the number of LUTs in this case also quickly becomes impractical.

To overcome this problem, the LFSR is divided into multiple groups. For example, the 12-bit LFSR is split into two identical groups of 6-bits, which enable the reuse of the decoder, since the decoder only requires $2^6$ or 64 positions instead of $2^{12}$ or 4096 positions, thus significantly reducing the required decoder size by 98.4%. Due to identical codes, the same decoder can be shared to convert both the LSB and MSB groups.

Figure 18:
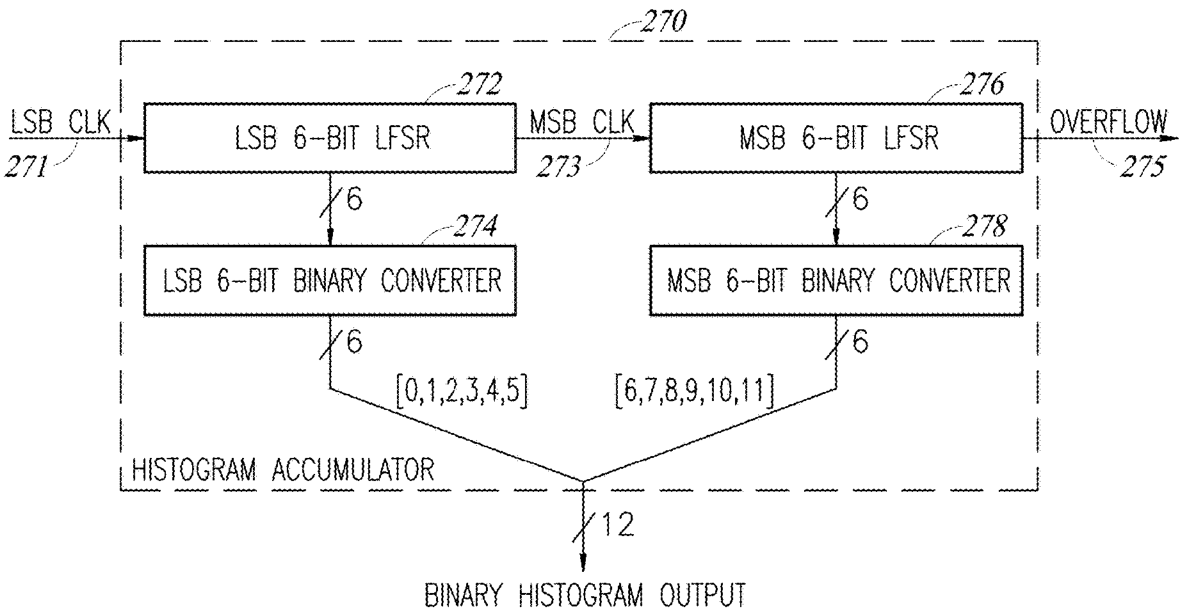
FIG. 18 is a diagram illustrating an example dual 6-bit LFSR based histogram and intensity accumulator.

A diagram illustrating an example dual 6-bit LFSR based histogram and intensity accumulator is shown in FIG. 18. The histogram accumulator 270, comprises two 6-bit LFSR circuits, a LSB 6-bit LFSR 272 and a MSB 6-bit LFSR 276. An LSB clock 271 moves the LSB 6-bit LFSR to the next value in the 64 value sequence. A 'carry' bit serves as the MSB clock 273 to the MSB 6-bit LFSR. An overflow output 275 is generated when the MSB LFSR count completes its sequence and rolls over to the beginning. An LSB 6-bit binary converter 274 and an MSB 6-bit binary converter 278 (i.e. LUTs or decoders) function to convert the LFSR output to binary form. The six LSB bits [0, 1, 2, 3, 4, 5] and six MSB bit [6, 7, 8, 9, 10, 11] are combined and make up the 12-bit binary histogram output, which then undergoes subsequent data processing.

Figure 19A:
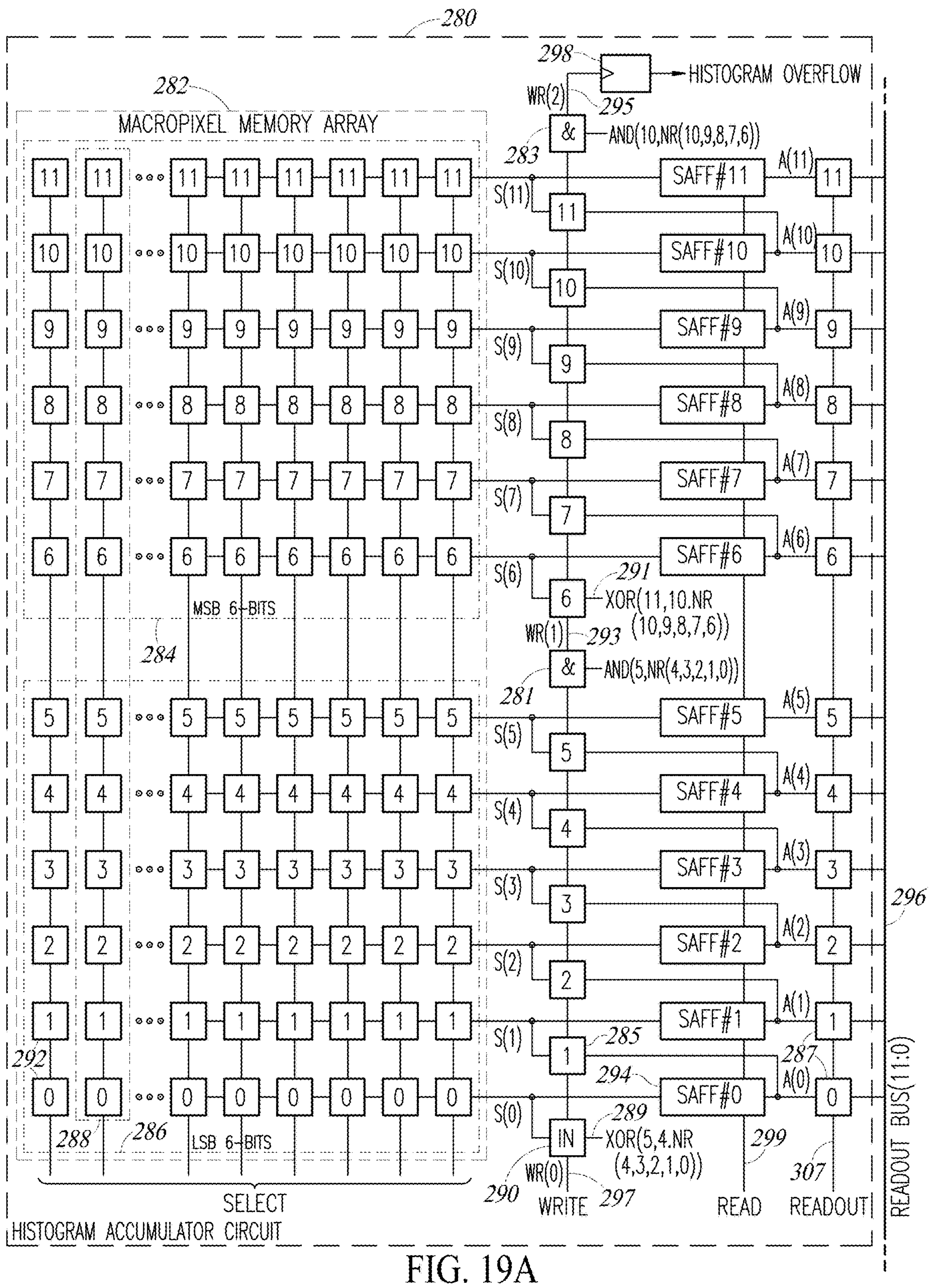
FIG. 19A is a diagram illustrating an example dual 6-bit LFSR based histogram and intensity accumulator circuit, including memory array.

A diagram illustrating an example LFSR based histogram and intensity accumulator circuit is shown in FIG. 19A. The histogram accumulator circuit 280 comprises a macropixel memory array 282 that includes an MSB 6-bit memory portion 284 and an LSB 6-bit memory portion 286, which make up the 'slave' portion of the counter (i.e. the storage element). Both LSB and MSB memory arrays comprise a plurality of memory cells 292 organized into 12-bit columns 288 each corresponding to one bin of histogram memory. The total number of columns of memory cells is equal to the number of bins in the histogram.

The 'master' portion of the accumulator comprises a plurality of SAFFs 294 for sampling and temporarily storing the contents of a selected bin column memory in accordance with read signal 299 and logic circuit for generating the LSB feedback signal 289 XOR(5, 4, NOR(4, 3, 2, 1, 0)) for input 290 bit 0. FIG. 19B describes this logic circuit in more detail, including XOR gate 303 and NOR gate 305. Similarly, the logic circuit for generating the MSB feedback signal 291 XOR(11, 10, NOR(10, 9, 8, 7, 6)) for bit 6 shown in FIG. 19A and in more detail in FIG. 19C, including XOR gate 308 and NOR gate 301. The logic circuit 306 in FIG. 19B for generating the LSB 'carry' bit WR(1) 293 (FIG. 19A) using AND(5, NOR(4, 3, 2, 1, 0), WR(0)) for cell 281 is also shown, which is active when the LSB 6-bit LFSR completes a sequence and rolls over to start the sequence again. Similarly, logic circuit 304 for generating the MSB overflow bit WR(2) 295 (FIG. 19A) using AND(11, NOR (10, 9, 8, 7, 6), WR(1)) for cell 283, which is active when the MSB 6-bit LFSR completes a sequence reaching a maximum count, and histogram overflow register 298. The values S(0) through S(11) are the differential data read from the macropixel memory array and sampled in the SAFF #0 through SAFF #11, respectively, in accordance with read command 299. The output of the SAFFs, A(0) through A(11) undergo a shift right to implement the LFSR and along with the feedback to bits 0 and 6 as well as the 'carry' bit 281 are written back to the memory array in accordance with write signal 297.

After the exposure period, with the self-contained operation of the histogram, the memory is read out of the array through a similar mechanism. Each 12-bit memory element is selected and read to sample the information in the memory array and the A(0) through A(11) values are readout to the readout bus 296 in accordance with readout command 307.

It is noted that performing the histogram accumulation through the memory operations including select, read, increment, and write in real time, over a short time duration of a single histogram bin is challenging, even for advanced CMOS technology. The more complex the circuit and the number of bits, the more challenging for a binary implementation due to internal logic delays. Typically, shift registers are fast and synchronous, which means that the time to output is always constant, but typically with ring counters, the number of states is much fewer than the $2^n$ bits of a binary counter. Thus, the accumulator of the present invention uses a linear feedback shift register (LFSR), which is fast, has constant time to output delay, and with minimal feedback, which increases its potential speed. It does have a forbidden state of all zeros, but with a zero detector circuit (NOR), the zero state can be recovered. For use as a counter, however, it needs decoding of the information into binary. In one embodiment, a de-serializer is used, but it consumes too much time and power. A look up table (LUT) can be used but since there is very little correspondence between the LFSR vector and its binary, a $2^n$ LUT is needed, which means, a $2^n$, 12-bit LUT to decode it. This translates to a ~50 kbit memory for the decoder alone. If multiple LUTs must be used due to speed limitations, LUTs become infeasible.

To address this problem, the memory is split into multiple groups. In the example provided supra, the 12-bit memory is split into two groups of 6-bits, with a mechanism to increment the second group (6-bit MSB) when the first (6-bit LSB) overflows. In this case, only a 26*12-bit LUT (768-bit) is needed. The LUT (or equivalent logic decoder) can be reused to decode both groups of 6-bits, in two steps, to generate the binary information.

It is noted that the main advantage of the above described implementation is speed and area. Once sampled, all but one of the bits are available to be recorded, with the exception of the first bit of each group, which is also a combination of two logic gates (XOR and NOR). This means that the memory bin can be operated at a much faster rate and much more reliably.

Regarding histogram monitoring, use of a non-binary histogram monitoring architecture is challenging in that no straightforward calculation is possible without converting the information into binary, which might take excessive area not available in the macropixel. The most immediate monitoring scheme is the histogram overflow, which means that if any memory element reaches the maximum count, the system would generate a flag bit to stop the acquisition, since extra information would probably saturate and distort the output information. In one embodiment, the histogram overflow bit is generated by monitoring the last possible code for the LFSR (similar to what happens between incrementing one group of bits to the next).

Clock Distribution

Regarding clock distribution, the macropixel operates under a single system wide clock (system clock) generated by the phase locked loop (PLL) and distributed over the sensor array that is responsible for synchronizing the data acquisition into the histogram and any variation of the clock, including random jitter and skew, will generate errors/bias/offsets in the histogram acquisition and affect the overall depth performance of the system. It is preferable to minimize potential skew of the clock delivery between the macropixels, since clock skew will produce depth biases that would need to be calibrated for the final depth estimation. Although possible, this would consume memory and power, while also shortening the overall overlapped measurement range.

Examples of possible clock distribution include (1) a row wise (or column wise) distribution, with a clock tree externally, driving a group of rows and internally with another distribution; (2) star distribution; and (3) an H-tree distribution with potentially grouping several super macropixels in another architecture.

The clock is used internally to sample the SPAD front-end, i.e. asynchronous events coming through the SPADs and converted to digital domain. Such events, from a plurality of SPADs (called a macropixel), are combined in the histograms, where at each clock, a new memory is indexed and in the presence of an event the current memory is sampled, incremented, and stored again. In this architecture, a number of bins with a number of bits per bin are used for the histogram part, which requires nanosecond operation. After each cycle, the intensity memory elements are updated if a SPAD has fired during that cycle. The intensity memory is individually allocated for each SPAD but without the timing information.

In one embodiment, the sensor is able to operate in regions of interest, which could be rectangular, sparse, row wise, column wise, etc. The macropixels have a feature to turn off, but depending on the clock distribution scheme, the clock could also be gated.

Accumulator Memory Bank Circuit

Figure 20:
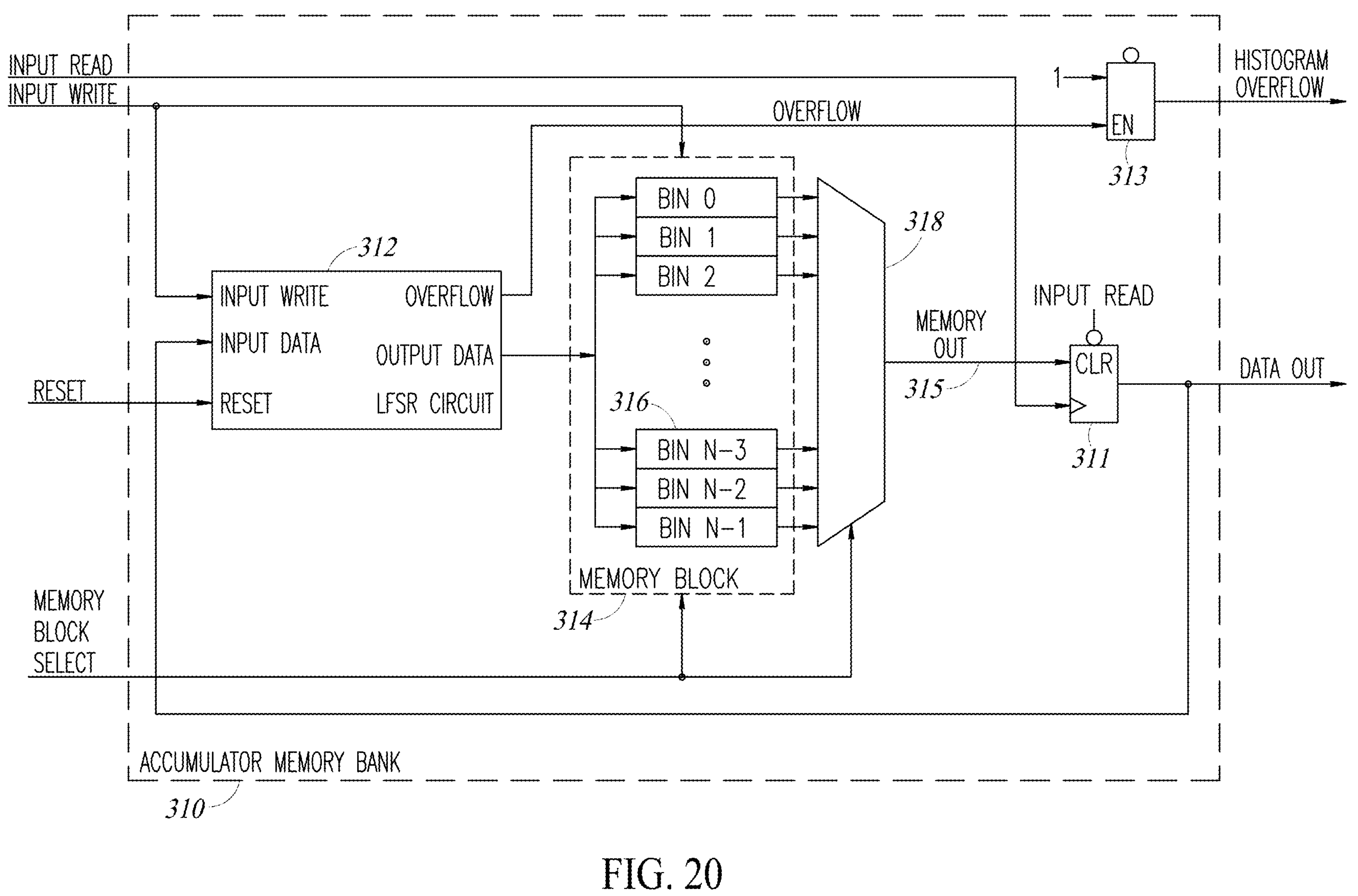
FIG. 20 is a diagram illustrating an example accumulator memory bank circuit portion of the histogram and intensity accumulator circuit.

A diagram illustrating an example accumulator memory bank circuit portion of the histogram accumulator circuit is shown in FIG. 20. The accumulator memory bank 310 comprises an LFSR circuit block 312, SRAM memory block 314 having N bin memory locations 316, bin 0 through bin N−1, multiplexer 318, and histogram overflow register 313 and input read register 311.

In one embodiment, the memory bank comprises an SRAM based block that operates using pointers, selecting only memories that require accumulation. If the memory does not require incrementation, it will not be selected at all. Before operation, the random values stored in the memory elements are reset, which is performed via the RESET control signal.

In operation, upon a particular memory position being selected via the MEMORY BLOCK SELECT signal, MEMORY OUT 315 of the multiplexer 318 receives the information currently stored in one of the bins of the memory block. This data is sampled by a positive edge of an INPUT READ signal, and is accessible at DATA OUT. This value is processed in the LFSR circuit block 312, which functions to generate the next code (i.e. incrementation), which is stored back into the same bin in the memory block when INPUT WRITE is asserted. As discussed infra, the use of the LFSR circuit to increment the memory value without using an adder circuit is less costly in area and speed. The HISTORGRAM OVERFLOW is a register that is active when any memory bin reaches its maximum value. This value is reset when RESET is applied.

Figure 21:
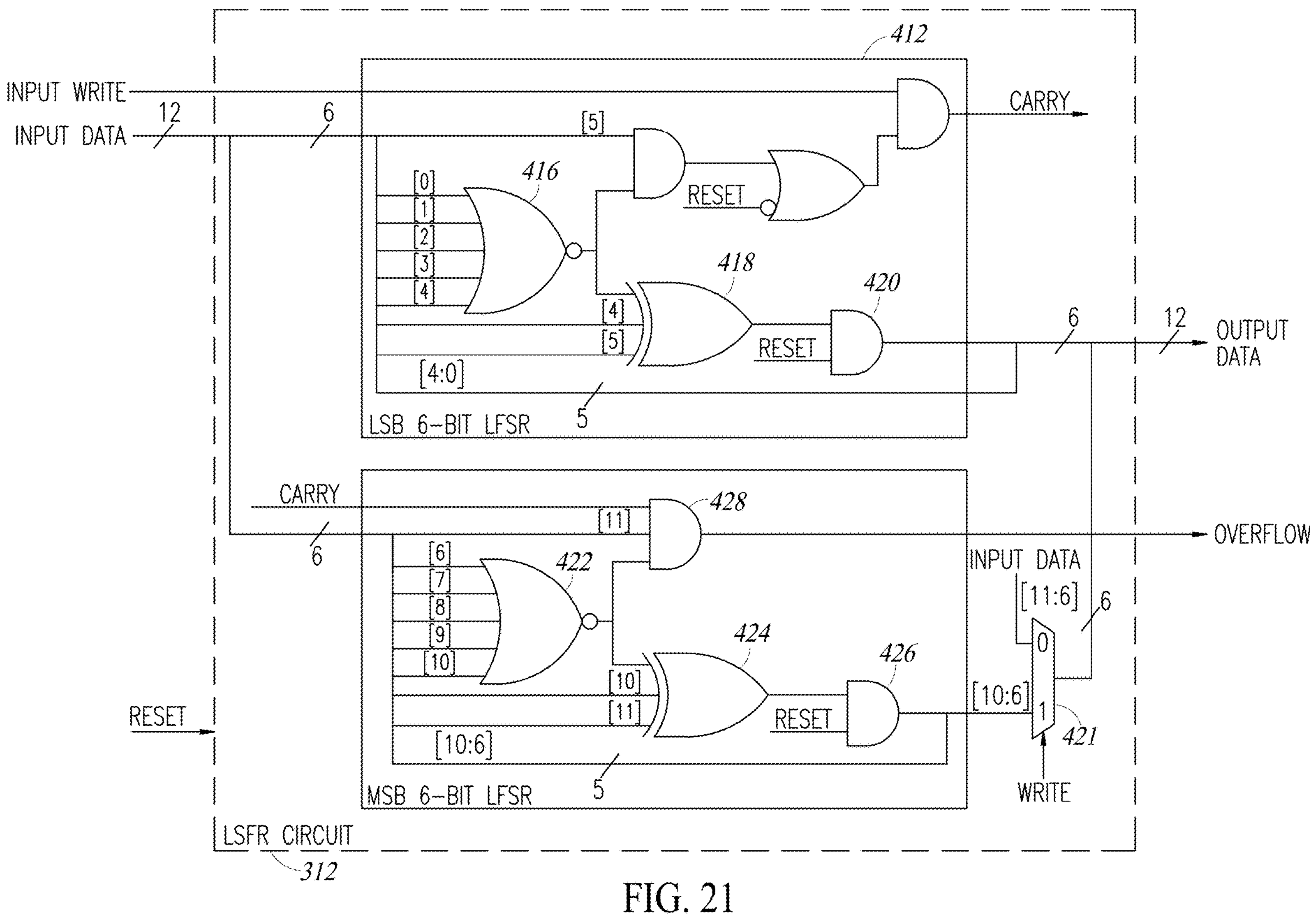
FIG. 21 is a diagram illustrating an example LFSR circuit for histogram and intensity accumulation of photon counts.

A diagram illustrating an example LFSR circuit of FIG. 20 in more detail for histogram and intensity accumulation of photon counts is shown in FIG. 21. The LFSR circuit 312 of functions to generate the 12-bit OUTPUT DATA to the memory block 314 from the 12-bit DATA OUT fed back to the INPUT DATA input of the LFSR circuit. It also generates the OVERFLOW signal as well. The circuit 312 comprises an LSB 6-bit LFSR 412 that includes NOR gate 416, XOR gate 418, AND gate 420. The circuit also comprises an MSB 6-bit LFSR 414 that includes NOR gate 422, XOR gate 424, AND gate 426.

In one embodiment, the LFSR circuit is operative to generate the initial value of the LFSR when all inputs are zero, which is a prohibited state for the LFSR. It incorporates mechanisms to implement a complete 12-bit LFSR by combining two 6-bit LFSRs. Additionally, it provides an output OVERFLOW to control the histogram overflow latch.

The LSB 6-bit LFSR functions to generate all 64 states of the sequence including the forbidden zero state using combinatorial logic. It also functions to generate the 'carry' signal which serves as the input clock to the MSB 6-bit LFSR. The MSB 6-bit LFSR comprises similar combinatorial logic to generate the 64 states of the sequence as well as generating the overflow signal. The 'carry' signal selects via multiplexer 421 either the data generated by the MSB LFSR block or the MSB 6-bits on the input bus to output as OUTPUT DATA.

A diagram illustrating an example super macropixel memory and readout circuit is shown in FIG. 22. The super macropixel readout circuit 350 comprises a left output bus multiplexer 354 and a right output bus multiplexer 356, both coupled to macropixel memory 358 that includes four memory banks 352 for macropixels 0, 1, 2, 3. The readout circuit provides a readout operation for a super macropixel block, bypassing the input data, or monitoring data path signals. Note that this circuit can be implemented using either a tristate based or multiplexer based architecture. For illustration purposes, the multiplexer based circuit is shown and described, while one skilled in the art could easily implement the tristate based architecture.

The selection of one of the four macropixel memory banks is determined by the INPUT FRAME READOUT 2-bit control signal. When '00' is selected, the multiplexer is "transparent", i.e. the input data (LEFT INPUT BUS and RIGHT INPUT BUS), coming from a super macropixel above is directly connected to the output, creating a chain of signal propagation. When '01' is selected, the content from the upper row of memory banks, i.e. memory banks 0 and 1, are loaded onto the respective left and right output buses. When '10' is selected, the content from the lower row of memory banks, i.e. memory banks 2 and 3, are loaded onto the respective left and right output buses. When '11' is selected, the contents of up to 24-bit monitoring parameters are loaded onto the output buses for system monitoring purposes.

Figure 23:
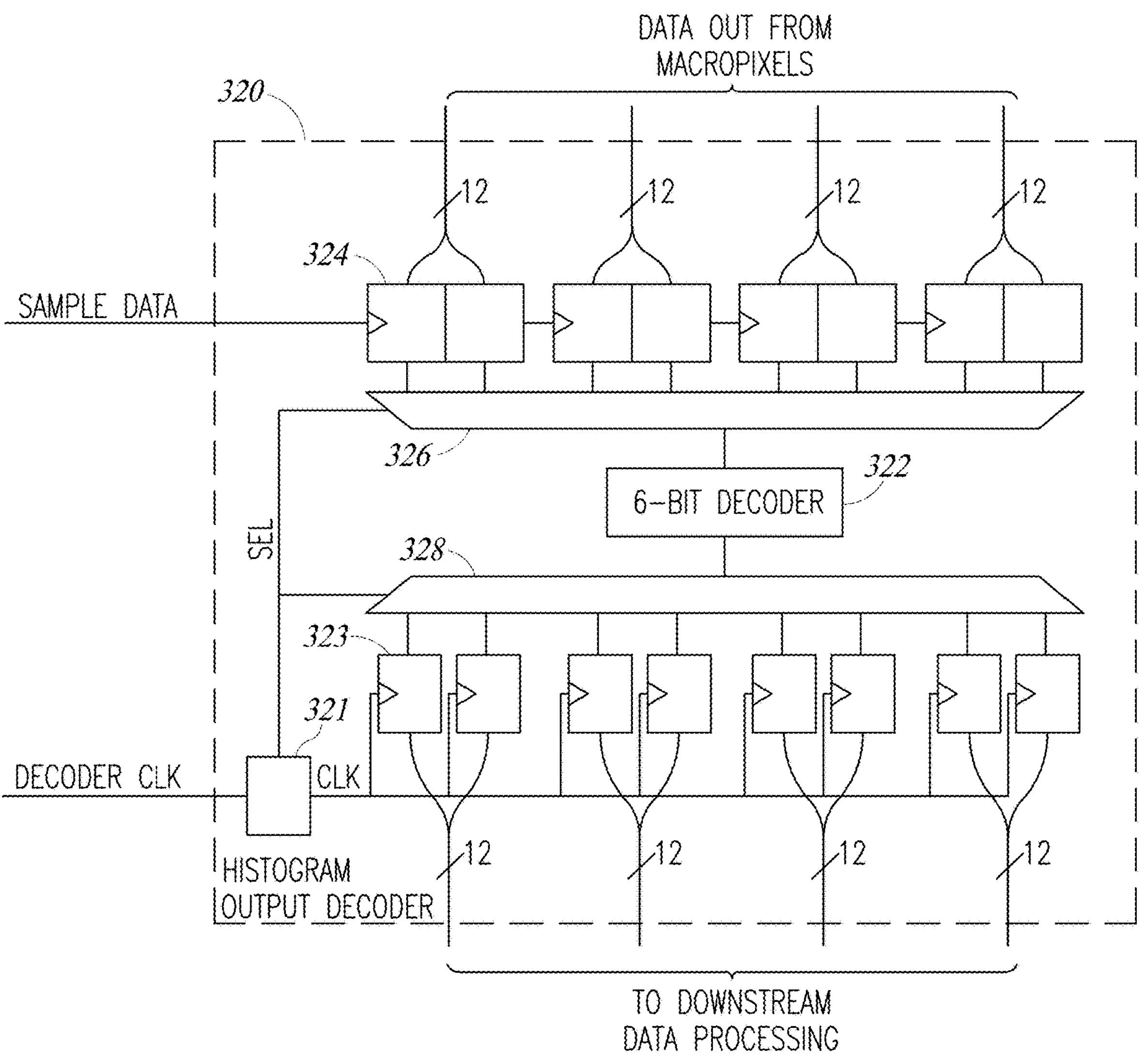
FIG. 23 is a diagram illustrating an example of shared 6-bit decoder circuit to convert LFSR output to binary.

A diagram illustrating an example shared 6-bit decoder circuit to convert LFSR output to binary is shown in FIG. 23. The histogram output decoder 320 comprises groups of 6-bit registers 324, multiplexer 326, a single 6-bit decoder 322, demultiplexer 328, control signal block 321 and groups of 6-bit registers 323. In operation, during the readout process output buses of 12-bit LFSR data from multiple macropixels are propagated to the edge of the array, sampled by SAMPLE DATA, so LFSR data can be decoded to binary for further data processing. Since the decoding time is relatively quick, multiple columns of outputs buses can share a single decoded (i.e. converted to binary). Note that in this example, data output from four columns are shared by the same 6-bit decoder circuit. It is appreciated that this number may be bigger or smaller depending on area and speed requirements. The four 12-bit outputs from the macropixels are virtually split into groups of 6-bits 324, which are then sequentially multiplexed 326 and fed to the single decoder 322. The resulting binary data of the decoder is demultiplexed 328 to a corresponding 6-bit register and stored. After all eight 6-bit portions are decoded, the LSB and MSB are virtually concatenated, to form the original four 12-bit information (now in binary), which is fed to subsequent downstream data processing. Control signal block 321 is operative to generate the sequence of SEL and CLK signals from the DECODER CLK input.

Histogram Aggregation and Spatial Resolution/Range Trade-Off

In one embodiment, to support dynamic adjustment of sensing range and spatial resolution, multiple adjacent macropixels can be logically combined to form larger pixels. This reconfiguration enables the use of shared memory and control logic to increase the number of histogram bins, thereby extending the measurable range (e.g., to 16 or 32 m, versus 8 m of a macropixel range) without modifying the physical layout, illustrated at FIG. 24. The device supports multiple configurations including (1) macropixel mode where each macropixel operates independently, providing high spatial resolution but 1× range (e.g., 8 m); (2) hybrid horizontal/vertical macropixel mode where adjacent macropixels are paired either horizontally or vertically to effectively double the memory and provide 2× range (e.g., 16 m); and (3) super macropixel mode where a 2×2 group of macropixels is aggregated into a single unit providing quadruple memory and maximum (4×) range (e.g., 32 m) at the cost of reduced spatial resolution.

Photon detection events, referred to as event signals, are routed from the active SPADs to histogram memory banks in accordance with a configurable combiner logic. Depending on the configuration, events may be: (1) routed to a single histogram memory (macropixel mode); (2) combined across pairs of macropixels and sent to shared memory (hybrid macropixel); and (3) aggregated sequentially across all four macropixels into a super macropixel histogram (super macropixel mode). Logical OR/combination gates and a programmable multiplexer tree are used to implement this aggregation and event routing. Events are gated by the current configuration and active histogram select lines.

In operation, histogram data for each macropixel, hybrid macropixel or super macropixel is stored in a dedicated respective histogram memory. Depending on the configuration, these memories may store data independently or be concatenated to extend the effective range. Reconfiguration is controlled via registers accessible to the host processor, which defines how macropixels are grouped and which histogram memories are active. During operation, photon events detected by SPADs are routed to the appropriate histogram bins according to the current configuration mode.

For hybrid macropixel modes, the sensor operates sequentially. For example, in horizontal hybrid mode, one macropixel collects data during the first half of the laser cycle (e.g., range 0 to 8 m) while a second macropixel collects data during the second half (e.g., range 8-16 m). The resulting histograms are concatenated or otherwise processed as a single extended range measurement.

In one embodiment, the dToF of the present invention provided flexibility to be used in various scenarios and conditions with different types of illumination thereby increasing its applicability. The sensor is capable of acquiring high resolution depth in short range but able to be reconfigured to operate in lower resolution but longer range. This adds flexibility to users to implement flood or dotted illumination making the sensor more applicable to different situations.

In one embodiment, the device architecture supports spatially concurrent mixed configurations, enabling any combination of previously described configurations in the same frame operation. For example, regions where higher resolution is more desirable can operate in macropixel mode (i.e. high resolution, 1× the range) and other regions where range is more desirable can operate in hybrid or super macropixel (i.e. low resolution, 4× the range). One example is foveated operation, in which central regions of the sensor operate in dense, high-resolution mode while peripheral regions operate in sparse, long-range mode. This allows for reduced transmitter power consumption while preserving high detail in regions of interest.

The sensor is operative to support operation under different illumination patterns. With flood illumination, a uniform light field covers the entire scene, suited for macropixel mode. With sparse illumination, a dot pattern is projected (e.g., via DOE), allowing for low power, long range operation in super macropixel mode. The configuration sensor can be coordinated with the illumination mode where sparse patterns require only selected macropixel/super macropixels to be active and flood patterns benefit from full sensor activation. Either factory calibration or runtime estimation can determine which pixels will receive return signals based on emitter layout and optical properties. Pixels outside these zones can be disabled to conserve power and bandwidth.

For an efficient dToF system, single-shot operation (i.e. histogram range corresponding to the total measurement range) is desirable. Due to limitations in the hardware, however, conventional dToF sensors are forced to perform multiple step acquisition to achieve the desired precision and range, requiring over twice the transmitter power when compared to single-shot. This is prohibitive for many applications such as consumer and robotics. In one embodiment, the dToF sensor of the present invention groups SPADs into macropixels with sufficient circuitry to be able to measure ranges up to 8 m completely independent from each other, with a target resolution of QVGA resolution. Macropixels can be reconfigured to operate with their neighbors to achieve up to 16 m in HQVGA resolution and up to 32 m in QQVGA resolution.

Accordingly, in one embodiment, in order to increase flexibility of the sensor array, macropixels can be combined spatially to trade-off spatial resolution for range. Since the range is defined by the number of bins and the bin width for a given precision (the narrower the bin width, the greater the precision), neighboring macropixels can be combined to (1) configure the sensor array to have ½ the resolution for twice the range (referred to as a hybrid macropixel); and (2) configure the sensor array to have ¼ the resolution for four times the range (referred to as super macropixel). Note that a hybrid macropixel may be configured either horizontally or vertically. It is noted that these configurations are independent for each group of 2×2 macropixels (i.e. super macropixels). In addition, within a frame time, portions of the sensor array can operate as macropixels, hybrid macropixels, super macropixels, or any combinations thereof.

Figure 24:
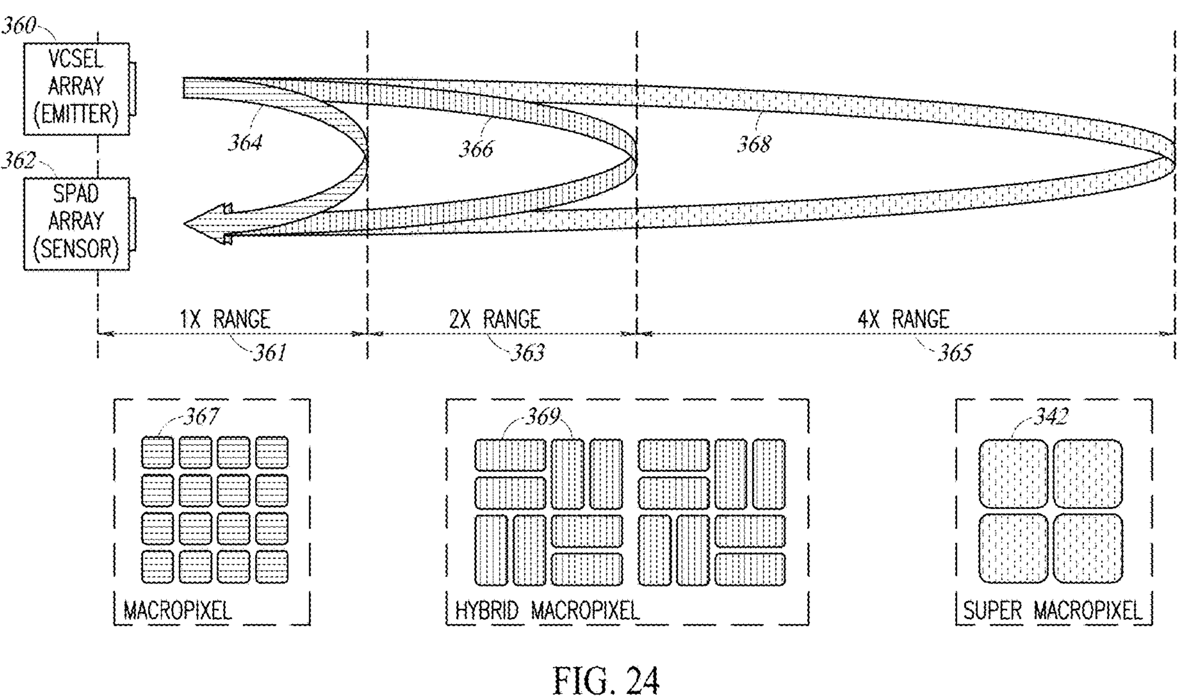
FIG. 24 is a diagram illustrating an example pixel combination to realize the trade-off spatial resolution for range.

A diagram illustrating an example pixel combination to realize the trade-off between spatial resolution and range is shown in FIG. 24. As an example, the VCSEL emitter array 360 and the SPAD sensor array 362 can be configured to trade off resolution for range. A maximum resolution but shortest range 364 is achieved by configuring the SPADs as macropixels 367. A mid-resolution and mid-range 366 is achieved by configuring the SPADs as hybrid macropixels 369 either horizontally or vertically. A lower resolution but long range 368 is achieved by configuring the SPADs as super macropixels 342.

Figure 25:
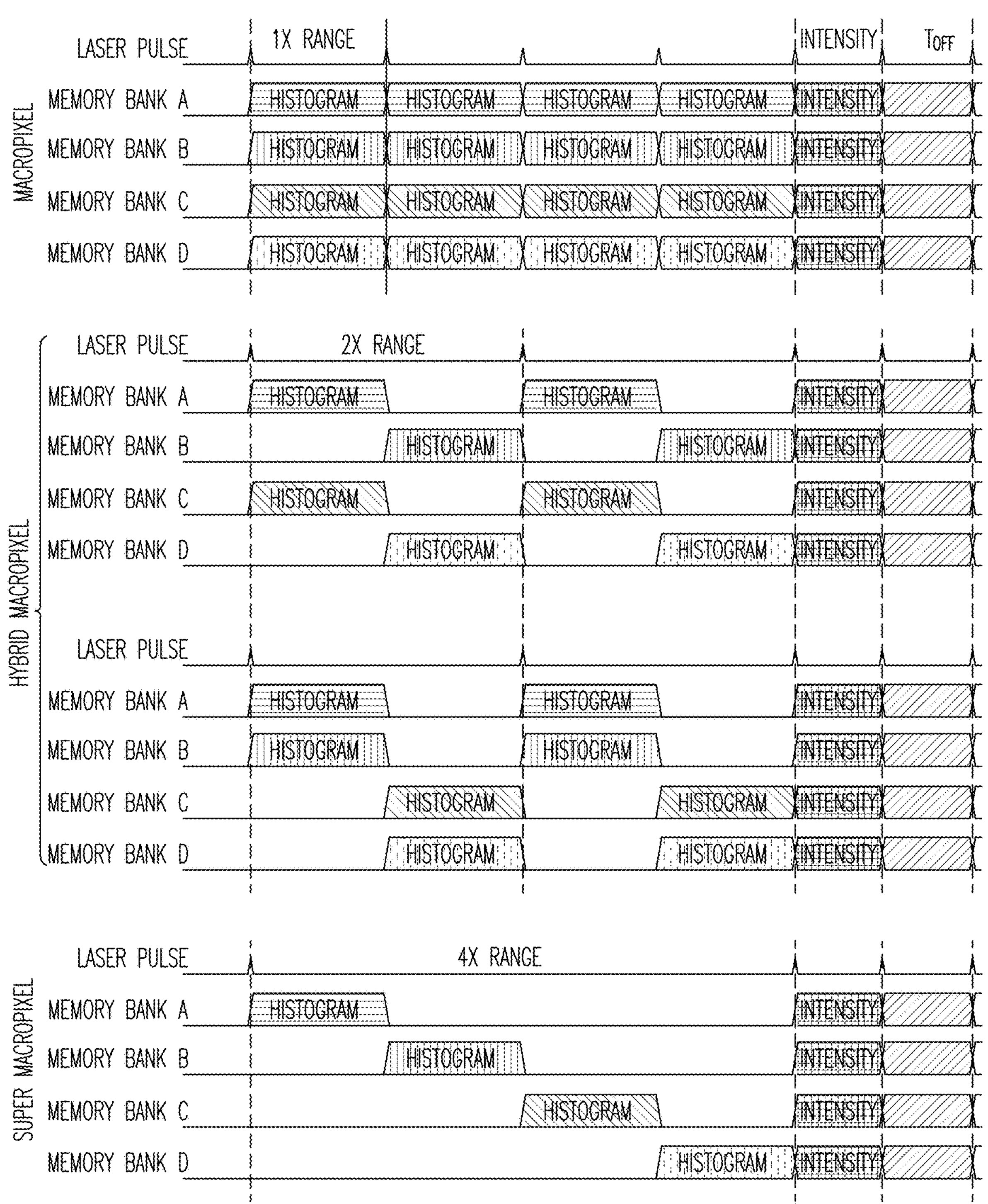
FIG. 25 is a diagram illustrating example histogram and intensity memory bank access and acquisition for various configurations.

A diagram illustrating example histogram and intensity memory bank access and acquisition for various configurations is shown in FIG. 25. The device provides multiple configuration modes to achieve different resolution/range combinations by spatial reconfiguration. In the macropixel resolution mode (i.e. 1× range), all macropixels operate independently and generate their own histograms, i.e. one histogram per macropixel, and in parallel (only four are shown) with the intensity update being acquired after four histogramming acquisition cycles. This provides the highest spatial resolution. A $T_{OFF}$ period to avoid spurious reflections from the target follows the intensity update during which the SPADs is disabled. Note that in other modes of operation, one histogram acquisition is performed followed by the intensity update, i.e. the histogram operation is sequential between the banks, while the intensity for all pixels is performed at the same time, at the end of each cycle.

Figures 26A, 26B, 26C:
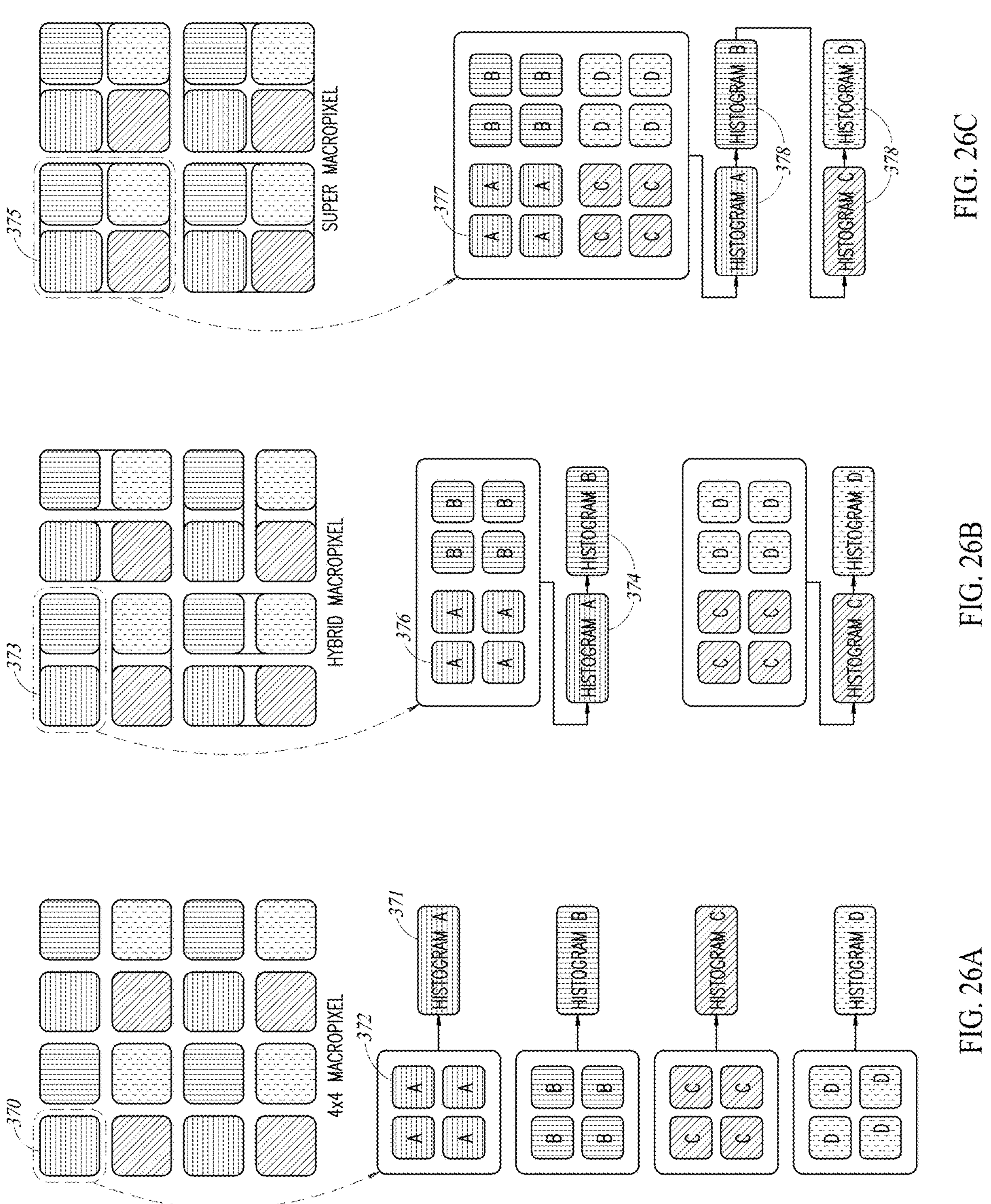
FIG. 26A is a diagram illustrating example 4×4 macropixel histogram acquisition configuration.
FIG. 26B is a diagram illustrating example 4×4 hybrid macropixel histogram acquisition configuration.
FIG. 26C is a diagram illustrating example 4×4 super macropixel histogram acquisition configuration.

An example 4×4 macropixel histogram acquisition configuration as shown in FIG. 26A shows each macropixel 370 generating its own histogram. The dashed line shows each macropixel comprising four SPADs 372 the output of which together are used to generate a single histogram 371. Each macropixel A, B, C, D is shown which generates histograms A, B, C, D, respectively.

In the hybrid macropixel resolution mode (i.e. 2× range), shown in FIG. 26B, pairs of adjacent macropixels are combined either horizontally or vertically with the intensity update being acquired after two histogramming acquisition cycles (the detailed arrangement refers to a horizontal combination). A $T_{OFF}$ period follows the intensity update during which the SPADs is disabled. In the horizontal hybrid macropixel mode, two histograms are concatenated to double the range. Thus, for example, the histograms and events from two macropixels A and B are combined where the combination is treated as a single longer histogram. The photon events that occur on each pair of macropixels in the hybrid configuration are combined (i.e. ORed) and counted in each of the A and B histograms. This doubles the range but halves the resolution as the events from both macropixels are now combined into one longer histogram. Macropixels C and D are combined and operate in similar fashion. In other words, in this mode, events from macropixels A and B are collected together and stored in histogram A first, then histogram B second. Similarly, the events of macropixels C and D are collect together and stored in histogram C first, then D second. The concatenated histogram (A+B and C+D) reconstructs a longer effective range.

An example 4×4 hybrid macropixel histogram acquisition configuration as shown in FIG. 26B shows each horizontal pair of macropixels 373 generating its own combined histogram. The dashed line shows each macropixel pair comprising eight SPADs 376 the output of which together are used to generate one combined histogram 374 made up of histograms A and B concatenated. The macropixels A, B, C, D are shown which generate histograms A+B and C+D, respectively.

In the vertical hybrid macropixel mode, two histograms are concatenated to double the range. Thus, for example, two macropixels A and C are combined where the combination is treated as a single longer histogram. The photon events that occur on each pair of macropixels in this hybrid configuration are combined (i.e. ORed) and counted in each of the A and C histograms. This doubles the range but halves the resolution as the events from both macropixels are now combined into one longer histogram. Macropixels B and D are combined and operate in similar fashion.

In the super macropixel resolution mode (i.e. 4× range), four macropixels are combined with the intensity update being acquired after one histogramming acquisition cycle (i.e. once per laser pulse). A $T_{OFF}$ period follows the intensity update during which the SPADs recover for the next exposure period and histogram acquisition is not collected. In the super macropixel mode, four histograms are concatenated to quadruple the range. Thus, the histograms and events from four macropixels A, B, C, D are combined where the combination is treated as a single longer histogram. The photon events that occur on each of the four macropixels in this configuration are combined (i.e. ORed) and counted in each of the A, B, C, and D histograms. This quadruples the range but quarters the resolution as the events from all four macropixels are now combined into one longer histogram.

An example 4×4 super macropixel histogram acquisition configuration as shown in FIG. 26C shows each group of four macropixels 375 generating its own combined histogram. The dashed line shows each macropixel group comprising 16 SPADs 377 the output of which together are used to generate one combined histogram 378 made up of histograms A, B, C, and D concatenated. Four of the 16 macropixels, namely macropixels A, B, C, D are shown which generate histograms A+B+C+D.

Figure 27:
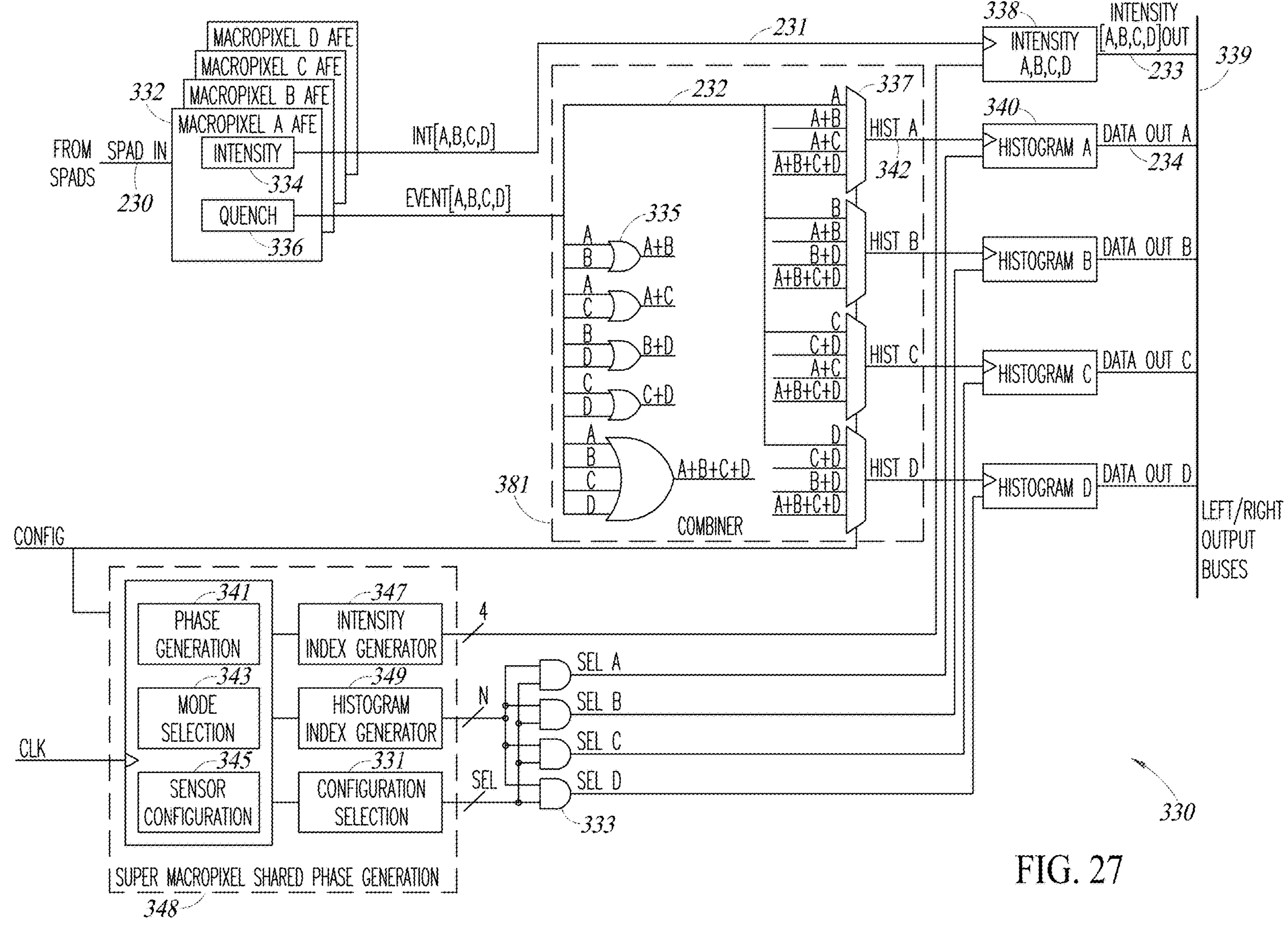
FIG. 27 is a diagram illustrating example histogram operation selection for different acquisition configurations.

A diagram illustrating example histogram operation selection for different acquisition configurations for a super macropixel is shown in FIG. 27. The circuit, generally referenced 330, comprises four macropixel analog front end (AFE/quench) circuits 332, combiner circuit 381, OR gates

335, multiplexers 337, intensity memory 338, histogram accumulators 340, left/right output buses 339, super macropixel shared phase generation block 348, phase generation block 341, mode selection block 343, sensor configuration 345, intensity index generator 347, histogram index generator 349, configuration selection block 331, and effective memory selector AND gates 333.

In operation, the first block after the detector itself is the analog front-end. Outputs from four SPADs are input to the SPAD IN 230 input in each macropixel AFE, labeled A, B, C, and D. Each AFE circuit includes a quench circuit 336 and intensity register 334 which respectively generate event signals EVENT[A,B,C,D] 232 and intensity registers INT [A,B,C,D] 231 corresponding to macropixels A, B, C, and D making up a super macropixel.

Since SPADs are devices that generate very fast, very high current flows the quench circuit functions to detect this current and quench it in order to not allow the device to be destroyed. This quenching can be passive, active, or a hybrid of both. Passive quenching includes connecting a high resistance between the bias and the diode where during the avalanche event, the voltage drops over the resistance thus reducing the bias over the diode and quenching the current. This resistance is typically realized via a transistor in the triode region. The same resistor can be used to recharge the SPAD through a process called passive recharge. Passive quench and passive recharge (PQPR) is the simplest structure, but depending on the overall node capacitance it can lead to a high energy consumption during the event and increase in after pulsing. Active quenching uses very fast electronics to sense the avalanche to actively shut down the SPAD, ceasing the avalanche current. Similar electronics can be used to provide a quicker recharge in an active quench and active recharge (AQAR) manner.

The combiner circuit 381 essentially functions as a programmable combiner matrix incorporating a combination of OR gates 335 and multiplexers 337 provide the required logic to configure the histogramming in accordance with the desired range/resolution. The combiner determines whether the signal is processed (1) individually (i.e. one histogram per macropixel); (2) in pairs (i.e. shared histogram per hybrid pair); or (3) in quads (i.e. shared histogram for super macropixels. The routing is controlled by the configuration selection register or state machine, which can be updated dynamically by the host processor. Note that the histogram bins themselves are fixed in number and width, but their association with spatial regions changes based on the particular mode and configuration settings. For example, in macropixel mode, bin index 20 of histogram B may represent 4 m while in super macropixel mode, bin index 20 of histogram B may represent 12 m due to concatenation of the macropixels, in hybrid or super macropixel configuration.

The OR gates in the combiner function to combine the events to generate A+B, A+C, B+D, C+D and A+B+C+D event sums. These sums are distributed across the inputs of the multiplexers and depending on the configuration, the appropriate inputs are selected for input to the histograms depending on the desired range. For macropixel 1× range, the first input of all multiplexers is selected. For hybrid macropixel horizontal 2× range, the second input of the multiplexers is selected. For hybrid macropixel vertical 2× range, the third input of the multiplexers is selected. For super macropixel 4× range, the fourth input of the multiplexers is selected.

The HIST A, B, C, and D signals from the multiplexers provide the clock (i.e. increment) inputs for the corresponding histograms A, B, C, and D. Intensity data 231 for all four macropixels functions as the clock for the intensity memory 338. After the full exposure is complete, the memory contents of histograms A, B, C, D and intensity memory outputs are transferred over the left and right output buses to subsequent decoding, processing, and output to the host.

As described supra, the phase generator functions to generate the various timing pulses required by the macropixel and super macropixel. It is responsible for generating a sequence of control signals to sequentially select the intensity and histogram memories, read the memories by sampling the information, and writing the information back into the memory. These sequences of operations are performed within a single bin allocation time period $T_{BIN\_WIDTH}$.

In one embodiment, the macropixel operates based on the laser repetition interval (cycle/PRI), defined by the maximum round trip unambiguous measurement range as $$PRI = 2 * \frac{\text{Max}Distance}{c} + T_{OFF} \tag{1}$$

where MaxDistance is the maximum range, c is the speed of light, and $T_{OFF}$ corresponds to a potential idle time between histogram acquisition at every laser pulse. During this measurement interval, the macropixel receives an external clock to serve as a timing reference that selects upon the arrival of a photon each histogram bin and increments a count sequentially. After the selection of each histogram bin, the intensity memories are selected and updated based on the activity, stored in individual event counters, one per pixel. A typical depth sensing operation may require a number of laser pulses (up to 100's of thousands of pulses), during the $T_{EXPOSURE}$, in order to accumulate enough photon statistics for a successful depth estimation. After the exposure, the array is read out, processed, and the data is output from the sensor sequentially. After $T_{FRAME}$, which is defined by the frame rate, the sensor and laser resume their operation for another frame. Power gating during idle/stand by time between the frame exposure and processing is performed to significantly reduce power and leakage. The frame timing is shown in FIG. 16 described supra.

The phase generation, mode selection, and sensor configuration together are responsible for selecting the sequence for the histogram and intensity operation. The device integrates dynamic control over pixel aggregation, range/resolution trade-offs, memory indexing, and acquisition modes (e.g., histogram-only, intensity-only, etc.). The device provides the ability to coordinate sensor behavior across spatially reconfigurable pixel groups and adjust data acquisition flow through a programmable control system that manages operation mode, phase timing, and memory selection.

The device supports multiple sensor operational modes via a mode select register 343 that determine the data captured per frame. In one embodiment, several sensor operational modes are provided including: (1) histogram only; (2) intensity only; (3) histogram and intensity; and (4) 4× histogram and intensity; (5) memory reset process; and (6) readout.

In the histogram only mode, only time-of-flight (ToF) histogram data is collected which is useful in scenarios where intensity data is not required. Intensity updates are skipped. In intensity only mode, only photon count intensity per SPAD is collected and time of flight measurements are not performed, particularly useful for calibration purposes. In histogram and intensity mode, histogram and intensity are both collected during each acquisition cycle. This is illustrated in FIG. 16 where each cycle includes histogram and intensity acquisition that repeat for the entire exposure period. In 4× histogram and intensity mode, the histogram is accumulated and concatenated across four sequential phases before intensity data is updated. Note that this mode is necessary for configurations that require sequential histogram memory activation (e.g., hybrid or super macropixel modes). Phases are generated that sweep through histogram memory bins four times followed by intensity bins for each individual SPAD. This mode is illustrated in FIG. 25 which shows the timing for the different super macropixel modes. Note that each mode is controlled via a mode selection register 343 (FIG. 27) and operates in conjunction with the sensor configuration register 345 that defines how pixels are grouped and data is routed.

The sensor includes a spatial configuration mechanism via a sensor configuration register 345 that groups macropixels (2×2 SPADs) into larger functional units based on application requirements. These sensor configurations include: (1) macropixel where each 2×2 SPAD unit operates independently and all histogram memories are accessed in parallel; (2) hybrid macropixel horizontal where pairs of macropixels are grouped horizontally (e.g., A+B and C+D) and histograms are accumulated across pairs sequentially; (3) hybrid macropixel vertical where vertical grouping (e.g., A+C and B+D) are also accumulated sequentially; and (4) super macropixel where all four macropixels (A+B+C+D) form a single sensing unit and histogram data is accumulated sequentially across four phases, and intensity is computed afterward.

The phase generator 341 is operative to generate the phases to select and control the histogram and intensity memories since phase operation varies with the sensor configuration. For example, if the sensor is configured as 1× range QVGA, the sequence is macropixel histogram followed by intensity, with all four macropixels in parallel. If the sensor is configured to operate in QQVGA 4× range, the histograms operate sequentially followed by intensity.

For 1×QVGA (macropixel) range, the histogram index generator 349 creates a sequence from 0 to N−1 indexes (N being the number of bins) with select signals SEL A, B, C, D all active meaning all four histograms are generated in parallel. At the end of the histogram acquisition, the intensity index generator creates a sequence from 0 to 3 indexes for the parallel intensity acquisition (A, B, C, D).

For 2×HQVGA (horizontal hybrid macropixel) range, the histogram index generator creates a sequence from 0 to N−1 indexes which are ran twice, first combined with SEL A, B then SEL C, D for histograms memory indexes A+B and C+D for horizontal macropixel combination. For 2×HQVGA (vertical hybrid macropixel) range, the histogram index generator creates a sequence from 0 to N−1 indexes which are ran twice, first combined with SEL A, C then SEL B, D for histograms memory indexes A+C and B+D for horizontal macropixel combination. At the end of the histogram acquisition, the intensity index generator creates a sequence from 0 to 3 indexes for the parallel intensity acquisition (A, B, C, D).

For 4×QQVGA (super macropixel) range, the histogram index generator creates a sequence from 0 to N−1 indexes which are ran four times. First with SEL A, then SEL B, then SEL C, then SEL D for histogram memory indexes A+B+C+D. At the end of the histogram acquisition, the intensity index generator creates a sequence from 0 to 3 indexes for the parallel intensity acquisition (A, B, C, D).

Figure 28:
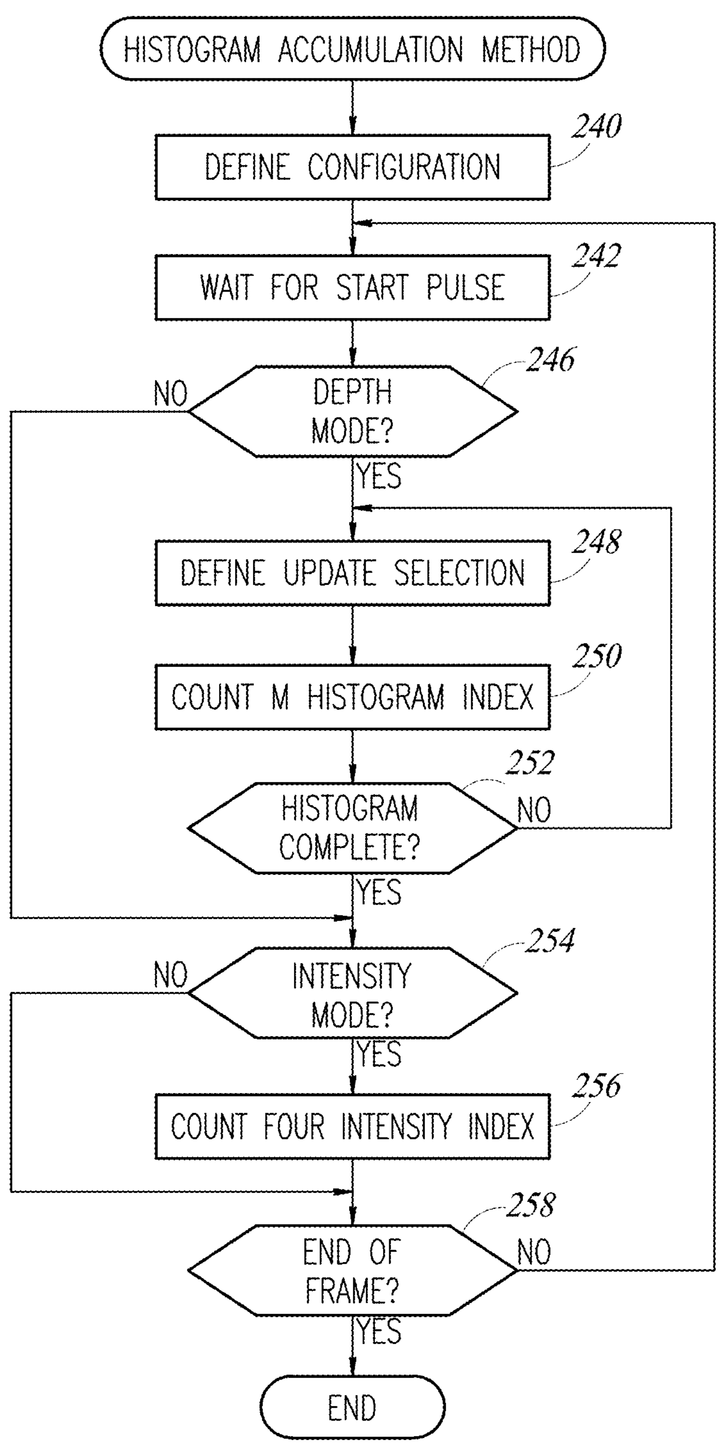
FIG. 28 is a diagram illustrating an example histogram accumulation method.

A diagram illustrating an example histogram accumulation method is shown in FIG. 28. The desired configuration is first defined (step 240), which may be driven by a user or host command. The device then waits for a start pulse (step 242). It is then determined whether depth mode is selected (step 246). Note that the sensor has the ability to be configured to obtain depth only, intensity only, or both depth and intensity. If depth mode is selected, the update selection is then defined (step 248). The appropriate SEL lines (FIG. 27) are selected depending on the configuration, i.e. macropixel, horizontal or vertical hybrid macropixel, or super macropixel. The histogram index is then sequenced through the N bins (step 250). Once the histogram is complete (step 252), if the intensity mode is configured (step 254), the four intensity indexes are generated and intensity is updated for the four macropixels as described supra (step 256). If the end of frame has not been reached (step 258), the method returns to step 242 to await the start pulse for the next cycle/PRI.

Data Readout, Data Processing, and Post Processing

The sensor includes an on-chip signal processing unit used to perform various post processing functions. For example, functions include extracting high-level range data from raw histograms that include: (1) background noise estimation; (2) peak detection; (3) confidence scoring; (4) range estimation; and (5) cross correlation.

The processing engine outputs compact range data (e.g., range, peak value, confidence score) to the host, thereby minimizing bandwidth. In some applications, raw histograms can optionally be exported for off-chip processing. Histogram merging logic on-chip handles the temporal alignment and summation of bins when operating in hybrid or super macropixel modes. The host can be made aware of pixel configurations via metadata to interpret range values appropriately.

In connection with the latency for reading and outputting data, in one embodiment, the device uses a single C-PHY/D-PHY lane for data communication to minimize both complexity and required pin count. Considering a single C-PHY lane (faster protocol), the maximum achievable data rate transfer is about 4500 Mbps while readout from the device is preferably less than 1.5 ms to maintain low sensing latency), the total amount of data per frame should be 6.75 Mb/frame. Considering, for example, a VGA sensor array (640×480 pixels, or 320×240 macropixels (MPs)/frame), the budget is approximately 84 bits/macropixel of information per frame. The data output for each macropixel (2×2 SPADs) including intensity, depth, confidence, and background level is 88~108 bits/MP. The amount of data is already more than available to maintain the data throughput over a single C-PHY lane. A compression algorithm can be implemented to 1:2 ratio in outputting the data. The effective time to access the data in the array, read it, process it, and serialize it out of the chip is also important.

Considering the same 1.5 ms for the readout and 320×240 macropixels and a single readout structure, the time for each macropixel is less than 20 ns (all memories, all bits), which is very stringent thus requiring parallelization. Therefore, macropixels are read out by rows in parallel (i.e. column-parallel readout), which is similar to image sensors with the difference being the data in this case is already in digital form from the memory banks including histogram and intensity. The time can then be relaxed from 20 ns to 1.5 ms/240 rows=6.25 μs. Assuming for example that there are 40 memory per macropixel, the time to read each memory in the array is 6.25 μs/40=156 ns. Note that this time includes selecting a row, selecting a memory within the macropixel array, loading data onto the buses, and sampling it.

In one embodiment, the readout is performed in a rolling shutter fashion. Each column of macropixels shares a readout bus, which is then connected to the memory readout structure (i.e. precharger, sense amplifier, SAFF, sampling, registers) at the bottom of the array. Each macropixel already contains the structure to operate the memory (i.e. SAFF and switches), which can be reused to output the information into the column-wise buses. To provide a level of signal processing, after reading out the memory array (i.e. raw histograms and intensity), a 4-level FIFO, per column, is provided. Associated with the neighboring columns, the data processing unit 36 (FIG. 3A) is capable of combining and providing low level processing, data reduction, spatial cross correlation, densification, etc. One skilled in the art would appreciate that the signal processing performed depends on the required hardware logic, area, latency, etc. which depends on the particular implementation of the device.

In one embodiment, the sensor is spatially configured to operate with different resolutions and ranges, and the internal memories are not aware of how the memories are configured. A cross correlation post-processing block (not shown) organizes the memories accordingly such that data is processed and output properly. For example, in the case of macropixel resolution, each histogram memory is dealt with independently. When operating in hybrid macropixel resolution, however, the memories need to be organized to recover the internal array configuration, which means stacking the information of each macropixel accordingly (if combined horizontally or vertically). Similarly, in super macropixel resolution where the macropixel information is stacked to cover 4× the range. In spare resolution mode, each super macropixel functions to collect the entire range and eventually combine accordingly to effectively process the signal. In this example, several options for data sequencing and aggregation are available.

Another mechanism for data processing is spatial correlation. In this embodiment, the spatial information from neighboring pixels is used to increase the SNR of a histogram, similar to binning in intensity image sensors. For example, considering a target macropixel, several scenarios include: (1) there is no spatial correlation and the histogram is processed independently from others; (2) a kernel of 2×2 macropixels are combined with a weighted sum (e.g., equal weights, as in rectangular shape, or other shapes such as Gaussian, triangular, etc.) moving across the array; and (3) the kernel is increased to 3×3 size, with different kernel shapes.

Optical Power Control

As described supra, direct time of flight operates based on time correlated signal photon counting (TCSPC) where photon events are acquired and accumulated into a histogram. The system operates based on laser pulses (nanosecond, Gaussian like pulses). Ambient light and other sources of illumination and internal noise (collectively referred to as "noise") are uncorrelated to the system and distributed over the entire histogram, while the desired signal echo return (i.e. the "signal") from the target is concentrated around a particular histogram bin. A typical histogram of such system is shown in FIG. 8.

The goal is to accumulate enough signal using a sufficient number of laser pulses to be able to overcome the noise where the signal can be detected by a peak detector to identify the target location (i.e. search for the highest peak in the histogram). The distance is then calculated by multiplying the peak location, the bin width (in time), and the round trip speed of light.

$$z = h[k] \times \Delta_{LSB} \times c/2 \quad (2)$$

where $\Delta_{LSB}$ denotes the bin width and c is the speed of light.

The noise level and the signal peak intensity, however, depend strongly on the scene conditions. Overall ambient light and other sources of noise, the target reflectivity, bidirectional reflectance distribution function (BRDF), and the receiver and optical stack will determine the amount of noise the sensor accumulates. These values can be calculated per laser pulse, by multiplying the average photon flux (combination of all such parameters) and the histogram cycle period which is tightly related to the laser pulse repetition interval (PRI). Similarly, the signal depends on these scene parameters as well but also depends on the laser intensity and distance to the target. Typically, the noise is constant over the range, depending on the BDRF, reflectivity, and ambient light level. The signal also follows the scene parameters but the energy collected from the signal echo quickly falls with the square of the distance.

Conventional dToF systems are designed to achieve the worst-case scenario, i.e. highest ambient light, lowest reflectivity, and maximum range. This guarantees the system operates well for the specified conditions but in more relaxed situations (not worst-case scenarios), the system waste considerable energy.

Several key performance indicators (KPIs) for a dToF system include: (1) accuracy (i.e. bias/error); (2) precision (i.e. temporal consistency); (3) probability of valid measurement (i.e. PVM: true-positive measurements); and (4) outliers (i.e. false positives).

Real world scenes can have a very large variation in signal to noise ratio (SNR). For example, depending on the target distance, reflectivity, etc., 3 to 4 orders of magnitude SNR variation can be experienced. A system that is capable of adaptively controlling the exposure of both the sensor and laser to emit only the necessary (optimal) amount of laser energy to achieve the desired KPI is much more efficient.

Figure 29:
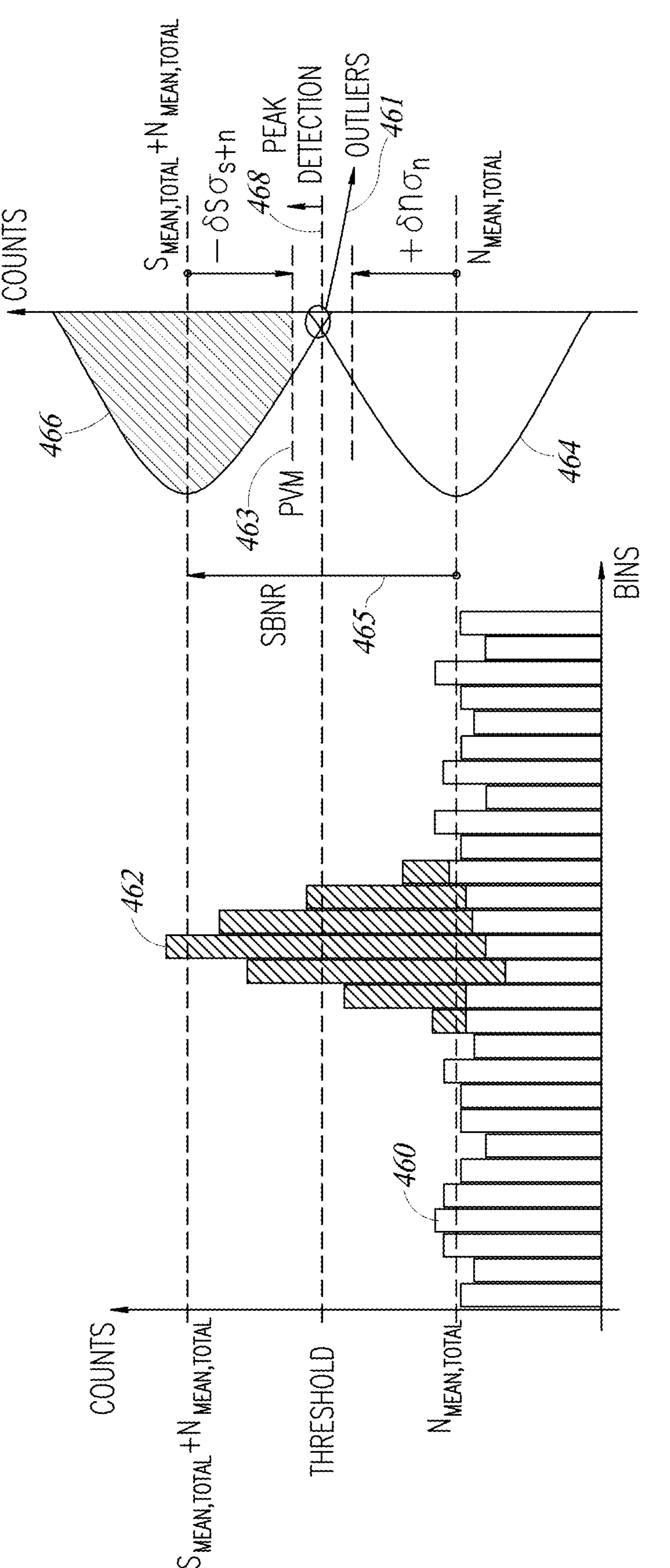
FIG. 29 is a diagram illustrating an example histogram with signal and noise count distributions.

To determine the amount of laser energy needed, the histogram is analyzed to determine whether the amount of energy (i.e. the exposure) being used is too much, not enough, or just right. First, the device is operative to search for and detect a peak in the histogram. To detect a peak that represents the target it must be strong enough to overcome the Poisson distributed noise (i.e. shot-noise) associated with discrete photon events. A diagram illustrating an example histogram with signal and noise count distributions is shown in FIG. 29. The histogram and the distribution (shot-noise, Poisson-distributed noise) of events from many measurements is shown.

Note that an advantage of the mechanism to determine the required laser energy is that it does not require any details about the optical stack, target shape, reflectivity, or distance. Thus, the histograms are analyzed and evaluated without any knowledge of the scene.

The noise ($N_{mean,total}$) represents the accumulation of uncorrelated photon events 460 over the entire exposure time (i.e. the frame) as the product of a number M of laser pulses often in the range of tens of thousands. The noise can be calculated using the photon-flux (per second) multiplied by the histogram range (in seconds) and the number of laser pulses. Note that the current value of $M_{curr}$ is used to calculate an estimate of an updated value of $M_{next}$ for use in the next exposure period which better accommodates the current scene based on the current calculated histogram.

The signal ($S_{mean,total}$) represents the peak value of the Gaussian pulse 462 and is measured or calculated by the optical power emitted by the laser (for one pixel or dot) and the scene/target conditions. It generally represents the peak value of a Gaussian like pulse from a number of signal events. In one embodiment, the detection system is capable of identifying the peak, matching it with a desired shape (e.g., Gaussian, etc.), and estimating its quality. A simple peak detector functions to select the strongest peak in the histogram.

The discrete nature of photons and thus events produce a variation with a Poisson distribution whose variance equals the square root of the mean value, i.e. $\sigma=\sqrt{\text{mean}}$. Therefore, the longer the integration (i.e. the higher the number M of laser pulses), the more events are accumulated in each bin and in the whole histogram, which leads to a higher count (i.e. higher mean) and higher $\sigma$. The normalized $\sigma$/mean, i.e., $$\frac{\sigma}{\text{mean}} = \frac{\sqrt{\text{mean}}}{\text{mean}} = 1/\sqrt{\text{mean}}\,),$$

however, reduces since the mean value grows quicker than the variance ($\sigma$), meaning the measurement SNR increases.

To control the exposure, the mean counts (noise and signal), their shot noise, and the effects of it with longer integration are determined. From the original histogram, the mean value ($N_{mean,total}$) and $\sigma$ (plot 464) and the signal peak mean and noise ($S_{mean,total}+N_{mean,total}$) and $\sigma$ (plot 466) are determined. An overlap occurs between the positive tail of the noise 464 and the negative tail of the signal+noise 466 since the signal rides on top of the noise.

The mean values $N_{mean,total}$ and $S_{mean,total}+N_{mean,total}$ are represented with their respective $\sigma$'s. Since the influence of the variation over the means reduces with longer exposure due to higher event count, the longer the exposure, the higher the certainty that the peak corresponds to the actual signal and not an ambient noise event outlier. To determine the total number of laser pulses required, we define that the peak detector (threshold) 468, located where the negative lobe of the $S_{mean,total}+N_{mean,total}$ meets a particular PVM requirement, must be higher than the positive lobe of the $N_{mean,total}$. This is defined by a number of $\sigma$'s (i.e. $\delta n$ for noise and $\delta s$ for signal+noise) that is needed. Assuming a photon event flux per pulse, a solution is provided below.

The noise lobes $N_L$ can be expressed as follows.

$$N_L = M \cdot N_{mean} \pm \delta n \cdot \sqrt{M \cdot N_{mean}} \tag{3}$$

The signal lobes $S_L$ can be expressed as follows.

$$S_L = M \cdot (S_{mean} + N_{mean}) \pm \delta s \cdot \sqrt{M \cdot (S_{mean} + N_{mean})} \tag{4}$$

To reliably detect peaks in the received signal, the lower signal lobe must be greater than the upper noise lobe. As expression for the minimum SBNR is given below.

$$S_{L-} > N_{L+} \Rightarrow SBNR = S_{L-} - N_{L+} \tag{5}$$

Thus, the requirement for the signal to background noise ratio (SBNR) 465 is give as follows.

$$SBNR = S_{mean} - \frac{1}{\sqrt{M}} \cdot \left(\delta s \cdot \sqrt{S_{mean} + N_{mean}} + \delta n \cdot \sqrt{N_{mean}}\right) > 0 \tag{6}$$

where the outliers 461 are defined as $$\text{Outliers} < 0.5 \cdot \left(1 - \text{erf}\left(\frac{\delta n}{\sqrt{2}}\right)\right) \tag{7}$$

and probability of valid measurements (PVM) 463 is defined as $$PVM < 0.5 \cdot \left(1 - \text{erf}\left(\frac{\delta s}{\sqrt{2}}\right)\right) \tag{8}$$

In practical terms, the SBNR shall be bigger than a certain margin depending on the dynamics of the scene and how quick the system can update the desired power control. Equation 6 can be used to solve the required updated value of $M_{next}$ that can be applied in the next exposure frame.

Figure 30:
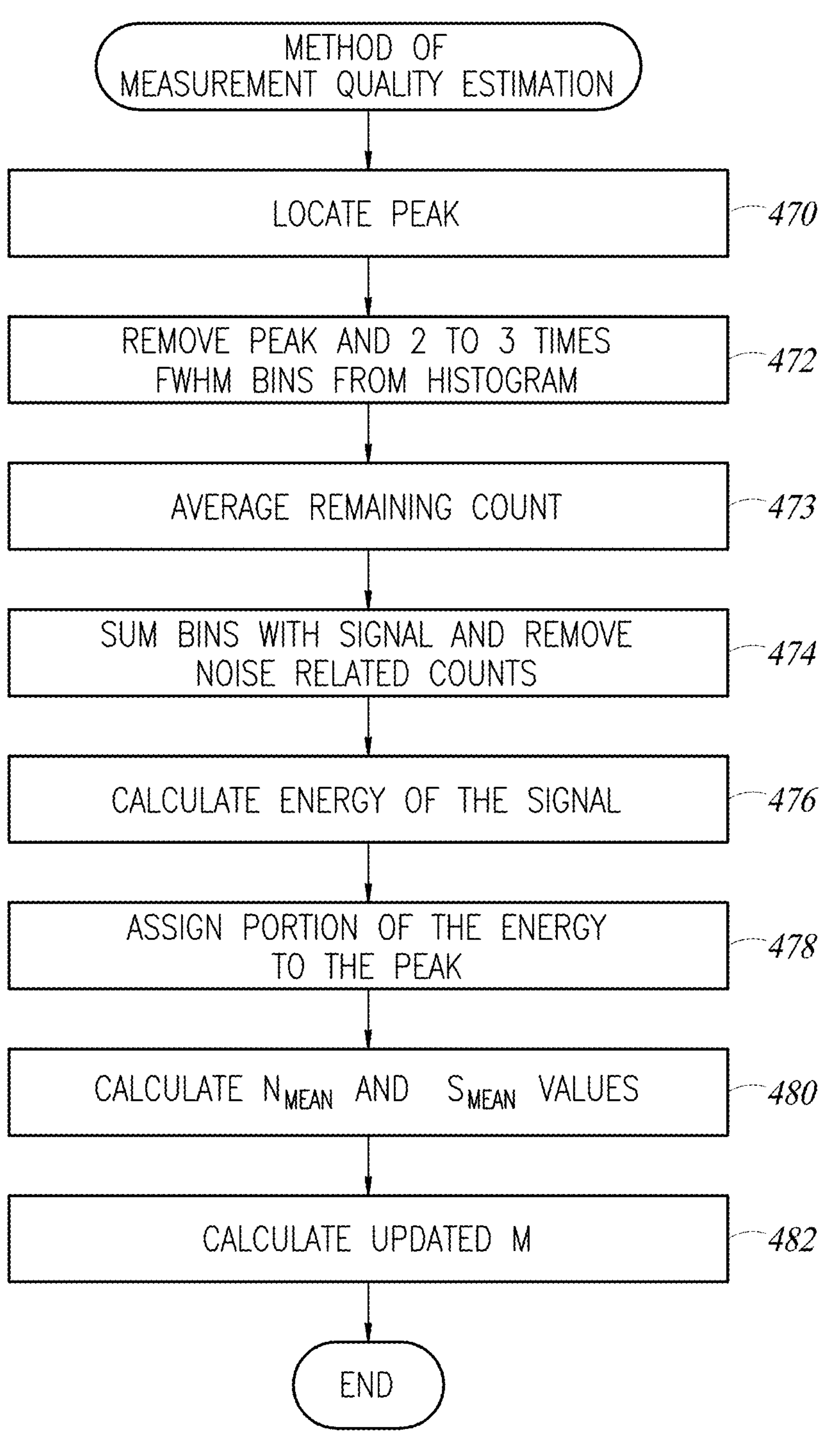
FIG. 30 is a diagram illustrating an example method of measurement quality estimation.
Figure 31:
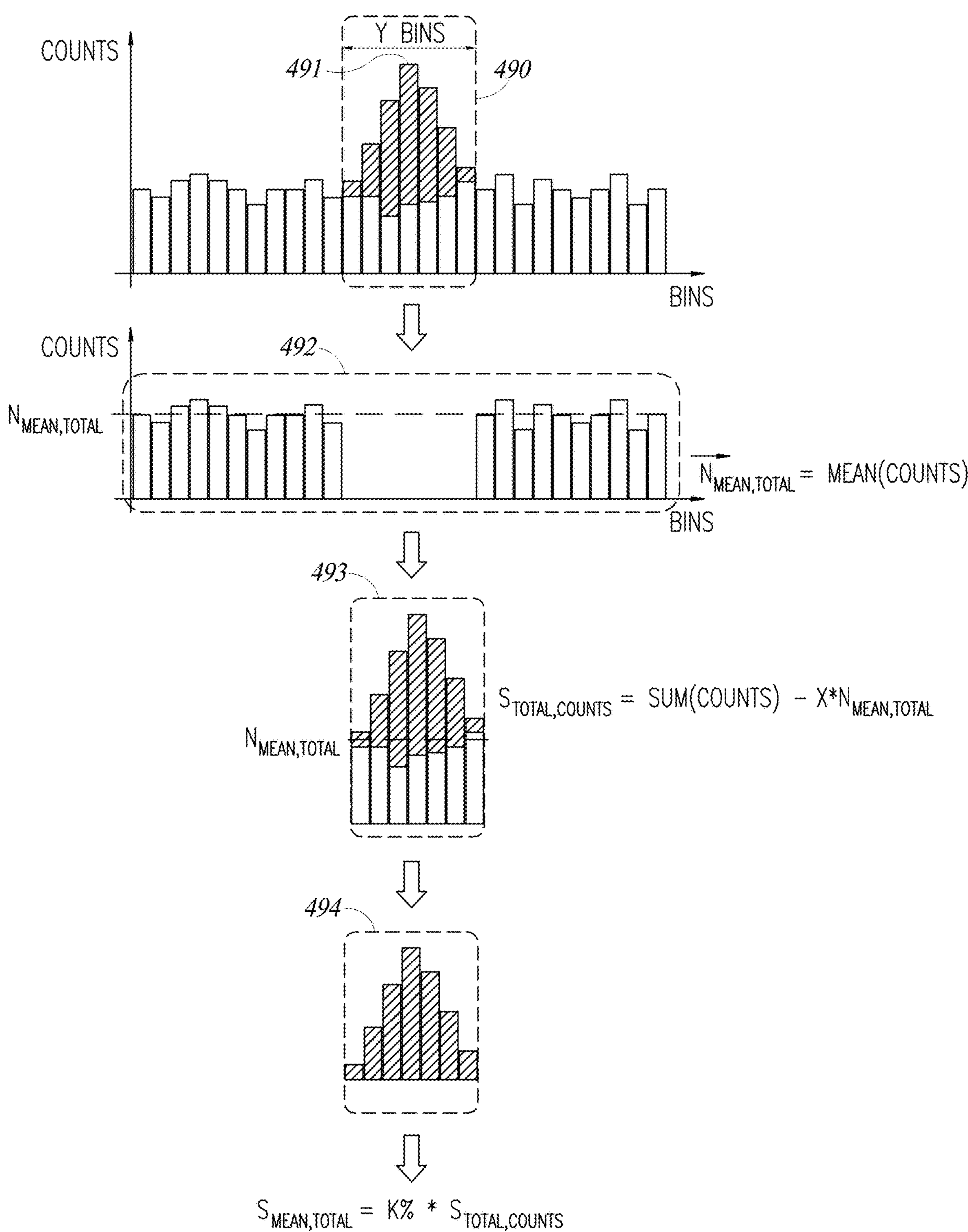
FIG. 31 is a diagram illustrating several steps of the measurement quality estimation method of FIG. 30.

Using the relationship for minimum SBNR, a method to estimate the quality of the measurement is described below. A diagram illustrating an example method of estimating measurement quality is shown in FIG. 30. A diagram illustrating several steps of the measurement quality estimation method is shown in FIG. 31. This method is used to determine the minimum number M of laser pulses required to meet particular desired outlier and PVM specifications and is the basis of providing precision optical power control in the device. First, given a particular histogram, the peak 491 is located using any well-known technique (step 470). Next, 2 to 3 times the number of full width at half maximum (FWHM) bins (the laser pulse width) are selected (Y bins of block 490) and removed from the histogram counts resulting in noise only block 492 and signal+noise block 493 (step 472). The noise counts remaining in block 492 are averaged to determine $N_{mean,total}$ (step 473). The counts in Y bins containing the signal+noise in block 493 previously removed from the histogram are summed and $N_{mean,total}\times$ Y bin counts are subtracted from the sum (step 474). This yields the energy of the signal $S_{total,counts}$ in block 494 (step 476). A percentage of the energy K is assigned to the peak based on the optimum bin/signal FWHM assumption (step 478). Note that other values are possible depending on the ratio between the signal FWHM and the bin width. For the optimum bin of $1.22\times\sigma_{signal}$, K=35%. Since the number of laser pulses ($M_{curr}$) used to obtain the current histogram is known as a result of the previous exposure, the values $N_{mean}$ and $S_{mean}$ can be obtained by dividing $N_{mean,total}$ and $S_{mean,total}$ by $M_{curr}$, respectively, and used in Equation (6) above (step 480). An updated value of $M_{next}$ is obtained by solving numerically to meet the PVM and Outlier constraints (step 482).

Figure 32:
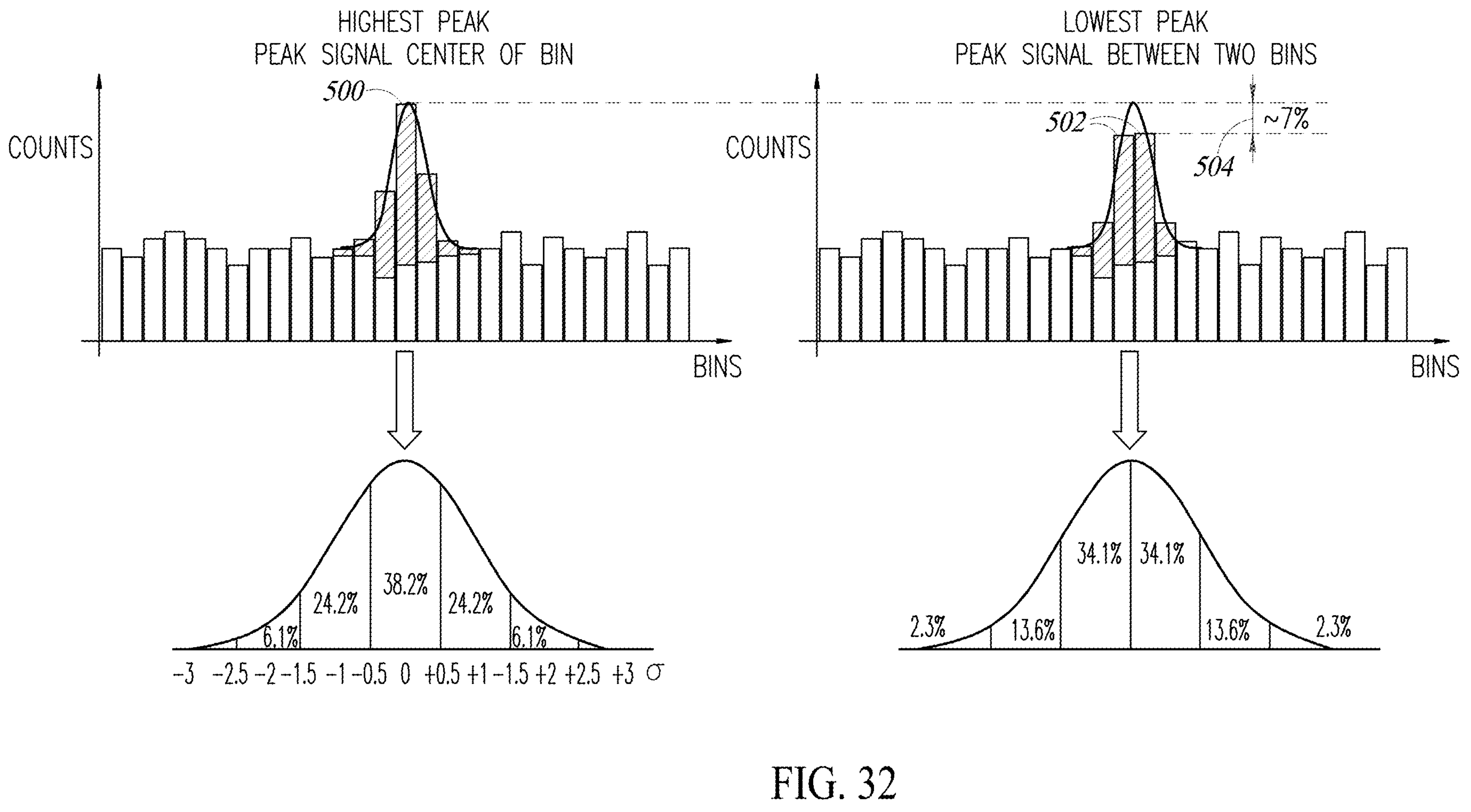
FIG. 32 is a diagram illustrating highest and lowest peak bin energy, for optimal pulse sigma vs bin width.

A diagram illustrating highest and lowest peak bin energy is shown in FIG. 32. This figure shows the difference between when the highest peak of the signal falls in the center of a bin 500 versus when the highest peak of a signal falls over two neighboring bins 502. The corresponding sigmas (bin width) are also shown for each scenario. The difference between the two is approximately 7% of the energy of the TX pulse, i.e. 46% versus 39%. For a safety margin, a worst-case value of 39% is used.

Figure 33:
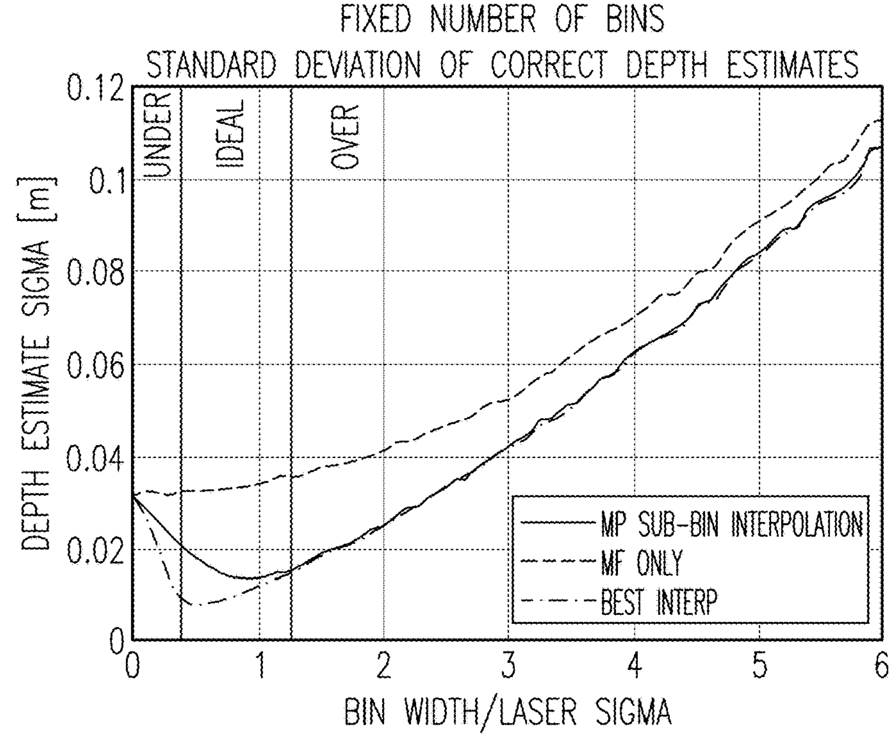
FIG. 33 is a diagram illustrating example depth standard deviation as a function of bin width over laser sigma.
Figure 33:

A diagram illustrating example depth standard deviation (i.e. measurement precision) as a function of the ratio between the bin width and laser sigma is shown in FIG. 33. For an optimized histogram detection, the bin width relates to the signal of interest. Finer bin width would lead to a lower count per bin and, conversely, wider bin widths would coarsen the measurement precision. Therefore, an optimum bin width/laser sigma is experimentally known and in this case for a Gaussian pulse, is 1.22× for a simple matched filter (MF) algorithm with sub-bin interpolation.

Figure 34:
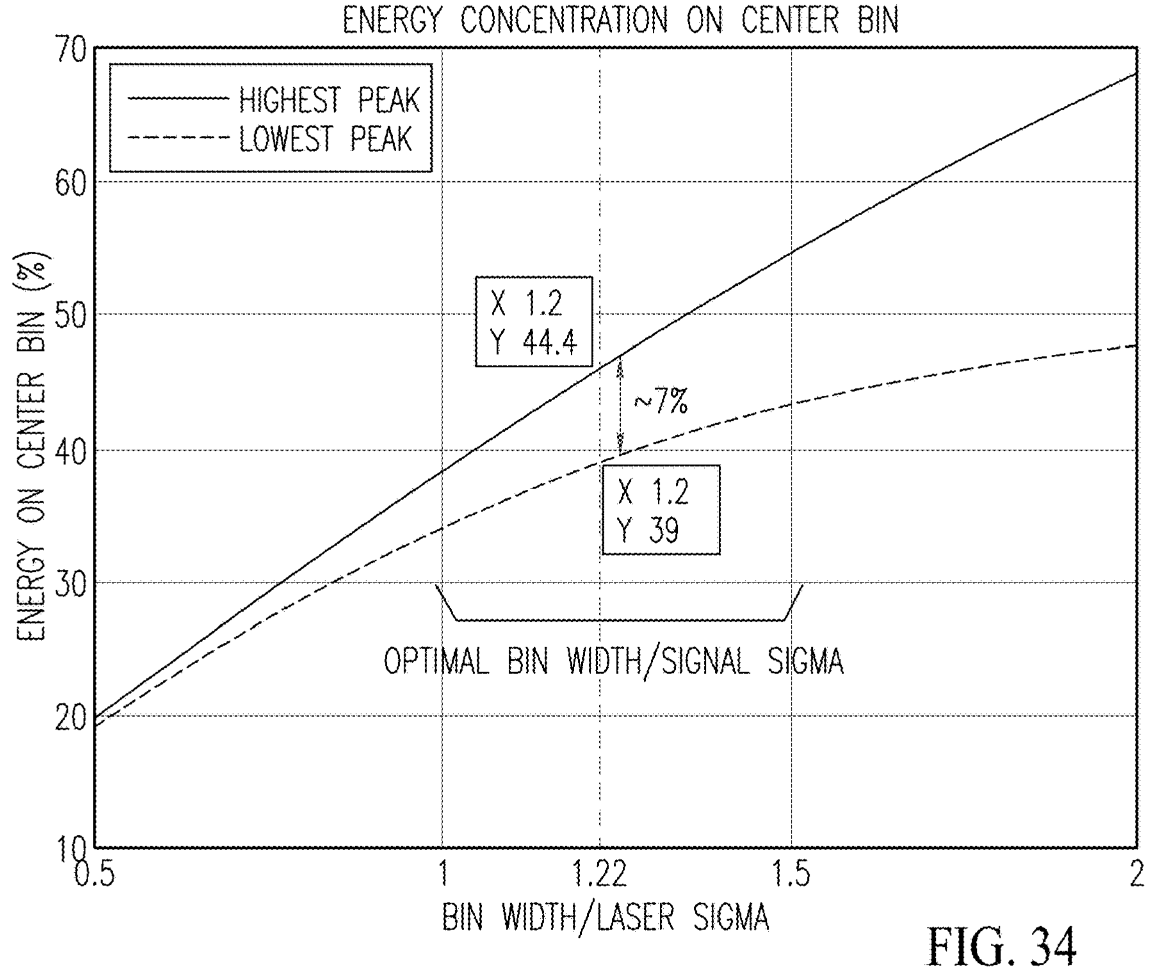
FIG. 34 is a diagram illustrating example energy concentration as a function of bin width/signal sigma.

A diagram illustrating example energy concentration as a function of bin width/signal sigma is shown in FIG. 34. Given an optimized ratio between the chosen bin width and signal sigma, a potential energy collected by the bin at the center of the return is shown, which can vary whether the peak is exactly in the middle of the bin or exactly in between two bins as illustrated in FIG. 32. For the optimal values, such a difference is approximately 7% of the energy, therefore, when calculating $S_{mean}$, the worst-case is preferably chosen to allow more margin in the $M_{next}$ estimation.

Figure 35:
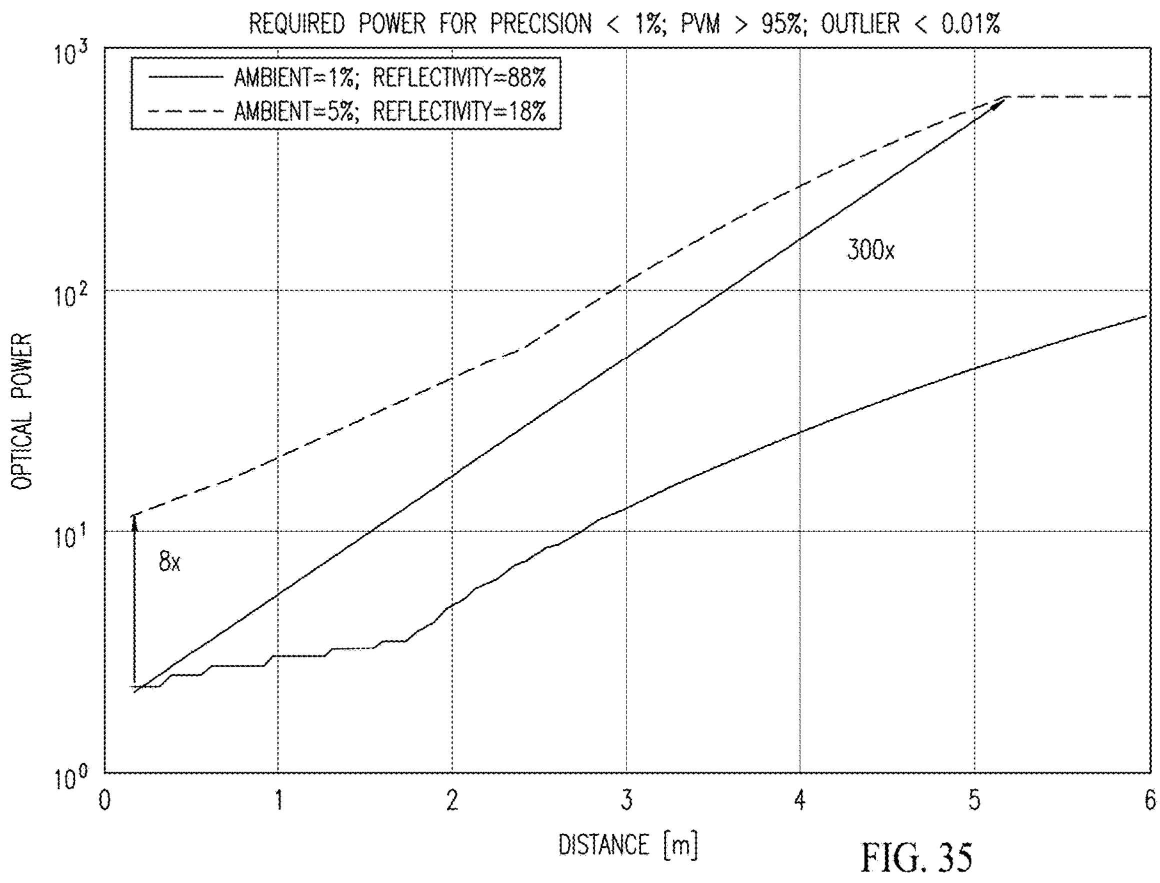
FIG. 35 is a diagram illustrating example required optical power for a high-resolution system as a function of reflectivity, ambient light, and distance.

As an example, the required optical power for a high resolution system for various different targets, distances, and reflectivities is shown in FIG. 35. The difference in required optical power for low ambient light, high reflectivity and high ambient light, low reflectivity for short distances shown on the left side of the graph is about 8×. For longer distances, the difference in required optical power for low ambient light, high reflectivity and high ambient light, low reflectivity shown on the right side of the graph is about 300×. This is a significant variation in required power, for the same measurement quality, which indicates that the ability to control the optical power by controlling the number of laser pulses during an exposure is a big advantage.

The above method of estimating an optimum number of laser pulses M for a next exposure based on a current measurement can be performed without requiring any information about the target. Each histogram is analyzed and a corresponding optimum number of laser pulses is calculated. Considering a matrix of pixels, it is likely that each pixel/histogram will require its own estimate of the number of laser pulses M. Thus, to benefit from a more optimal power control within the same scene, each pixel or group of pixels requires a different power control (i.e. a different M).

In one embodiment, in order to achieve this, both the sensor and the laser are paired together where the laser is implemented as a matrix of illumination elements (e.g., lasers, VCSELs, etc.). Each individual laser or surface emitting element, such as VCSELs, corresponds to the illumination of a section of the scene, in a display like projector fashion.

Figure 36:
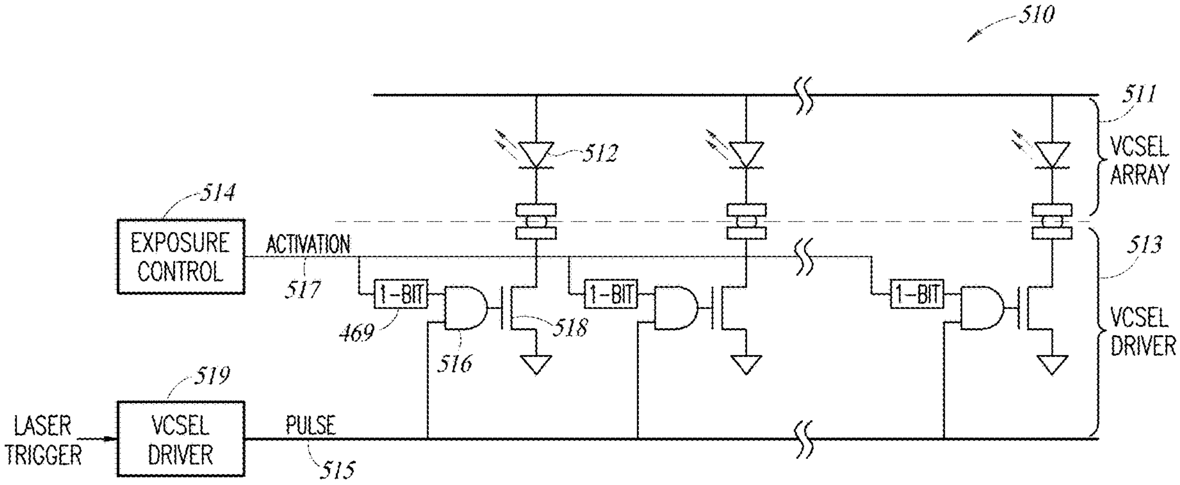
FIG. 36 is a diagram illustrating an example laser activation matrix with individual VCSEL control.

In one embodiment, each VCSEL includes a laser diode and its associated driver. Each individual particular laser can be masked by controlling the activation of the driver via an AND operation with a pulse control signal that is common to the entire array. A 1-bit memory is sufficient to accommodate such control and minimize the area. A diagram illustrating an example laser activation matrix with individual VCSEL control is shown in FIG. 36. The circuit, generally referenced 510, comprises a VCSEL array portion 511 and a driver portion 513 coupled by HBCs. The laser array comprises a matrix of individual laser emitting elements 512 (e.g., VCSELs) similar to the array shown in FIG. 4. The driver portion or laser activation control unit comprises a plurality of individual drivers 518, exposure control block 514, VCSEL driver circuit 519 operative to generate the PULSE signal, and a distributed activation memory comprising a plurality of 1-bit memories 469. Note only three laser elements and associated circuitry are shown for illustration purposes. Larger laser arrays are contemplated such as 50×50, 80×80, etc.

In operation, each individual VCSEL element 512 in the array is controlled by a corresponding driver circuit 518 which is gated by the output of a 1-bit activation mask. The 1-bit memories 516 effectively form a distributed laser activation map that is continually updated by the exposure control block 514. An optical exposure mask is effectively applied to the laser matrix under control of the exposure control block. Each individual 1-bit memory is set in accordance with an activation signal to realize the laser array mask. The output of each individual 1-bit memory is gated with the PULSE signal 515 generated by the VCSEL driver circuit 519. In this fashion, the device provides precise optical power control by individually controlling which lasers are on and which are off during an exposure. By modulating the pulsing of individual lasers within an exposure period, exposure control over the scene is provided as some lasers will be pulsed more or less than other lasers. Note that in one embodiment, the width of a laser pulse is constant, but the number of pulses is controlled to effectively control the optical power applied to a particular laser such as in accordance with the current scene. Controlling the number of laser pulses for each individual laser in the matrix provides exposure control for the entire scene. This technique is described in more detail infra.

Figure 52:
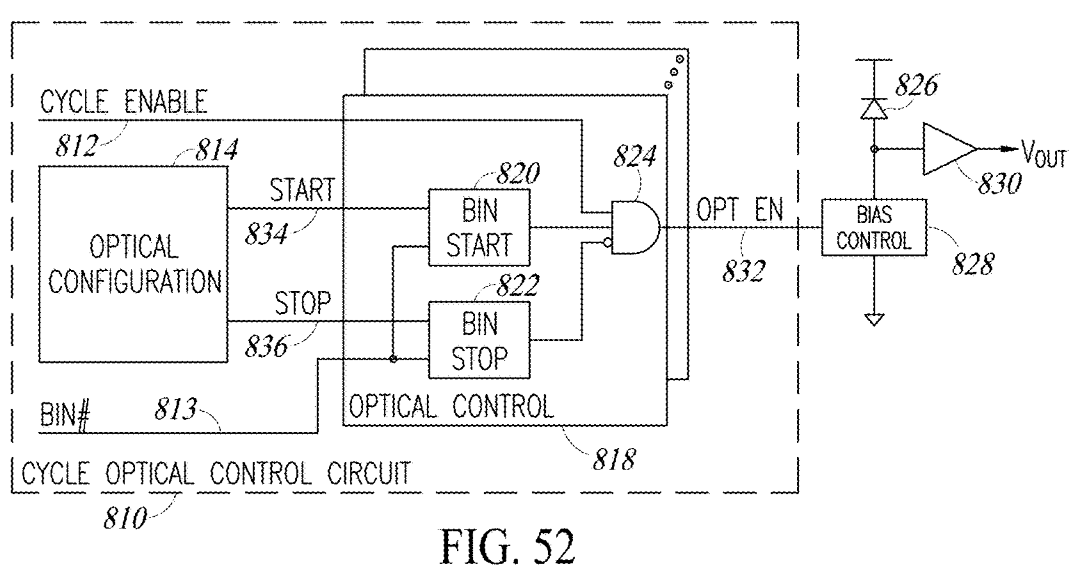
FIG. 52 is a high level block diagram illustrating an example cycle optical control circuit.
Figure 40:
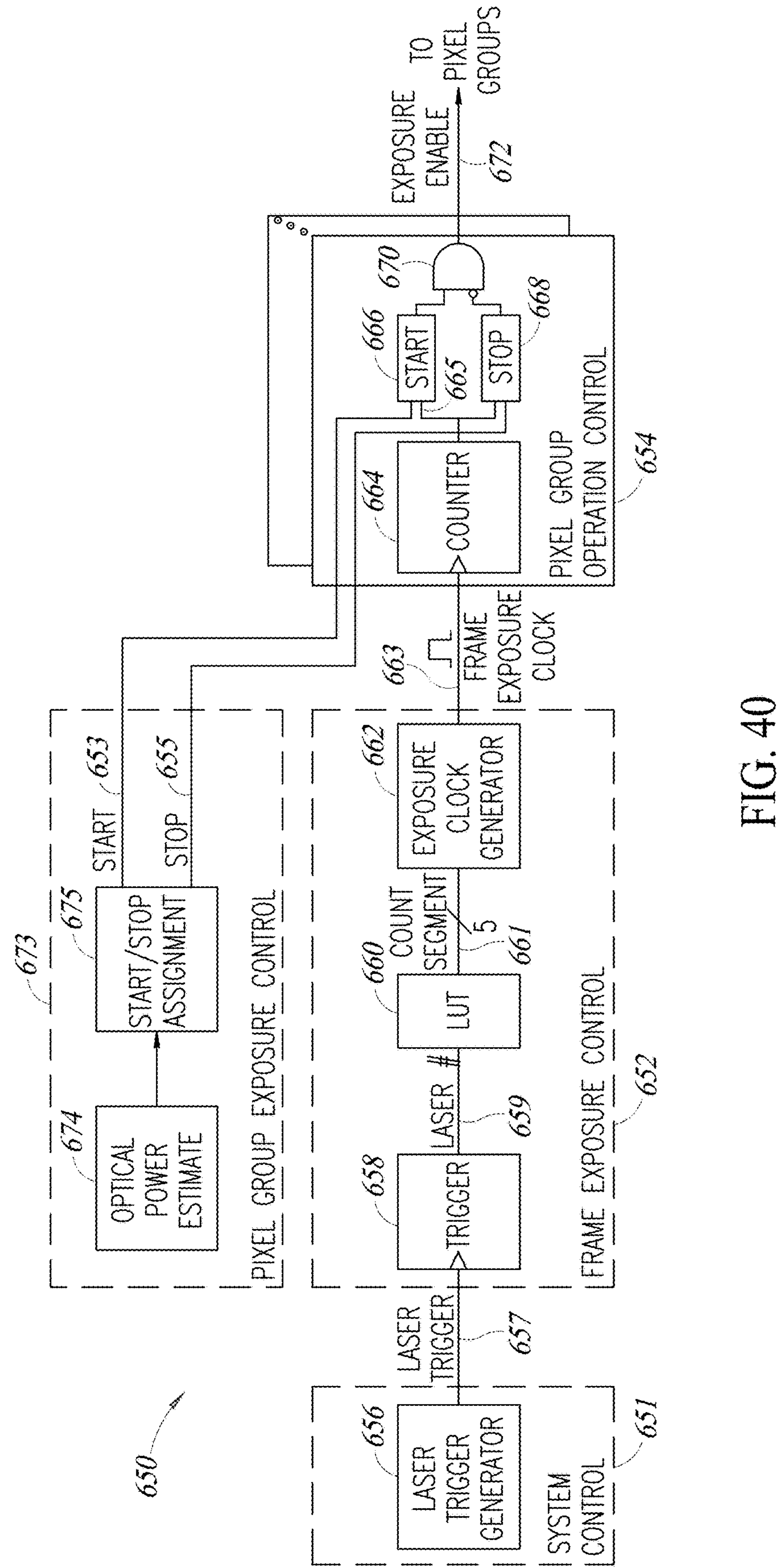
FIG. 40 is a diagram illustrating an example optical exposure control circuit.
Figure 49:
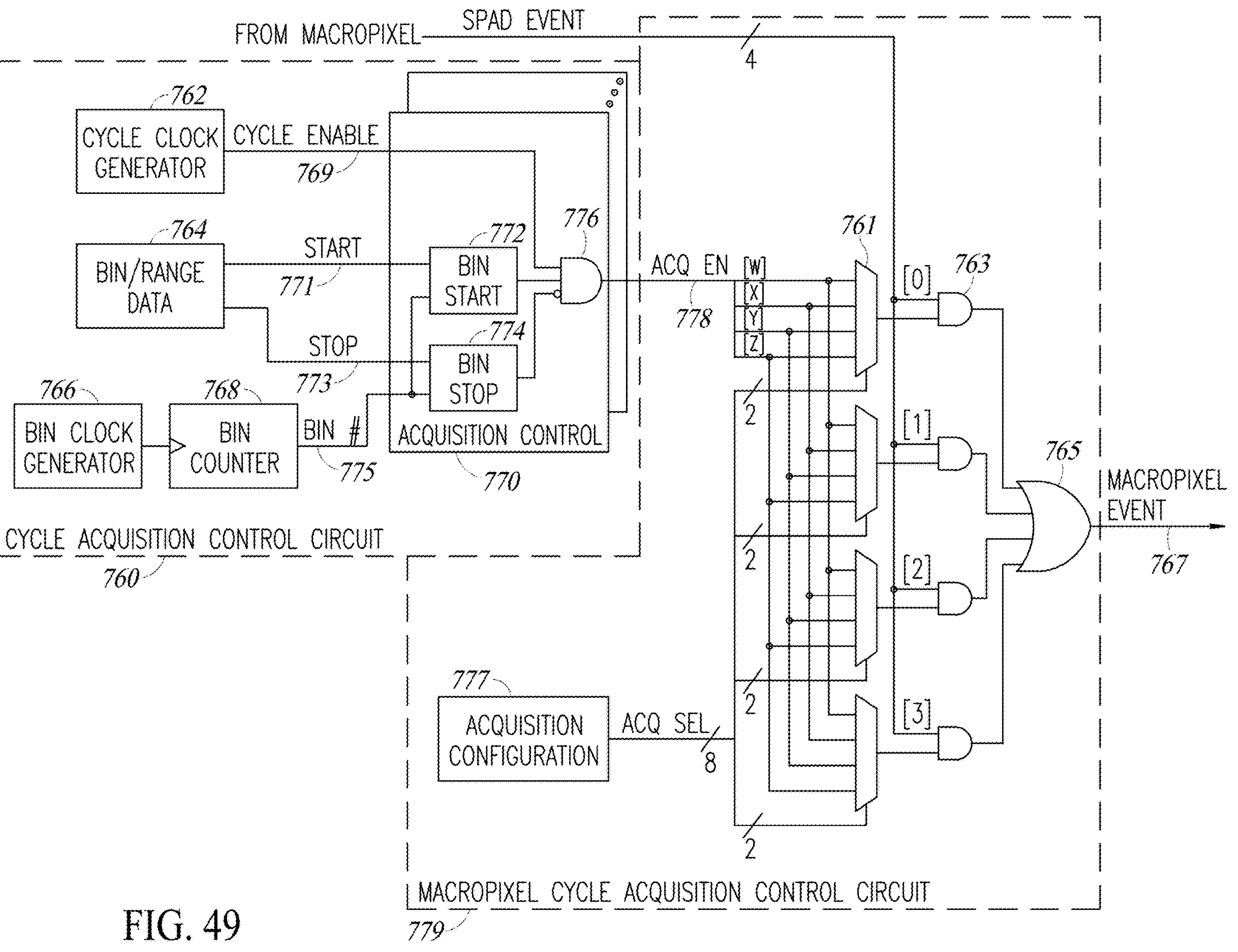
FIG. 49 is a high level block diagram illustrating an example cycle acquisition control circuit.

In an alternative embodiment, a start/stop control circuit similar to that shown in FIGS. 40, 49, and 52 (described in more detail infra) can be used instead of or in addition to the 1-bit activation mask of FIG. 36 to control each VCSEL in the laser matrix. Similarly, a 1-bit activation mask control mechanism similar to that shown in FIG. 36 can be used to control the sensor array exposure instead of or in addition to the start/stop circuits of FIGS. 40, 49, and 52.

Figure 37:
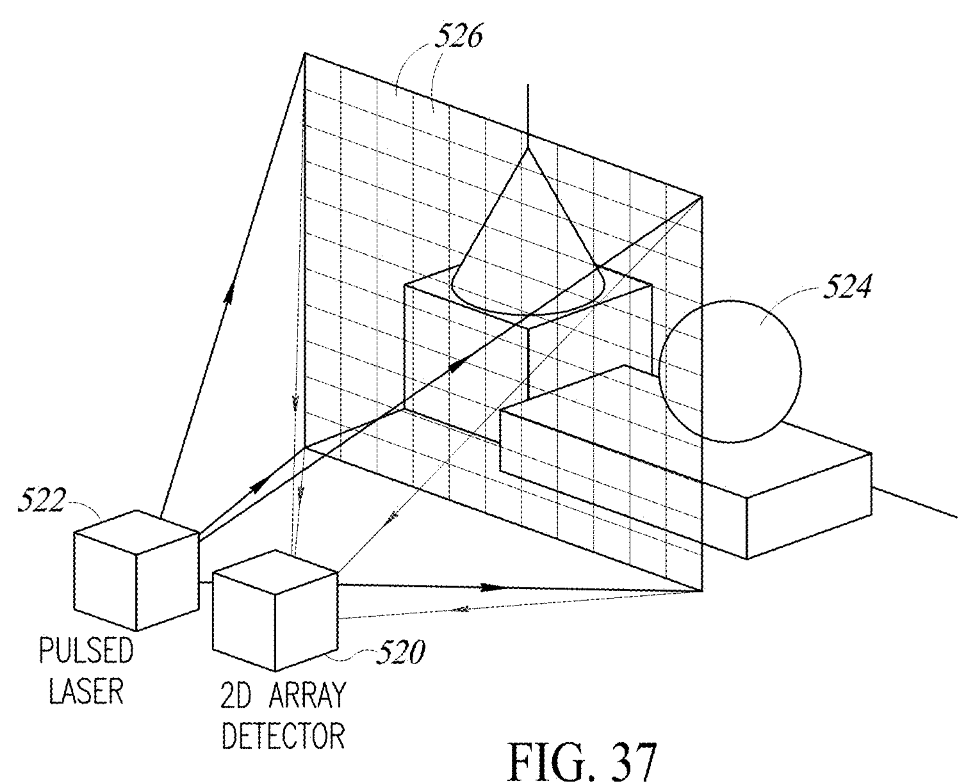
FIG. 37 is a diagram illustrating the pairing of the laser array and sensor array.

A diagram illustrating the pairing of the laser array and sensor array is shown in FIG. 37. The scene includes several targets 524 that are illuminated by a pulsed laser 522. The reflections are detected by the sensor 520 which is a 2D array detector. The illumination may be of various types, including flood or spot. In this case, each box 526 represents the area illuminated by one laser element. The output of all the individual lasers together illuminate the entire scene.

Figure 38A:
FIG. 38A is a diagram illustrating a scene with dense illumination from an example 8×6 laser matrix.

A diagram illustrating a scene illuminated by an example 8×6 laser matrix is shown in FIG. 38A. In this scene, an example of a section illumination is shown. For illustration purposes only, an 8×6 illumination matrix is shown where the portion of the scene illuminated by each laser is labeled with its corresponding matrix coordinate, i.e. block (0,0), block (0,1), etc. It is appreciated that the principles of the present invention are applicable to any size laser array, e.g., 50×50, 70×80, 100×100, etc. The illumination of each section 630 of the scene is managed by one of the lasers in the array. Although only 48 elements are shown in this example, it is appreciated that any number of elements may be implemented such as from 10 s to 1000 s or more to form a much larger laser matrix.

In operation, each of the sections 630 is imaged by a section of the sensor. The sensor might have a similar field of view (FOV)/field of illumination (FOI) of the laser with a straightforward mapping between laser and sensor elements. For example, the top-right corner of the scene, which is illuminated by laser (0,7) is imaged by the top-right section of the sensor. Depending on the size of the laser matrix, finer granularity can be achieved and therefore finer power control. In the case of coarse control shown in this example, worst case power is assumed meaning a maximum number of laser pulses M for that particular group.

Optical power control of each section of the scene is achieved by controlling the number M of pulses applied to the laser associated with each section 630 of a scene during an exposure period. The more pulses applied, the more optical power is generated to illuminate the section. By using the method of measurement quality estimation described in FIG. 30, the required optical power for a particular section is calculated and applied to the corresponding laser. Sections of the scene with more distant targets require additional power to detect. Therefore, a higher number M of pulses are configured for that particular laser. This is shown in the Figure as lighter sections that need less intensity (i.e. a smaller number of pulses) for closer targets, e.g., sections (4,3) to (4,7) and (5,3) to (5,7), and as darker sections that need more intensity (i.e. a larger number of pulses) for targets further away, e.g., sections (0,1) to (0,4) and (1,1) to (1,4). Note that each laser can be configured with any number of pulses during an exposure period and is not limited to the few discrete levels shown in this example scene. Typically, the granularity of the number of pulses is limited to a finite set of values for practical purposes.

Simulations of full optical power control for a scene as a function of control granularity performed by the inventor using the optical power control mechanism reveal that there is relatively little difference in optical power between different laser/sensor pair granularities. In particular, for example, a granularity of 1×1 means one laser is dedicated to each pixel/histogram, 3×3 means one laser for 3×3 pixels, etc. After estimating optimum optical power, it was found that there is very little difference between 1×1 and 6×6 pixel groups, for example. There is, however, a trade-off between granularity and efficiency. Preferably, the system is simplified using fewer lasers but this reduces the control. In one embodiment, the device uses one laser per 4×4 histograms.

As described supra, the control of optical power is achieved by controlling the number of laser pulses emitted for each individual laser. Therefore, both the laser and the sensor accommodate a control mechanism where the control of both the laser and sensor are synched to each other. When a laser is turned off, the corresponding pixel or group of pixels in the sensor are also turned off to minimize power consumption and SNR degradation. Once the number of pulses for each laser/group of pixels is determined, in the next frame, the exposure is controlled accordingly.

Figure 39:
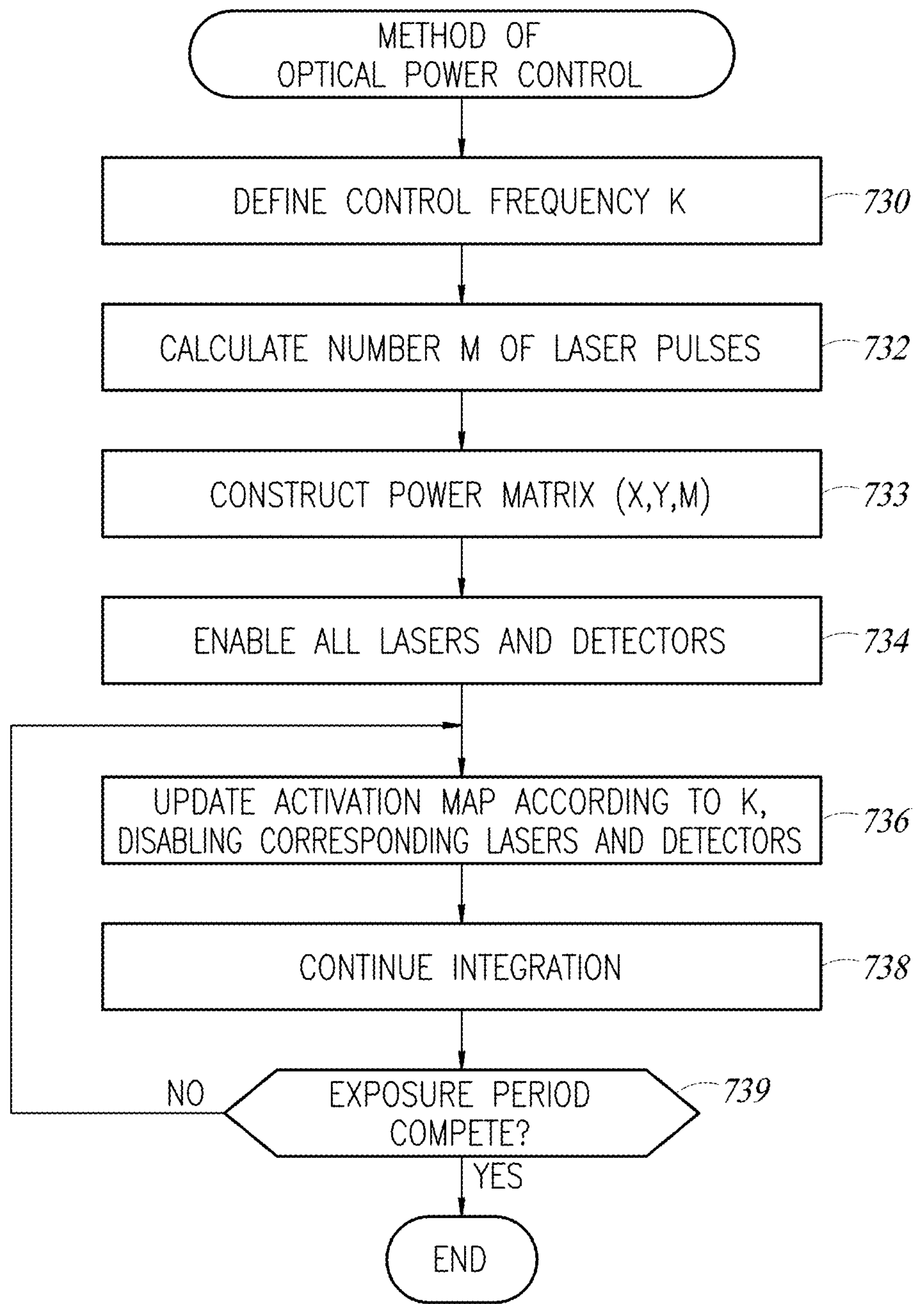
FIG. 39 is a diagram illustrating an example optical power control method.

In order to achieve the desired optical power control, the VCSEL array is designed to be 2D addressable, with the laser array and driver circuitry being 3D stacked, where each VCSEL is individually addressable and driven (without sharing drivers) as shown in FIG. 4. A diagram illustrating an example optical power control method is shown in FIG. 39. In one embodiment, an activation map for both the laser array and the sensor array is used in providing optical power control. As described supra, such control is achieved via an enable/disable memory bit per laser on the TX and per group of pixels on the RX. The activation maps can be updated multiple times during an exposure period.

First, the desired control frequency K is defined whereby updates are performed every K laser pulses, where K=1, 2, . . . , 10 k) (step 730). Note that finer the control (i.e. smaller K) is preferable but is more complex to implement and may not benefit power control. The number M of laser pulses required for a particular exposure is then calculated using the method of FIG. 30 described supra (step 732). Using the analysis method of FIG. 30, an optical power matrix, Power Matrix (X, Y, M), is obtained for the entire array where X and Y are coordinates of the lasers and M is the corresponding number of pulses (step 733). All lasers and sensors are then enabled (step 734) and depending on K, the laser and sensor activation maps are updated thus disabling those lasers and sensor pixels that are inactive in a respective activation map (step 736). Integration continues accordingly (step 738) and the method repeats until the end of the exposure period (step 739).

The exposure control mechanism of the present invention that utilizes the quality estimation of FIG. 30 will now be described in more detail. A diagram illustrating an example optical exposure control circuit is shown in FIG. 39. A diagram illustrating the look up table (LUT) of FIG. 39 is shown in FIG. 40. The circuit, generally referenced 650, comprises the system control block 651 including a laser trigger generator 656, array wide exposure control block 652 that includes a counter 658, look up table (LUT) 660, and exposure clock generator 662, a pixel group operation control block 654 that includes a counter 664, start 666 and stop 668 circuits, and gate 670, pixel group exposure control block 673 including optical power estimate block 674 and start/stop assignment circuit 675, which is done outside the array and updated every frame.

Figures 38B, 41:
FIG. 38B is a diagram illustrating a scene with sparse illumination from an example 8×6 laser matrix.
FIG. 41 is a diagram illustrating an example of look up table (LUT) of FIG. 39.

In operation, the system control block 651 functions to generate a plurality of signals used throughout the device including a laser trigger 657 generated by a laser trigger generator circuit 656. The laser trigger is the signal that provides the timing for generation of the laser pulses by the TX once per cycle/PRI. In one embodiment, there are 100 k laser triggers (i.e. cycles) per exposure period. The laser trigger provides the clock for a counter 658 in the array wide exposure control 652 that provides a digital representation of the current laser #(or cycle count) 659. The laser # is used as an index to the LUT 660 to generate a corresponding count segment 661. The LUT is used to reduce the number of bits needed to implement exposure control in the pixel groups. One embodiment of a LUT is shown in FIG. 41 and comprises 32 entries with each entry including a laser #642 and corresponding 5-bit count segment 644. As laser triggers are generated, the counter increments and depending on the count value, a particular count segment value will be generated. Note that the laser # intervals are not linear being closer together for low laser #s and further apart for higher laser #s. For example, laser # counts from 0 through 250 correspond to segment '0', laser # counts from 251 to 500 generate segment count '1' and so on with the last segment of 31 corresponding to laser #s 75 k to 100 k. The 5-bit count segment value is used to generate an EXPOSURE CLOCK 663 via an exposure clock generator circuit 662. This clock signal is then distributed to the pixel groups in the array.

A pixel group exposure control block 673 functions to perform the optical power control methods of the present invention discussed supra via optical power estimate block 674 which determines start and stop criteria for each pixel group. The point in time during an exposure period when a laser/pixel group turns on and off is configurable. Exposure can start at any time and stop at any time providing precise exposure control for the device. This enables several different exposure control configurations, e.g., row/column scanning, arbitrary scene intensities, foveate, etc.). Based on optical power estimates per histogram, the start/stop values are determined. A start/stop assignment block 675 generates 5-bit start 653 and stop 655 values to be configured in each pixel group.

Each pixel group receives the EXPOSURE CLOCK 663 as well as start/stop configuration information 653, 655. The EXPOSURE CLOCK is input to a 5-bit counter 664 whose output is input to start 666 and stop 668 circuit. The start circuit functions to compare the counter output with the configured start value. Its output is active when the counter output equals or exceeds the programmed start value. Similarly, the stop circuit functions to compare the counter output with the configured stop value. Its output is active when the counter output equals to exceeds the programmed stop value. The two signals are gated via AND 670 to generate an exposure enable signal 672 active between the start and stop values that is distributed to the pixel(s) in the particular pixel group.

Thus, similar to updating the activation map described supra, the circuit 650 uses the clock signal 663 to increment the internal counter 664. Several operation parameters including START/STOP are passed once per frame through a scan-chain mechanism, col/row, or any other suitable means of communication with the pixel array. The exposure clock generated by the exposure control 652 is fed to the array and functions to control the exposure. Note that other enable signals, clocks, etc. can still be used in parallel.

In each pixel or group of pixels, as the exposure clock is generated, when the counter 664 reaches the previously configured START value, the comparison between the internal counter and the START parameter indicates to the pixel or group of pixels to start operating. Thus, the exposure enable output bit 672 is active and the pixel is capable of accumulating the incoming photon events.

Since the counter continues to integrate at the exposure clock rate, when the internal counter 664 reaches the value STOP, another comparison occurs to deactivate the exposure enable signal thereby disabling the accumulation of photons.

In summary, by means of generating a global exposure clock that is fed to multiple counters (one per pixel/group of pixels), with per pixel/group of pixel START/STOP parameter comparison, the exposure of individual pixel/group of pixel across the integration time is controlled.

In one embodiment, the size of the internal counter and START/STOP value registers 666, 668 depends on the temporal granularity of the desired control. For example, the maximum number of laser trigger pulses 657 per frame can be set to 100 k. If a granularity of individual laser pulses is desired, the internal counter and start/stop values need $\log_2$ (100 k)=17 bits. This, however, is typically not necessary, where a much coarser control is enough. For example, if the control is set to 1000 laser pulses, enough bits to cover 100 k/1 k=100 or 7 bits is needed, thereby reducing the area requirements within the pixel. In general, the host/user is responsible for generating the exposure clock segments. In the example above, the exposure clock is active every 1000 laser pulses in a uniform manner. In the example of FIG. 41, the segments in the LUT may be uniform (linear) or nonuniform (nonlinear) with the LUT holding 5-bit count segment values.

The ability to control the exposure is very versatile and can be used for various applications, namely: (1) exposure control which defines for how long a pixel/group of pixels operates (active histogramming), including when to start and stop within an exposure period; (2) time multiplexing which defines when each pixel operates, which can be paired with a laser scanning system, in any 1D direction (e.g., left-right, right-left, top-bottom, bottom-top) or 2D direction, depending on how many bits (i.e. states) the internal counter and START/STOP values are designed for; (3) flexible ROI where different regions have different exposures for different ranges of targets.

Figure 42:
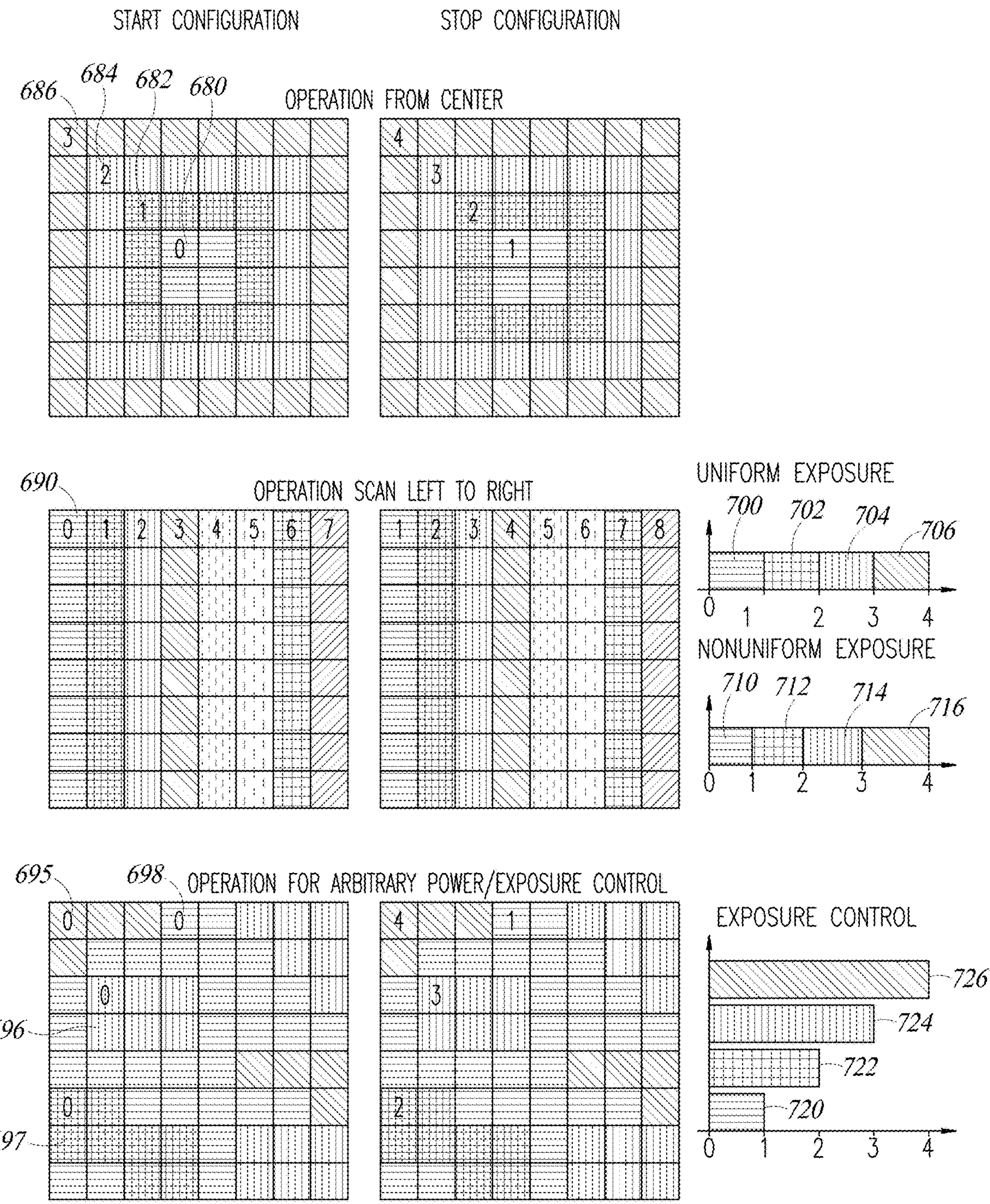
FIG. 42 is a diagram illustrating example applications of the optical exposure control circuit of the present invention.

Several examples of the application of exposure control to the laser/detector array will now be described. A diagram illustrating example applications of the optical exposure control circuit of the present invention is shown in FIG. 42. Although these examples are for an 8×8 laser/pixel group array, it is appreciated that any size array may be used. For the three pairs of example arrays shown, the start configuration is shown on the left and the stop configuration is shown on the right. In addition, pixels with similar hatching share a common start/stop configuration value. For these exposure examples, consider the count segments of the LUT in FIG. 41.

The top array pair illustrates scanning from the center out to the edges. The numbers 0, 1, 2, 3 indicate the starting count segment for those pixels. Thus, the center four '0' pixels 680 start histogram accumulation at the beginning of the exposure at count segment 0 and stop accumulating at count segment 1. Thus, the center four pixels are exposed for a total of 250 laser trigger pulses or cycles assuming the example LUT of FIG. 41. The next ring of 10 '1' pixels 682 start histogram accumulation at count segment 1 and stop at count segment 2. These pixels are exposed (i.e. histogram accumulated) for 500 cycles. The next ring of '2' pixels 684 start at count segment 2 and stop at count segment 3 for an exposure of 750 cycles. Similarly, the outer ring of '3' pixels 686 starts at count segment 3 and stops at count segment 4. In this fashion, the array is scanned from the center out. Whether the exposure for each portion of pixels is linear or nonlinear depends on the count segment value the LUT is configured with, typically configured by the host.

Left to right scanning type exposure is shown in the middle pair of example arrays where each column 690 is assigned a count segment start value in increasing order, i.e. 0, 1, 2, 3, 4, 5, 6, 7, with corresponding count segment stop values of 1, 2, 3, 4, 5, 6, 7, 8. This means each column is exposed by itself for one count segment that shifts from left to right. For example, the left column starts histogram accumulation at the beginning of the exposure period and stops histogram integration when the internal counter 664 (FIG. 40) reaches 1, i.e. after one exposure clock (or one count segment). The second column from the left starts histogram accumulation when the internal counter reaches 1 (when the first column stops) and stop integration when the internal counter reaches 2, and so on through the eighth column.

An example of uniform exposure for four groups of pixels is shown on the upper right where all four count segments 700, 702, 704, 706 corresponding to the left four columns of the middle array pair are of equal size. An example of nonuniform exposure for the same four left most columns pixels where the count segments 710, 712, 714, 716 increase in size is shown just below. Note that the LUT may be configured with arbitrary count segment values for each of the 32 entries in any desired arrangement including uniform, nonuniform, or a combination thereof.

Note that to assign sufficient integration time per column, the exposure clock pulses are generated accordingly. Similarly, flexible regions of interest (ROI) for exposure control can be created in the same fashion. For example, the lower array pair in FIG. 42 illustrates a scenario including four groups of pixels each having unique cross hatching. All pixels in all four groups start their exposure at the same time, i.e. they all start at internal counter equal to 0, the beginning of the exposure. Each of the four groups, however, stop at a different time as shown in the exposure control diagram in the lower right. In this example exposure, the first pixel group stops when the internal counter equals 1, i.e. count segment 1 (exposure 720). These pixels require the least amount of power. The second pixel group stops when the internal counter equals 2, i.e. count segment 2 (exposure 722), which needs additional power. The third pixel group stops when the internal counter equals 3, i.e. count segment 3 (exposure 724), and the fourth pixel group stops at count segment 4 (exposure 726), which requires the most power as the target is furthest from the sensor. Thus, regions can be created in arbitrary locations having an arbitrary number of pixels where each region is assigned an arbitrary exposure in accordance with any desired criteria, e.g., target distance.

Thus, the device can generate an exposure clock that is uniformly distributed, meaning equally spaced count segments or a constant ratio to the laser trigger pulses 657 (in the case of the exposure control) or constant frequency for the scanning option. Uniform distribution, however, is completely arbitrary. Because the host or the system control 651 manages the generation of the exposure clock 663, it can be optimized to reduce overall hardware requirements while maintaining the desired control, e.g., the bit width of the 664 counter as well as the number of bits of the start 666 and stop 668 registers.

For exposure control for example, if the maximum number of laser pulses is 100 k, a finer control (e.g., every few hundreds of pulses) is preferable at the beginning of the exposure range and a coarse control towards the end, since the SNR increases with the square root of M. For example, finer control with finer granularity at the beginning of the exposure may be desired. Thus, fine granularity of 250 laser pulses 659 per count segment is configured from 0 and 4 k laser pulses to provide fine power control, i.e. one exposure clock pulse per 250 laser pulses for 16 count segment codes. Medium granularity in the middle range of 2000 laser pulses per count segment is configured between 4 to 30 k pulses for 13 count segment codes total. Coarse granularity in the end range exposure of 35 k laser pulses per count segment is configured between 30 to 100 k for a total of two count segment codes. Note that these fine, medium, and coarse controls require only a 5-bit counter and 5-bit START/STOP register rather than 100 k/250=9-bits otherwise if the fine granularity was applied to the entire exposure range.

The ability to fine tune granularity is a big advantage and enables precise exposure control as full range fine granularity is not always needed although may be desirable for a portion of the exposure period. It is noted that specialized hardware is not required in the pixel circuitry to achieve this. Only the mechanism described supra (FIGS. 40 and 41) is required to generate the appropriate exposure clock signals which uses the LUT 660 to determine when to generate exposure clock pulses with respect to the laser trigger pulses 657 from a different reference within the exposure period. The laser trigger which is used as the reference to generate the laser pulses at the laser is fed to the counter 658 whose output is monitored by LUT 660, which is provisioned with the specific laser #642 at which the exposure clock will be generated. The count segment 644 indicates the laser #'s for generating the 32 exposure clocks (for a 5-bit counter). The contents of the LUT can be updated partially or completely every frame time to accommodate dynamic changes in the scene and operating conditions.

Variable Resolution Via Optical Illumination

Typically, dToF devices use a VCSEL array to illuminate a scene where the optical power generated by each VCSEL is fixed. Although the power to individual VCSELs can be controlled by varying the number of pulses in an exposure period, the power during each pulse is fixed. Conventional devices fix the optical power at the time of design which then sets the available illumination at short and long distances. For closer targets in a scene, i.e. shorter range, less optical power is required and for further targets, i.e. longer range, more optical power is required. Since optical power is fixed a design point must be selected which limits the performance, efficiency, and signal to noise ratio (SNR) of the device.

Conventional active sensing systems are generally designed with a specific illumination scheme, including direct TOF systems. In order to achieve 3D imaging (x, y, z), the illuminator can be chosen based on the spatial resolution and range perspective for a given power budget. If spatial resolution is the top criterion then uniform/flood illumination is chosen where the light source is diffused and illuminates the entire field of view allowing a high resolution sensor to obtain high spatial resolution (x and y) information and distance (z) as shown in FIG. 38A. If longer range is more important, the illuminator is designed to emphasize sparse illumination where the optical power is concentrated in dots allowing longer range with the same power but with fewer points in the scene as shown in FIG. 38B.

Each of the scene sections are imaged in the sensor using a number of pixels. Each pixel (or macropixel) generates a depth point, if it receives sufficient active light. In the case of uniform illumination (FIG. 38A), the entire scene receives active illumination and each pixel can measure a depth point, leading to greater resolution. The power requirement, however, to achieve such high resolution at long range is excessive. Conversely, the sparse illumination (FIG. 38B) covers the same FOV with the same number of pixels. Due to the fact that not all of the scene receives active illumination energy (i.e. only the dots), only those pixels that collect signal energy can report a depth point thereby reducing the overall spatial resolution (x, y). Due to this concentration of power, however, longer range can be achieved with lower power.

It is noted that the ambient light collected by the pixels does not change with the [0288] distance. The light received from the target reflection follows the square law with the collected photons dropping with the square of the distance. This causes the SNR to drop rapidly with the distance. This well-known phenomena is used to construct a system based on which parameter (i.e. spatial resolution or range) is more important which only a fixed configuration being possible. It is desirable to have a device that provides the ability to trade off spatial resolution for range.

For example, consider a mobile robot moving around in a scene. For targets and objects far away, sparse illumination is sufficient. The same robots, however, may be required to manipulate nearby objects, which requires a higher spatial resolution. Providing two systems, one for long range, low resolution and one for short range and high resolution drastically increases the system price and complexity.

It is well-known that signal power falls off by the square of the distance. When a system is designed to operate in sparse mode the nearby targets receive an excess of power.

Designing a system to meet the worst-case scenario (i.e. furthest range, lowest reflectivity, etc.) leads to a waste of power in any other scenario, while exhibiting depth distortion due to extreme signal echoes at short range. Conversely, designing a uniform illumination system to meet the same worst-case scenario would require excessive overall power consumption where the higher resolution at long ranges are not beneficial to the system.

The device of the present invention does not force a designer to choose between a system optimized for either short or long range by providing a system that is operative to project Gaussian dots with minimum beam waist width at the maximum distance (e.g., 8 m) resembling sparse illumination at the maximum range. Consequently, for distances closer than the maximum range, the beam is wider (i.e. blurred) where at a minimum range it is essentially flood illumination. It is noted that although this is a typical limitation in focused beams, here it functions to extract higher spatial resolution.

Figure 43A:
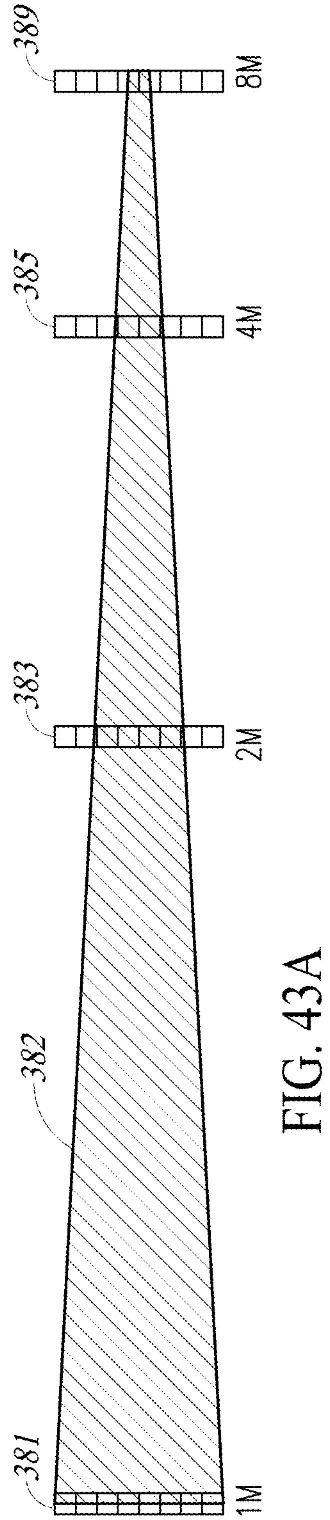
FIG. 43A is a diagram illustrating example Gaussian beam optical illumination, reflected from the target and irradiated onto the sensor array.
Figure 43B:
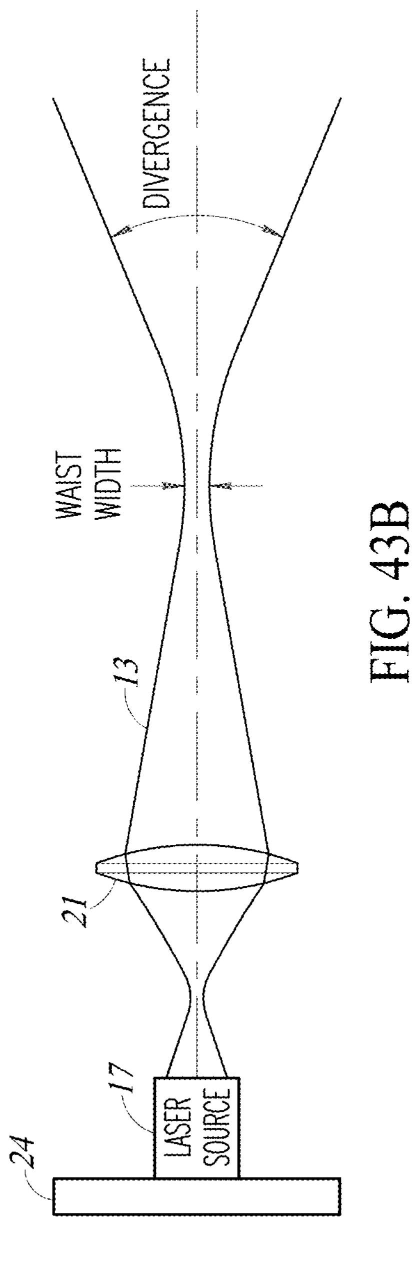
FIG. 43B is a diagram illustrating an example optical system to generate Gaussian beam shaped illumination.
Figure 43C:
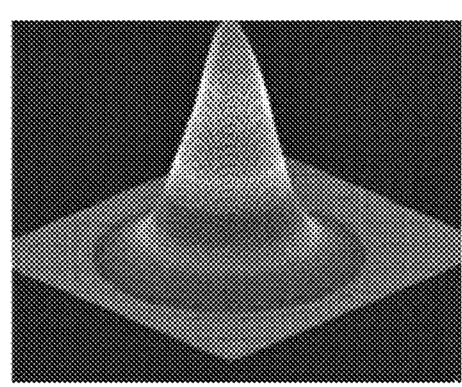
FIG. 43C is a diagram illustrating a perspective view of example Gaussian beam optical illumination.

A diagram illustrating an example optical system to generate an inverted cone shaped illumination beam profile is shown in FIG. 43B. The optical system comprises the laser array 24 (FIG. 1) comprising a plurality of VCSELs 17. The laser beam emitted enters the lens system 21 which is constructed to output a Gaussian (conical) shaped beam 13 with a minimum waist width designed to occur at the maximum range of the system (e.g., 8 m in this example system). Beyond this distance the beam may or may not diverge depending on the design of the lens system. A diagram illustrating a perspective view of example Gaussian shaped beam optical illumination is shown in FIG. 43C. The Gaussian or inverted cone shaped beam as a 3D perspective view up to the distance of minimum waist width is shown.

Figure 43D:
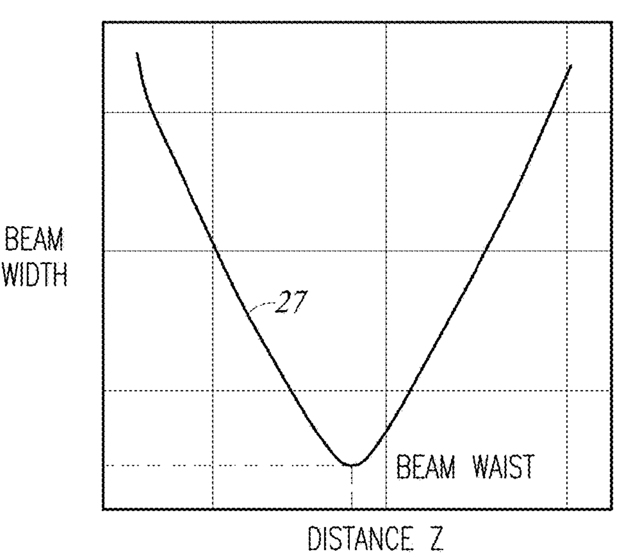
FIG. 43D is a diagram illustrating beam width as a function of distance for an example optical system.

A diagram illustrating beam width as a function of distance z for an example optical system is shown in FIG. 43D. Trace 27 shows that the beam width at close distances is at a maximum and that as the distance increases, the beam width narrows until it reaches a minimum at a distance that is design to correspond with the maximum range (e.g., 8 m in this example). Beyond the maximum range, the beam width diverges as shown in FIG. 43B.

Note that although the purpose of the optical system is to produce a very focused image at the focal length where the beam width is a minimum, the beam blurs (i.e. blurred dots) as the distance decreases and the energy of the laser dot spreads out. One skilled in the optical art can design the beam to be tuned to have similar $1/z^2$ size over the entire range. For example, the beam at the waist can have an area A, at ½ of the distance z, the area would be 4A, at ¼ of the distance the area would be 16A, etc. From the perspective of the sensor, the laser dot increases in size at close range, reaching a wider area in the target and enabling the capture of spatial information by more pixels.

Figure 44:
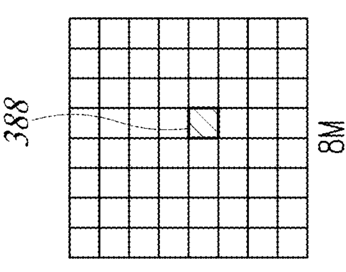
FIG. 44 is a diagram illustrating example resulting pixel coverage of Gaussian beam shaped illumination for a single VCSEL.
Figure 44:
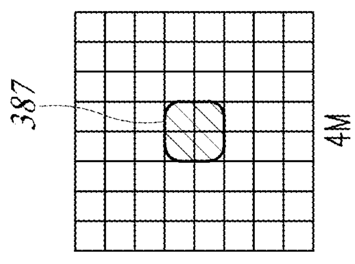
Figure 44:
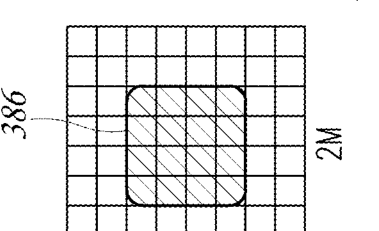
Figure 44:
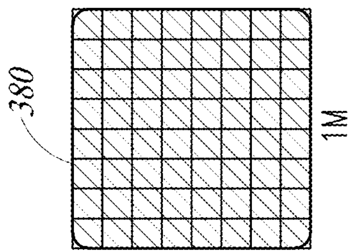

Thus, in one embodiment, the device of the present invention provides a variable illumination pattern that transitions between two primary modes, namely (1) a high-density flood illumination and (2) a low-density sparse illumination. This is achieved by generating cone shaped illumination. A diagram illustrating example Gaussian shaped (inverted cone shaped) optical illumination reflected from the target and irradiated onto the sensor array is shown in FIG. 43A. A diagram illustrating example resulting pixel coverage of Gaussian beam shaped illumination for a single VCSEL is shown in FIG. 44. The inverted cone shaped illumination 382 is generated by one or more lens in the lens system 21 (FIG. 1), a component that shapes the light output by the laser array in the TX 15. Considering an 8×8 pixel sensor for illustration purposes, the lens system is operative to provide dense or flood illumination that covers the entire sensor array at one meter (front view 380, side view 381). At two meters, the cone shaped illumination narrows and fewer pixels are illuminated. In this example, the center 4×4 pixels are illuminated (front view 386, side view 383) at two meters. At four meters, the cone shaped illumination narrows further and fewer pixels are illuminated. In this example, the center 2×2 pixels are illuminated (front view 387, side view 385) at four meters. At eight meters, the cone shaped illumination very narrowed and only one pixel is illuminated. In this example, the center pixel is illuminated (front view 388, side view 389) at eight meters. Note that based on misalignment and manufacturing tolerances, more than one pixel may be illuminated at eight meters, e.g., portions of four neighboring pixels may be illuminated. Similarly with pixels at other distances. Regardless, the device provides different illumination for short and long ranges.

Providing varying illumination, i.e. cone shaped, provides several advantages depending on the operational range. At shorter operational distances, the flood illumination pattern uniformly covers the entire field of view. Due to the shorter distance, the return signal is stronger, enabling the sensor to achieve a high spatial resolution. The uniform distribution ensures comprehensive spatial coverage, effectively utilizing relatively low optical energy to capture detailed spatial features at close range. At longer operational distances, the illumination pattern becomes sparse, typically represented by discrete collimated dots of higher intensity. In this configuration, optical power is concentrated into fewer areas, thus improving the ability of the sensor to detect signals at extended distances. Although spatial resolution is reduced, the increased per-pixel photon return ensures adequate detection at significantly greater ranges than achievable with uniform illumination while using the same relatively low optical power.

The invention supports intermediate modes or gradual transitions between these two extremes. Thus, the illumination distribution smoothly adapts to operational needs across a range of distances, offering an optimized balance between spatial resolution and detection range.

Figure 45:
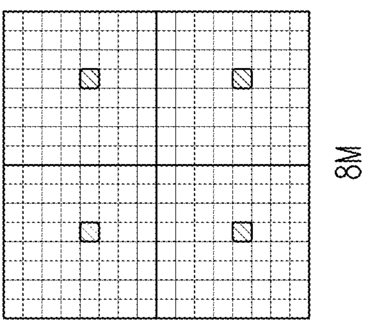
FIG. 45 is a diagram illustrating example resulting pixel coverage of Gaussian beam shaped illumination for a group of four VCSELs.
Figure 45:
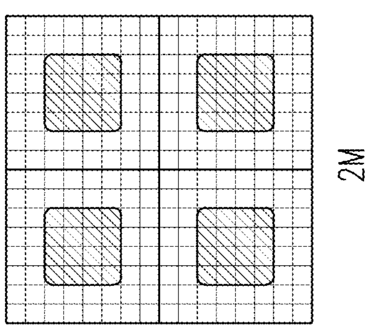
Figure 45:
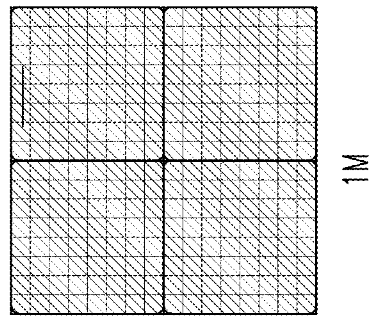

A diagram illustrating example resulting pixel coverage of Gaussian beam shaped illumination for a group of four VCSELs is shown in FIG. 45. Similar to the illumination of fewer and fewer pixels at longer distances shown in FIG. 44 for a single VCSEL, the variation in illumination as a function of distance for a group of four VCSELs is shown. Extending the example to larger VCSEL arrays, e.g., 50×50 80×80, the variation in illumination by distance is the same.

Along with optimally shaping the illumination pattern in a cone shape to provide varying amounts of pixel coverage for dense (close) and sparse (far) distances, the device also provides a pixel mask mechanism that turns off pixels that are not illuminated by their corresponding VCSEL. Not only does this reduce power consumption but also improves the SNR of the histograms for each pixel since stray ambient light is kept out of the histogram count during the time that a pixel is not illuminated with light from the laser array. There is no point to count noise (i.e. ambient light, stray light, etc.) during the bin slots in a histogram that correspond to distances that are not illuminated for a particular pixel (e.g., macropixel or super macropixel).

To achieve this, prior to operation such as at the time of manufacture, the sensor is calibrated to precisely determine expected illumination dot locations for sparse modes. During this calibration, activation maps (or LUT, logic, etc.) are defined to selectively enable or disable pixels based on expected photon returns at various distances. This pre-configuration ensures optimal pixel activation patterns, reducing noise and unnecessary photon accumulation thereby boosting SNR.

It is noted that conventional SPAD based systems lack flexible sensitivity adjustment leading to issues such as pile-up distortion in high intensity light conditions or insufficient sensitivity in low light scenarios. These systems also struggle with controlling the granularity of event detection, particularly when dealing with varying illumination profiles or distances. There is a need for a SPAD-based system that provides programmable sensitivity control, both electrically and optically, to optimize photon detection while mitigating noise and distortion The SPAD based sensor system incorporates programmable sensitivity control, enabling dynamic configuration of electrical and optical masking for a pixel or group of pixels (e.g., individual SPAD, macropixel, or super macropixel level). Each pixel or group of pixels is associated with configurable enable acquisition signals as well as optical control signals. These signals allow for selective event propagation to corresponding histograms for time-of-flight measurements, reducing pile-up distortion and enabling adaptive sensitivity based on illumination conditions. The system supports both electrical masking, where SPAD generated events are gated without affecting SPAD operation as well as optical masking where SPADs are unbiased to disable photon detection. A programmable configuration allows for flexible start/stop timing within a cycle/PRI, thereby improving granularity and performance in direct time-of-flight applications.

Figure 46:
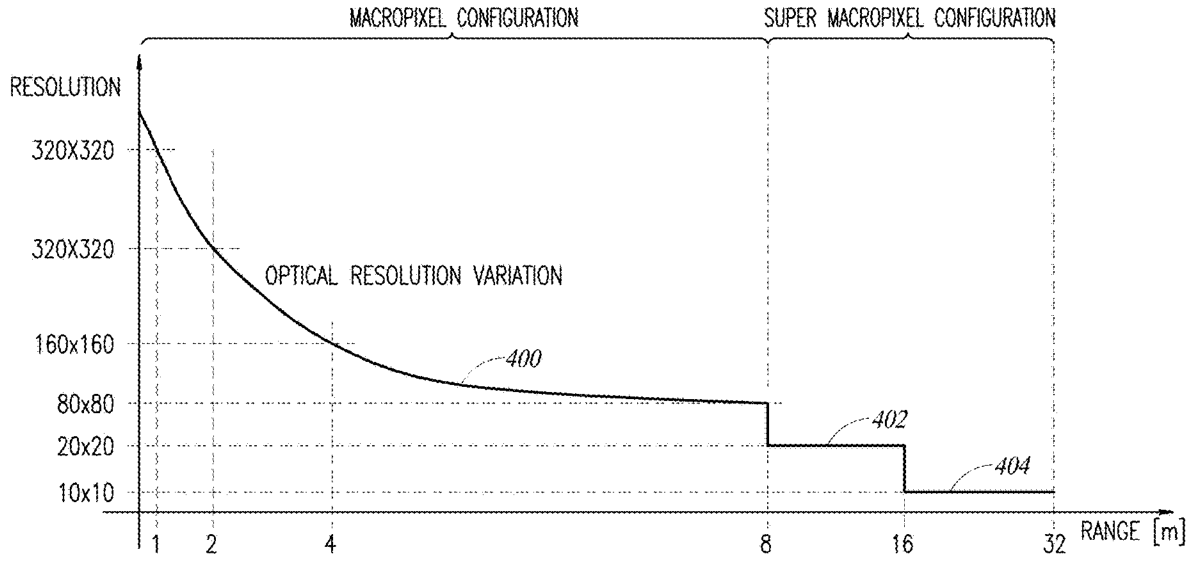
FIG. 46 is a diagram illustrating variable optical resolution pixel configuration control for optimal signal acquisition.

A diagram illustrating variable optical resolution pixel configuration control for optimal signal acquisition is shown in FIG. 46. In one embodiment, the sensor can be configured, as described in detail supra, to operate in a macropixel configuration 406 and a super macropixel configuration 408. In the macropixel operating mode (portion 400), the device provides variable resolution based on the optical illumination, for example up to 8 m whereby all VCSELs are turned on and operate at regular low power. In one example, this corresponds to from 320×320 to 80×80 SPAD resolution.

Moreover, beyond the maximum range covered by the macropixel histogram memory, in the absence of any target, in one embodiment, the sensor can be configured to (1) lower the resolution even further, turning off lasers but operating the remaining lasers left on at a higher power level; and (2) operate the sensor in super macropixel mode to cover longer ranges. Both are performed while maintaining the total optical power substantially constant. Note that this operation is dynamically configurable on a frame by frame basis.

In particular, from 8 to 16 m (portion 402), the device operates in super macropixel configuration where only 1/16 of the VCSELs are turned on, the remainder being turned off (via bias control, etc.). The VCSELs that are on operate at a mid-power level higher than low power, where the overall optical power remains fairly constant.

Similarly, from 16 to 32 m (portion 404), the device operates in super macropixel configuration as well where 1/64 of the VCSELs are turned on, the remainder being turned off. The VCSELs that are on operate at a high power level higher than mid power, where here too the overall optical power remains fairly constant.

Electrical Masking/Acquisition Enable

Electrical masking functions to selectively gate SPAD-generated electrical pulses, allowing or preventing their propagation to subsequent stages of signal processing (e.g., histogram accumulation). It does not disable SPAD sensitivity but controls event propagation electrically. Electrical masking utilizes one or more configurable "acquisition enable" signals, typically shared throughout the array, providing a flexible gating mechanism that determines whether photon generated pulses propagate from SPAD detectors into histograms. Each SPAD event is gated through AND logic, which combines the SPAD pulse with an enable signal to generate a macropixel event signal.

As described in more detail infra, the device includes a multiplexer to dynamically select from several possible enable signals per individual SPAD. A configuration register stores selectable control bits that define which enable signal is combined with each SPAD output. This arrangement allows fine granularity control over event acquisition.

For example, each macropixel containing four SPADs can independently select one out of multiple enable signals per SPAD, thereby enabling independent and highly customizable electrical gating across the SPAD array. This selective masking is beneficial for managing signal acquisition at various distances, specifically accommodating the variable size and shape of optical illumination spots, which change with distance as well as improving the SNR of histograms since histograms are stopped for non-illuminated portions of the cycle.

Figures 47, 48:
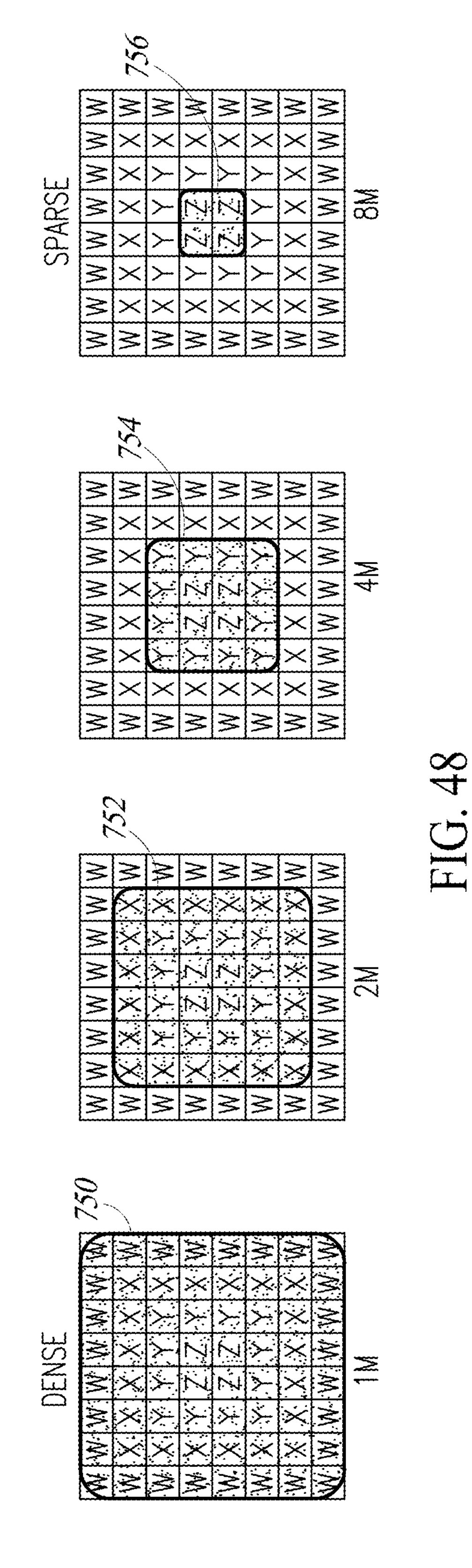
FIG. 47 is a diagram illustrating example timing of SPAD acquisition enable signals for electrical pixel masking.
FIG. 48 is a diagram illustrating the result of electrical pixel masking configuration for each individual SPAD with arbitrary acquisition enable configuration.

A diagram illustrating example timing of SPAD acquisition enable signals for electrical based (as opposed to optical based) pixel masking is shown in FIG. 47. A laser pulse 730 is generated at the beginning of each cycle during which histogram 732 and intensity 734 acquisitions are performed followed by an idle period 736. During the histogram update, each of N bins is incremented during a respective slot 738 if a photon is received during that particular time slot indicating an event occurred on a respective SPAD. To implement electrical masking to compliment variable resolution depending on distance, one or more acquisition enable signals are generated for pixels which determine when to start and stop histogram integration. Four acquisition enable signals 740, 742, 744, 746 are shown in this example, for SPAD W (SPAD ACQ ENABLE[W]), SPAD X (SPAD ACQ ENABLE[X]), SPAD Y (SPAD ACQ ENABLE[Y]), and SPAD Z (SPAD ACQ ENABLE[Z]), respectively. In this example, the four acquisition enable signals are distributed across the sensor array as described infra. Each SPAD receives one of the four possible enable signals. It is appreciated that any number of acquisition enable signals can be generated such as one for the entire sensor array, one for each SPAD, or any number therebetween.

A diagram illustrating the application of electrical pixel masking configuration for each individual SPAD with arbitrary acquisition enable configuration at four example ranges is shown in FIG. 48. As described supra, at a range of one meter, the entire example 8×8 pixel array is illuminated as indicated by the bold square 750. At this short distance, the event collection for all pixels W, X, Y, Z are enabled (see bins 0 and 1 in FIG. 47). At a range of two meters, only the events for X, Y, Z pixels are enabled since only these pixels are illuminated (box 752) and the events from the W pixels are disabled since they are not illuminated thereby improving their SNR and reducing power consumption. Similarly, at a range of four meters, only the events for the Y and Z pixels are enabled (box 754) and the events for the W and X pixels are disabled. At a range of eight meters, the events for the Z pixels only are enabled (box 756) and the events for the W, X, and Y pixels are disabled. How the pixels are organized to accumulate events into histograms (multiple configurations) is arbitrary here. The signals only indicate whether the particular pixel will contribute to its associated histogram or not, optimizing SNR of such histograms.

Using acquisition enable signals, each SPAD can be controlled whether or not to be included in the histogram acquisition based on the selection of which acquisition enable signal to use. For example, it can be used to configure SPADs that are receiving light, whether operating in (1) static sparse mode where only few SPADs sense any light and are enabled, therefore, only those should be enabled; (2) dense mode where all SPADs are enabled all the time; or (3) dynamic mode for the case of variable resolution as a function of distance. Each SPAD has a corresponding configuration to select which enable to use.

A high level block diagram illustrating an example cycle acquisition control circuit is shown in FIG. 49. The global cycle acquisition control circuit 760, comprises a cycle clock generator circuit 762, bin/range data 764, bin clock generator 766, bin counter 768, multiple acquisition control blocks 770 including bin start 772 and bin stop 774 circuits, and gate 776. Each micropixel includes a cycle control circuit 779 comprises acquisition configuration 777, multiplexers 761 and gates 763, 765 for event combination.

In operation, the cycle clock generator functions globally for the entire detector array to generate a cycle enable signal 769. The bin clock generator 766 generates the timing clock for the N bin slots in the histogram. The bin index associated with a particular range, configured a priori, is retrieved from the bin/range data block 764, which may comprise discrete logic, LUT, etc. The bin counter 768 keeps track of a digital representation of the current bin #775. The histogram start and stop bin for each enable, configured a priori, is retrieved or provided by the bin/range data or other functionally equivalent circuit. The start 771 and stop 774 bin number are input to the acquisition control blocks 770 (one per enable signal for a total of four in this example). Each acquisition control circuit functions to compare the bin start and stop values with the current bin # via comparator logic. The output of the bin start and stop circuits is gated with the cycle enable to generate the acquisition enable (ACQ EN) signal 778 that indicates when within each cycle to enable histogram integration. The cycle acquisition control circuit is global and the ACQ_EN signals are distributed throughout the SPAD array.

In this example, four enable signals ACQ_EN[W, X, Y, Z] are generated and distributed to four multiplexers whose outputs are gated with the SPAD event signals from individual SPADs. Acquisition configuration block 777 generates an 8-bit select ACQ SEL as four 2-bit selects per pixel that choose which of the four ACQ EN signals to apply to each of the four SPADs in a macropixel. Each SPAD event can be gated with any of the four possible enable signals. The gated event signals are ORed to generate a single macropixel event signal 767.

Thus, the device provides the sensor with the ability to only collect information for SPADs that have information by providing electrical masking, which can be accomplished very quickly (as opposed to optical masking which is slower). In a static system with sparse sensing with spot-like illumination, each SPAD can be enabled/disabled to locate the dots and collect the highest SNR. In a dynamic system, such as described herein, the SPAD enable allocation occurs progressively with time. This is achieved using configurable enable electrical masking whereby pixels are configured to operate with one or several possible enable profiles. In the example shown, the laser dot is located in the center of the group (group Z) at sparse long range and progressively increases in spot size towards the sensor at dense short range.

Thus, the system is able to selectively disable macropixels or SPADs that are not expected to receive meaningful return signals (e.g., that are outside the dot pattern), further reducing required power and computation and improving histogram SNR. This can be performed statically via factory calibration or dynamically based on detected scene structure.

The acquisition enable sensor illumination mechanism described supra offers significant benefits including: (1) improved spatial resolution at short distances due to uniform flood illumination; (2) increased effective range at longer distances via sparse illumination and concentrated optical energy; (3) enhanced SNR achieved by selectively deactivating pixels based on expected lack of illumination; and (4) reduced optical power requirements and energy consumption due to dynamic redistribution of illumination energy. These advantages make the present invention particularly suitable for applications requiring both fine spatial detail at close range and extended detection capabilities at greater distances, including robotics, autonomous vehicles, 3D scanning, and augmented reality systems.

Optical Masking/Optical Enable

Optical masking functions to physically disable the SPAD device by removing or significantly reducing its bias voltage thereby preventing photon induced event generation. This optical masking inherently reduces the sensitivity of the detector and is used primarily to manage intense optical reflections.

Optical masking is performed by physically controlling the SPAD detector's operational state via biasing circuits. A group of one or more "optical enable" (OPT EN) signals are used to selectively bias or unbias individual SPAD detectors within each pixel or groups of pixels (e.g., macropixel, super macropixel, etc.). Note that this control scheme is hardwired, assigning each OPT EN signal to a fixed SPAD position within the macropixel, for example. By setting these signals, specific SPAD detectors within macropixels can be selectively activated or disabled at the device level.

Optical masking thus offers the capability to significantly reduce or increase the effective sensitivity of macropixels dynamically. In cases of intense optical reflection (i.e. strong pulse conditions), certain SPAD detectors can be selectively disabled to prevent saturation or "pile-up" distortion, maintaining high accuracy in photon timing measurement histogramming.

Figures 50, 51:
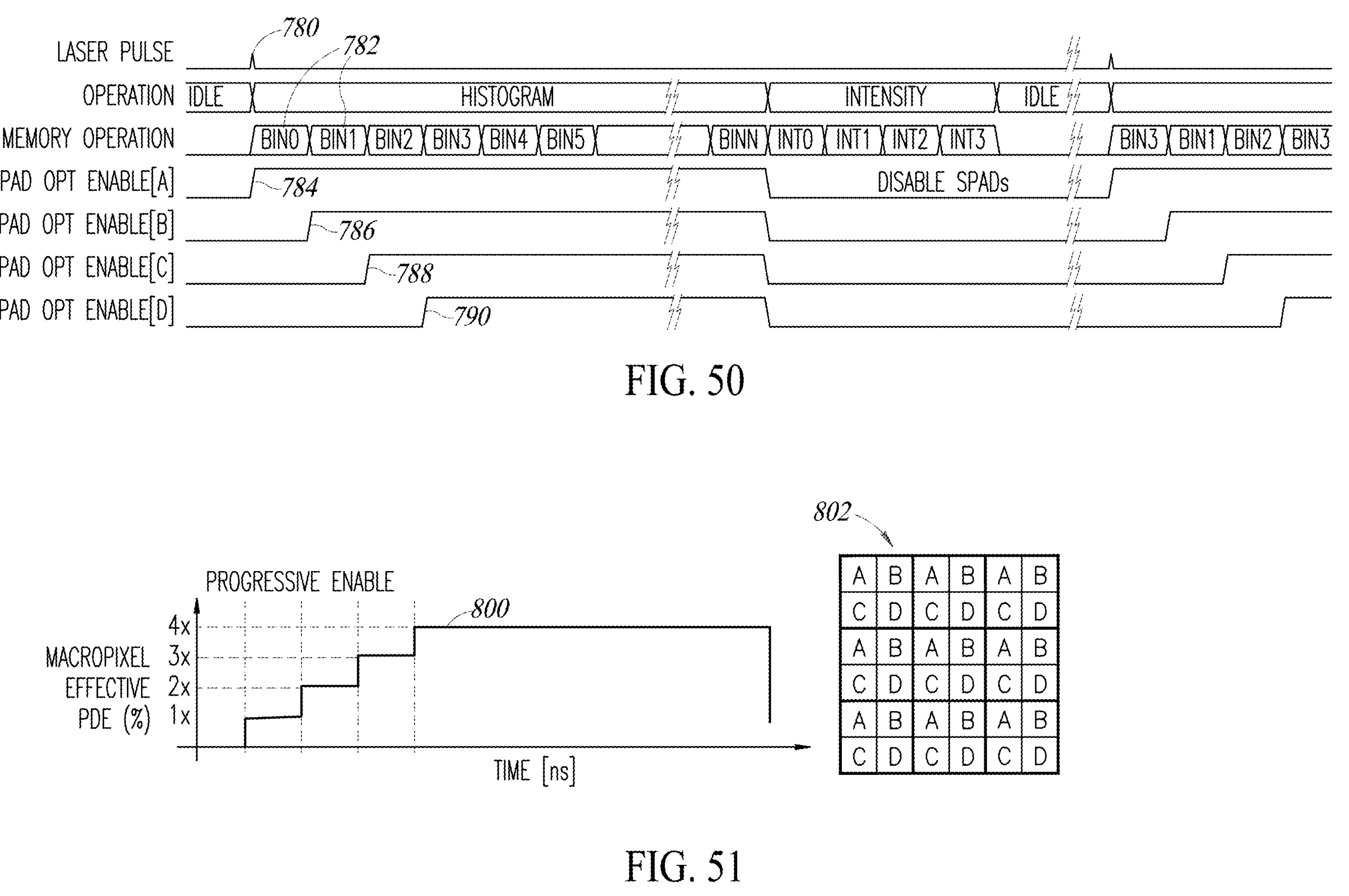
FIG. 50 is a diagram illustrating example timing of SPAD optical enable signals for optical pixel masking.
FIG. 51 is a diagram illustrating the result of progressive optical pixel masking.

A diagram illustrating example timing of SPAD optical enable signals for optical pixel masking is shown in FIG. 50. A laser pulse 780 is generated at the beginning of each cycle during which histogram and intensity acquisitions are performed followed by an idle period. During the histogram update, each of N bins is incremented during a respective slot 782 if a photon is received during that particular time slot indicating an event occurred on a respective SPAD. To implement optical masking, one or more optical enable signals are generated for pixels which determine when to start (enable) and stop (disable) SPAD operation. Four optical enable signals 784, 786, 788, 790 are shown in this example, for SPAD A(SPAD OPT ENABLE[A]), SPAD B (SPAD OPT ENABLE[X]), SPAD C (SPAD OPT ENABLE [C]), and SPAD D (SPAD OPT ENABLE[D]), respectively. In this example, the four optical enable signals are hardwired across the sensor array as described infra. In one embodiment, the A, B, C, D, optical enable signals are hardwired to the four A, B, C, D SPADs making up each macropixel. It is appreciated that any number of optical enable signals can be generated such as one for the entire sensor array, one for each SPAD, or any number therebetween.

A diagram illustrating the result of progressive optical pixel masking is shown in FIG. 51. A result of applying the four example optical enable signals to the SPAD array is a progressive enable 800 where the SPADs in each macropixel 802 ramp up enabled one after the other. This gives the device the ability to handle very strong reflections near the sensor. Since the transmitter is constructed to reach a long range and considering the signal reduction with distance, very close objects having very high reflectivity could possibly completely blind the sensor causing pile-up distortion and effectively creating very strong current consumption in the SPADs. The optical enable mechanism optically masks the SPADs depending on start/stop values configured for each enable signal. Each SPAD in a macropixel is associated with one of the four optical enables A, B, C, D. This operation effectively modulates the photo detection efficiency (PDE) of the macropixels, turning on each SPAD, which is one quarter of the PDE, one at a time. Note that each optical enable signal can be configured to have any arbitrary start and stop bin slots. In the example presented herein, the start bin slot of each optical enable signal is delayed by one bin slot with all four optical enable signals stopping at the end of the cycle.

By progressively enabling the SPADs of a macropixel, the effective sensitivity (PDE) of the macropixel can therefore be adjusted. In addition, enabling SPADs at different times increases the chances of acquiring more sparse events in time, which is useful in cases of high signal (i.e. a close by target and straylight/cover glass reflections) to decrease pile-up effects. It is also used to provide a gated histogram and/or intensity. Note that the optical enable is independent from other system enables, e.g., the acquisition enable and histogram aggregation enable.

A high level block diagram illustrating an example cycle optical control circuit is shown in FIG. 52. The cycle optical control circuit 810, comprises an optical configuration block 814, multiple optical control blocks 818 including bin start 820 and bin stop 822 circuits, and gate 824. The cycle clock generator circuit, bin clock generator, and bin counter shown FIG. 49 are common and not shown or described again for brevity.

In operation, the cycle enable signal 812 is distributed throughout the SPAD array. In accordance with the optical configuration, the start 834 and stop 836 criteria are written to the bin start 820 and bin stop 822 circuits, respectively. These circuits function to compare the current bin #813 to the start and stop values. The outputs of each circuit along with the cycle enable are gated to generate the optical enable OPT EN signal 832 for each block 818 that indicates when within each cycle to physically enable and disable each SPAD. The optical enable signal is input to a bias control circuit 828 to control the biasing of a respective SPAD 826 before buffering 830.

Thus, in addition to electrical masking, the invention provides optical masking by selectively controlling the optical sensitivity of individual SPAD pixels. Each pixel is optically enabled or disabled through direct biasing control signals (OPT EN). When optically masked (i.e. disabled), a SPAD pixel becomes insensitive to incoming photons, completely preventing photon-induced events from occurring at the pixel level.

In one embodiment, the optical masking signals are hardwired to individual pixels within macropixels, providing a less flexible, but more robust, coarse grained sensitivity management compared to electrical masking. The primary advantage of optical masking is the prevention of photon events at the source pixel, thus completely removing specific noisy or overly sensitive pixels from contributing unwanted data.

The progressive SPAD enable scheme described supra functions to dynamically activate SPAD elements in stages within a measurement cycle. This progressive activation addresses scenarios with strong initial reflections by initially activating fewer SPAD detectors and progressively enabling more detectors as the cycle progresses. This technique spreads photon detections across multiple timing bins, thus reducing event collisions and avoiding pile-up distortion.

The device also incorporates a static quenching or "hot pixel masking" feature whereby individual SPAD detectors that are found to exhibit high noise rates, referred as "screamer" SPADs, can be permanently disabled through static quenching signals. This improves sensor reliability and measurement accuracy by permanently eliminating problematic detectors from the acquisition process.

Note that the sensor system supports user-defined calibration and configuration procedures where users can program the timing windows for acquisition and optical enable signals, selecting appropriate start and stop points based on specific operational requirements. Once configured, these settings remain consistent across sensor cycles and system restarts, ensuring predictable and reliable performance in operational environments.

Optical enable capability provides the device with several advantages, including: (1) improved management of high-intensity reflections through dynamic sensitivity control; (2) enhanced spatial and temporal resolution by selective SPAD activation; (3) increased detection reliability by disabling noisy SPAD elements; (4) optimized SBR and reduced pile-up distortion via progressive SPAD enable strategies. These capabilities make the device suitable for precision optical sensing applications, including autonomous navigation, robotic vision, advanced LIDAR systems, and 3D imaging, where dynamic control and adaptability to varying signal conditions are desired.

Example Operating Modes

In a flood illumination mode, all SPADs are enabled with each SPAD connected a respective SPAD OPT ENABLE[A, B, C, D] corresponding to its position in each macropixel. SPADs are thus progressively activated during each cycle and disabled between histograms. All SPADs are configured to operate over SPAD ACQ ENABLE[W, X, Y, Z]=[W, 0, 0, 0] meaning all SPADs operate within the same window W (see FIG. 48). Every K laser pulses, based on a measurement quality estimation, those macropixels that have reached optical exposure are disabled.

In a sparse illumination mode, all SPADs are enabled with each SPAD connected a respective SPAD OPT ENABLE[A, B, C, D] corresponding to its position in each macropixel. SPADs are thus progressively activated during each cycle and disabled between histograms. All SPADs are configured to operate over SPAD ACQ ENABLE[W, X, Y, Z]=[0, 0, 0, Z] meaning all SPADs operate within the same window Z. Every K laser pulses, based on a measurement quality estimation, those macropixels that have reached optical exposure are disabled.

In a variable resolution illumination mode, all SPADs are enabled with each SPAD connected a respective SPAD OPT ENABLE[A, B, C, D] corresponding to its position in each macropixel. SPADs are thus progressively activated during each cycle and disabled between histograms. All SPADs are configured to operate over SPAD ACQ ENABLE[W, X, Y, Z]=[W, X, Y, Z] meaning SPADs operate according to range within each histogram cycle. Every K laser pulses, based on a measurement quality estimation, those macropixels that have reached optical exposure are disabled.

In a scanning illumination mode, only a row of SPADs are enabled with each SPAD connected a respective SPAD OPT ENABLE[A, B, C, D] corresponding to its position in each macropixel. SPADs are thus progressively activated during each cycle and disabled between histograms. All SPADs are configured to operate over SPAD ACQ ENABLE[W, X, Y, Z]=[W, 0, 0, 0] meaning SPADs operate within the same window W. The SPAD row is updated and the process repeats accordingly.

It is appreciated that one skilled in the art can combine the above described embodiments, methods, and techniques in any desired combination to create additional systems. Those skilled in the art will recognize that the boundaries between logic and circuit blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediary components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the claims, any reference signs placed between parentheses shall not be construed as limiting the claim. The use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first," "second," etc. are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A time of flight distance measuring system, comprising:
- an array of pixel photon detectors for detecting photons reflected off one or more targets in response to a series of laser events;
- in-pixel histogram circuits disposed under said plurality of pixel photon detectors, each in-pixel histogram circuit incorporating an accumulator per time bin for counting photons, each accumulator including a linear feedback shift register (LFSR) circuit, wherein each LFSR circuit is divided into multiple LFSR circuits coupled by one or more carry bits, said in-pixel histogram circuit operative to:
  - generate a histogram for each pixel or groups of pixels whereby photon detection counts are maintained for a plurality of discrete time bins over an exposure period with each time bin corresponding to a particular delay interval equivalent to distance; and
  - simultaneously generate an intensity measurement for each pixel.

2. The time of flight depth measuring system according to claim 1, wherein said array is organized as macropixels, each macropixel comprising a plurality of pixel photon detectors.

3. The time of flight depth measuring system according to claim 1, wherein said accumulator is N-bits wide and comprises at least two separate LFSR circuits, each LFSR circuit being less than N-bits wide.

4. The time of flight depth measuring system according to claim 1, wherein said accumulator comprises a memory storage slave portion for storing LFSR data and a shared master portion for reading, incrementing, and writing the LFSR data stored in said slave portion.

5. The time of flight depth measuring system according to claim 1, further comprising one or more shared decoder circuits operative to convert an output of each divided LFSR circuit to binary form, each decoder circuit selected from a group consisting of a look up table (LUT) and combinatorial logic gates.

6. The time of flight depth measuring system according to claim 1, wherein pixels in said array operate independently and concurrently from each other, allowing the system to operate in global shutter mode within the exposure period.

7. The time of flight depth measuring system according to claim 1, wherein pixels in said array as well as said in-pixel histogram circuits operate off a single global clock signal that is utilized for real time photon synchronization, memory indexing, and operation of said system.

8. A method of time of flight distance measuring, comprising:

detecting photons, using an array of pixel photon detectors, for detecting photons reflected off one or more targets in response to a series of laser events;

in-pixel histogram circuit circuits disposed under said plurality of pixel photon detectors, each in-pixel histogram circuit incorporating an accumulator per discrete time bin, each accumulator including a linear feedback shift register (LFSR) circuit, wherein each LFSR circuit is divided into multiple LFSR circuits coupled by one or more carry bits; generating a histogram for each pixel or groups of pixels whereby photon detection counts are maintained for a plurality of discrete time bins over an exposure period with each time bin corresponding to a particular delay interval equivalent to distance; and simultaneously generating an intensity measurement for each individual pixel.

9. The method according to claim 8, wherein said array is organized as macropixels, each macropixel comprising a plurality of pixel photon detectors.

10. The method according to claim 8, wherein said accumulator is N-bits wide and comprises at least two separate LFSR circuits, each LFSR circuit being less than N-bits wide.

11. The method according to claim 8, wherein said accumulator is divided into a memory storage array slave portion for storing LFSR data and a shared master portion for reading, incrementing, and writing the LFSR data stored in said slave portion.

12. The method according to claim 8, wherein an output of each divided LFSR circuit is converted to binary form using a one or more shared decoder circuits.

13. The method according to claim 8, wherein pixels in said array operate independently of each other whereby said histograms and intensity data are generated in real time for all pixels simultaneously in parallel and in a single shot within the exposure period.

14. The method according to claim 8, wherein pixels in said array as well as said in-pixel histogram circuits operate off a single clock signal that is utilized for real time photon synchronization, memory indexing, and operation of said system.

15. A time of flight distance measuring system, comprising:

an array of laser emitters operative to generate and emit pulses of laser light as a series of laser events that illuminate an area;

an array of pixel photon detectors for detecting photons reflected off one or more targets in response to the series of laser events;

in-pixel histogram circuits disposed under said plurality of pixel photon detectors, each in-pixel histogram circuit incorporating an accumulator per discrete time bin for counting photons, each accumulator including a linear feedback shift register (LFSR) circuit, wherein each LFSR circuit is divided into multiple LFSR circuits coupled by one or more carry bits, said in-pixel histogram circuit operative to: generate a histogram for each macropixel whereby photon detection counts are maintained for a plurality of discrete time bins over an exposure period with each time bin corresponding to a particular delay interval equivalent to distance; and simultaneously generate an intensity measurement for each individual pixel.

16. The time of flight depth measuring system according to claim 15, wherein said accumulator comprises N-bits and comprises a circuit selected from a group consisting of two groups of N/2-bit LFSR circuits, three groups of N/3-bit LFSR circuits, and four groups of N/4-bit LFSR circuits, where N is a positive integer greater than or equal to four.

17. The time of flight depth measuring system according to claim 15, wherein pixels in said array operate independently and concurrently from each other, allowing the system to operate in global shutter mode within the exposure period.

18. The time of flight depth measuring system according to claim 5, wherein said one or more shared decoder circuits are shared across a plurality of in-pixel histogram circuits.

19. The method according to claim 12, wherein said one or more shared decoder circuits are shared across a plurality of in-pixel histogram circuits.

* * * * *